(12) United States Patent
    Kamysbayev et al.

(10) Patent No.: US 12,649,665 B2
(45) Date of Patent: Jun. 9, 2026

(54) COVALENT SURFACE MODIFICATION OF TWO-DIMENSIONAL METAL CARBIDES

(71) Applicant: THE UNIVERSITY OF CHICAGO, Chicago, IL (US)

(72) Inventors: Vladislav Kamysbayev, Chicago, IL (US); Dmitri V. Talapin, La Grange Park, IL (US)

(73) Assignee: The University of Chicago, Chicago, IL (US)

( * ) Notice: Subject to any disclaimer, the term of this patent is extended or adjusted under 35 U.S.C. 154(b) by 649 days.

(21) Appl. No.: 17/922,848

(22) PCT Filed: May 5, 2021

(86) PCT No.: PCT/US2021/030860
    § 371 (c)(1),
    (2) Date: Nov. 2, 2022

(87) PCT Pub. No.: WO2021/226221
    PCT Pub. Date: Nov. 11, 2021

(65) Prior Publication Data
    US 2023/0159340 A1    May 25, 2023

Related U.S. Application Data

(60) Provisional application No. 63/020,885, filed on May 6, 2020.

(51) Int. Cl.
    C01B 32/914    (2017.01)
    C01B 32/921    (2017.01)
    C23F 1/10    (2006.01)

(52) U.S. Cl.
    CPC .......... C01B 32/921 (2017.08); C01B 32/914 (2017.08); C23F 1/10 (2013.01); *C01P 2004/20* (2013.01)

(58) Field of Classification Search
    CPC ..... C01B 32/90; C01B 32/914; C01B 32/921; C01P 2004/20; C23F 1/10
    See application file for complete search history.

(56) References Cited

U.S. PATENT DOCUMENTS 3,898,096 A        8/1975  Heredy et al.
10,573,768 B2 *    2/2020  Ghidiu ................. H10H 20/833
                           (Continued)

FOREIGN PATENT DOCUMENTS

CN        102544534 A        7/2012
CN        107579235 A        1/2018
                           (Continued)

OTHER PUBLICATIONS

Zhang et al. (Synthesis of two-dimensional Ti3C2Tx MXene using HClφLiF etchant: Enhanced exfoliation and delamination, Journal of Alloys and Compounds 695 (2017) 818e826).*
                           (Continued)

*Primary Examiner* — Jun Li
(74) *Attorney, Agent, or Firm* — Bell & Manning LLC

(57)    ABSTRACT

Methods for modifying the surface termination of two-dimensional (2D) transition metal carbides (MXenes) are provided. The methods, which allow for versatile chemical modification of the terminating anions via halide exchange or substitution and elimination reactions in molten inorganic salts, provide a processing approach that is widely applicable to MXenes as a broad class of functional materials.

21 Claims, 46 Drawing Sheets

FIG. 1A $Ti_3C_2Br_2$

MAX phase    MXene $CdCl_2/CdBr_2$
Molten salt

= Ti    = C    = Br    = Te    = S

(56)  References Cited

U.S. PATENT DOCUMENTS

| | | | | |
|---|---|---|---|---|
| 11,040,323 | B2 | 6/2021 | Talapin et al. | |
| 11,247,914 | B2 | 2/2022 | Talapin et al. | |
| 11,296,243 | B2 * | 4/2022 | Ghidiu | C04B 35/58007 |
| 12,015,092 | B2 * | 6/2024 | Ghidiu | H10H 20/833 |
| 2004/0262163 | A1 * | 12/2004 | Nitta | C25D 3/66 |
| | | | | 205/67 |
| 2021/0387857 | A1 * | 12/2021 | Nemeth | C01B 19/007 |

FOREIGN PATENT DOCUMENTS

| | | | | |
|---|---|---|---|---|
| CN | 108863372 | A * | 11/2018 | C04B 35/622 |
| CN | 110540236 | A | 6/2019 | |
| CN | 109437177 | B | 8/2019 | |
| KR | 20170106860 | A * | 9/2017 | C01B 32/90 |
| WO | WO 2021/226221 | | 11/2021 | |

OTHER PUBLICATIONS

Mian Li et al., "Element Replacement Approach by Reaction with Lewis Acidic Molten Salts to Synthesize Nanolaminated MAX Phases and Mxenes," Journal of the American Chemical Society, Mar. 1, 2019; pp. 1-19. DOI: 10.1021/jacs.9b00574.

Youbing Li et al., Pre-publication of the article: "A general Lewis acidic etching route for preparing MXenes with enhanced electrochemical performance in non-aqueous electrolyte," *Nat. Mater.* 19, 894-899, publicly available on or before Aug. 2020. https://doi.org/10.1038/s41563-020-0657-0.

Alexey Lipatov et al., "Elastic properties of 2D Ti3C2Tx MXene monolayers and bilayers," *Sci. Adv.* Jun. 15, 2018; 4: eaat0491; pp. 1-7.

Joseph Halim et al., "Electronic and optical characterization of 2D Ti2C and Nb2C (MXene) thin films," *J. Phys. Condens. Matter* 2019, 31 165301; pp. 1-10.

Junyu Chen et al., "Recent progress and advances in the environmental applications of MXene related materials," *Nanoscale,* Royal Society of Chemistry; pp. 1-19. DOI: 10.1039/c9nr08542d.

Sina Abdolhosseinzadeh et al., "Perspectives on solution processing of two-dimensional Mxenes," *Materials Today* Sep. 2021; pp. 1-27. https://doi.org/10.1016/j.mattod.2021.02.010.

Yury Gogotsi et al., "The Rise of Mxenes," *ACS Nano* Aug. 2019, 13; pp. 8491-8494.

Apurv Dash et al., Pre-publication of the article: "Molten Salt Shielded Synthesis (MS3) of oxidation prone materials in air," *Nat.*

*Mater.* 18, 465-470, publicly available on or before May 2019. https://doi.org/10.1038/s41563-019-0328-1.

Ning Zhang et al., Pre-publication of the article: "Superior Structural, Elastic and Electronic Properties of 2D Titanium Nitride Mxenes Over Carbide MXenes: A Comprehensive First Principles Study," 2D Materials publicly available on or before Jul. 2018; 5.4: 045004; pp. 1-43.

Justinas Palisaitis et al., "On the Structural Stability of MXene and the Role of Transition Metal Adatoms†," *Nanoscale,* 2018, 10, 10850; pp. 1-6.

Ingemar Persson et al., "On the organization and thermal behavior of functional groups on Ti3C2 MXene surfaces in vacuum," (2018), *2D Mater.* 5 015002.

Zaheer Ud Din Babar et al., Pre-publication of the article: "Novel highest-Tc superconductivity in two-dimensional Nb2C MXene." *arXiv preprint arXiv:1908.03987,* publicly available on or before Aug. 2019.

Tengfei Li et al., "Fluorine-Free Synthesis of High-Purity Ti3C2Tx (T=Oh, O) via Alkali Treatment," *Angew. Chem. Int. Ed.* 2018, 57; pp. 1-6.

Pang, Sin-Yi, et al. "Universal strategy for HF-free facile and rapid synthesis of two-dimensional MXenes as multifunctional energy materials." *Journal of the American Chemical Society* 141.24 (2019): 9610-9616.

Fu, Z. H., et al. "Stabilization and strengthening effects of functional groups in two-dimensional titanium carbide." *Physical Review B* 94.10 (2016): 104103; pp. 1-10.

Khazaei, Mohammad, et al. "Novel electronic and magnetic properties of two-dimensional transition metal carbides and nitrides." *Advanced Functional Materials* 23.17 (2013): 2185-2192.

The International Search Report and the Written Opinion issued on Nov. 23, 2021 for international patent application No. PCT/US21/30860; pp. 1-10.

Y. Yoon et al., "Enhanced Electrocatalytic activity by chemical nitridation of two-dimensional titanium carbide MXene for Hydrogen Evolution," *Journal of Materials Chemistry A,* Sep. 26, 2018; pp. 1-10.

J. Zhu et al., "S-functionalized Mxenes as electrode materials for Li-ion batteries," Sep. 27, 2017; pp. 1-16.

J. Zhu et al., "P and Si functionalized Mxenes for metal-ion battery applications," *2D Material* Apr. 10, 2017; pp. 1-7.

Zhongyue Zhang et al., "Molten Salt Synthesized MXene for catalytic applications: A review," Chem. Phys. Rev. 5, 031311 (2024); pp. 1-20. https://doi.org/10.1063/5.0215613.

* cited by examiner

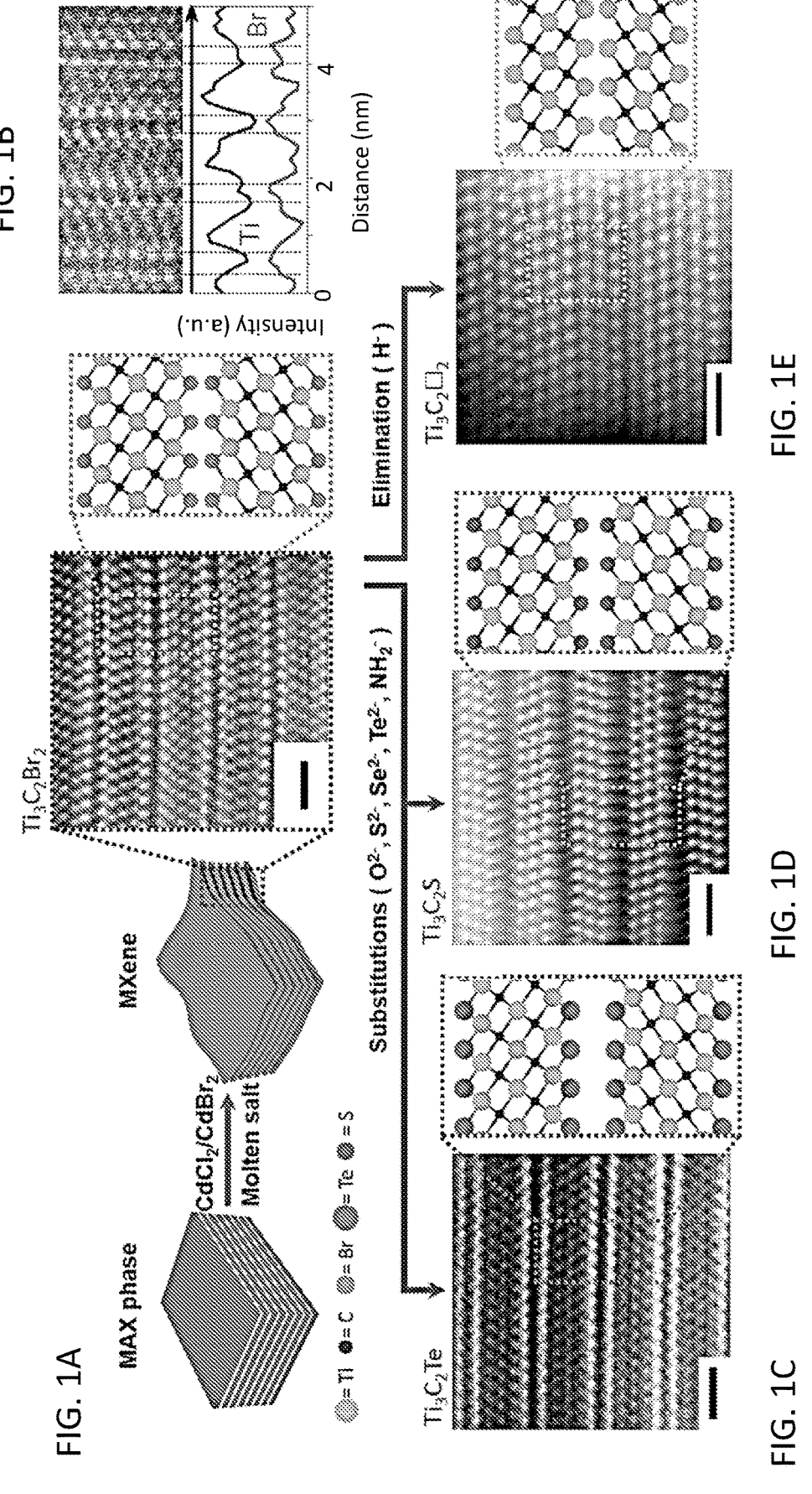

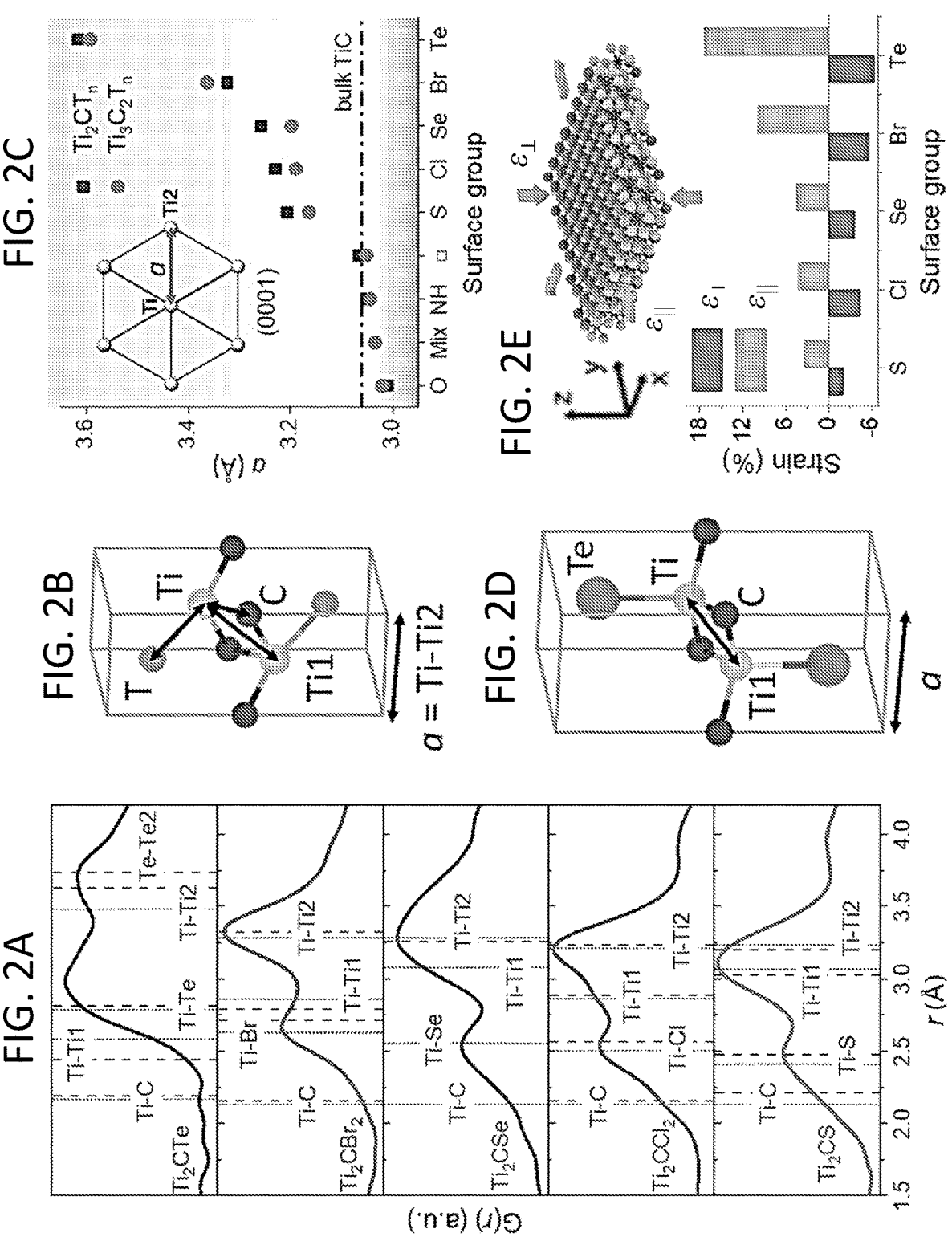

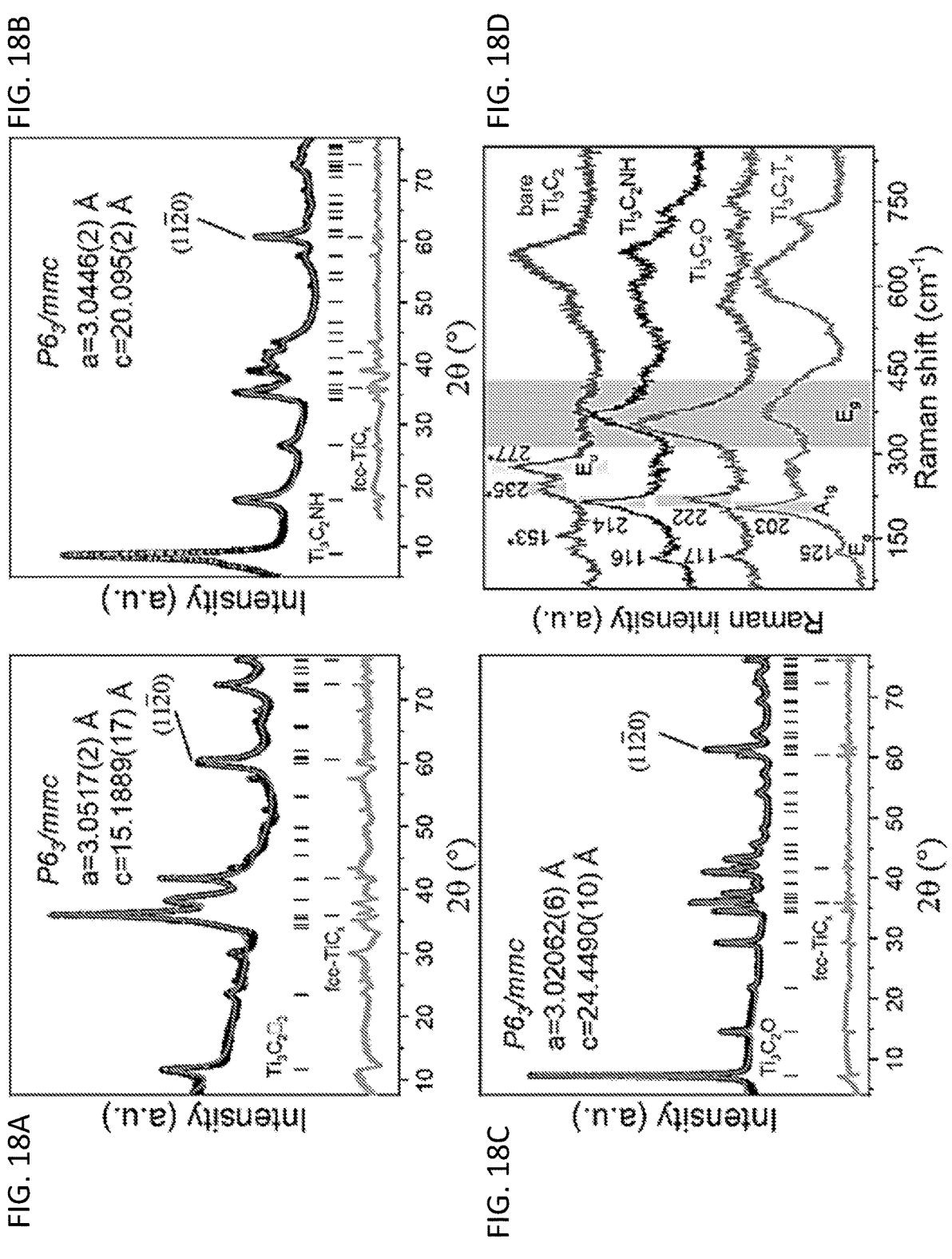

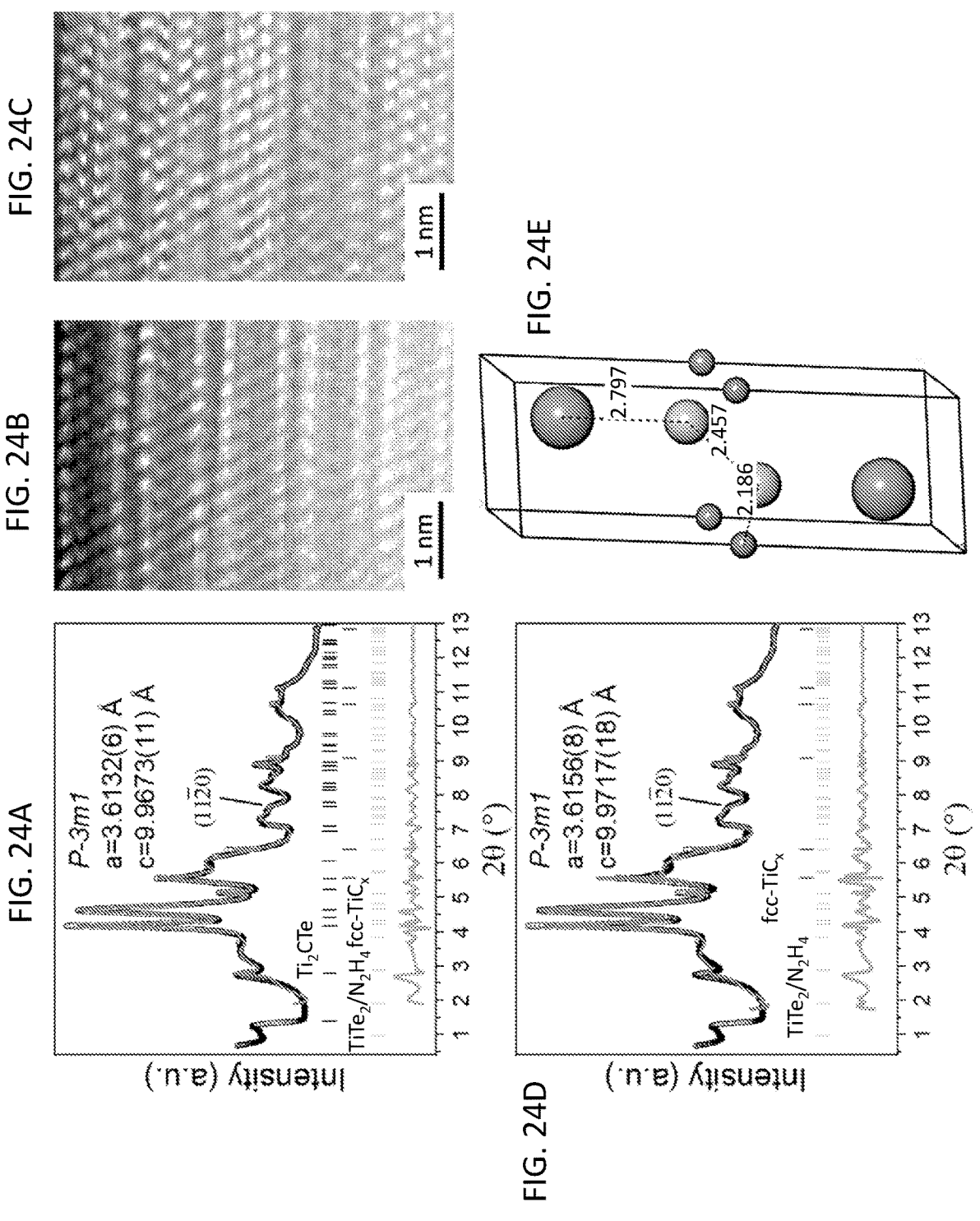

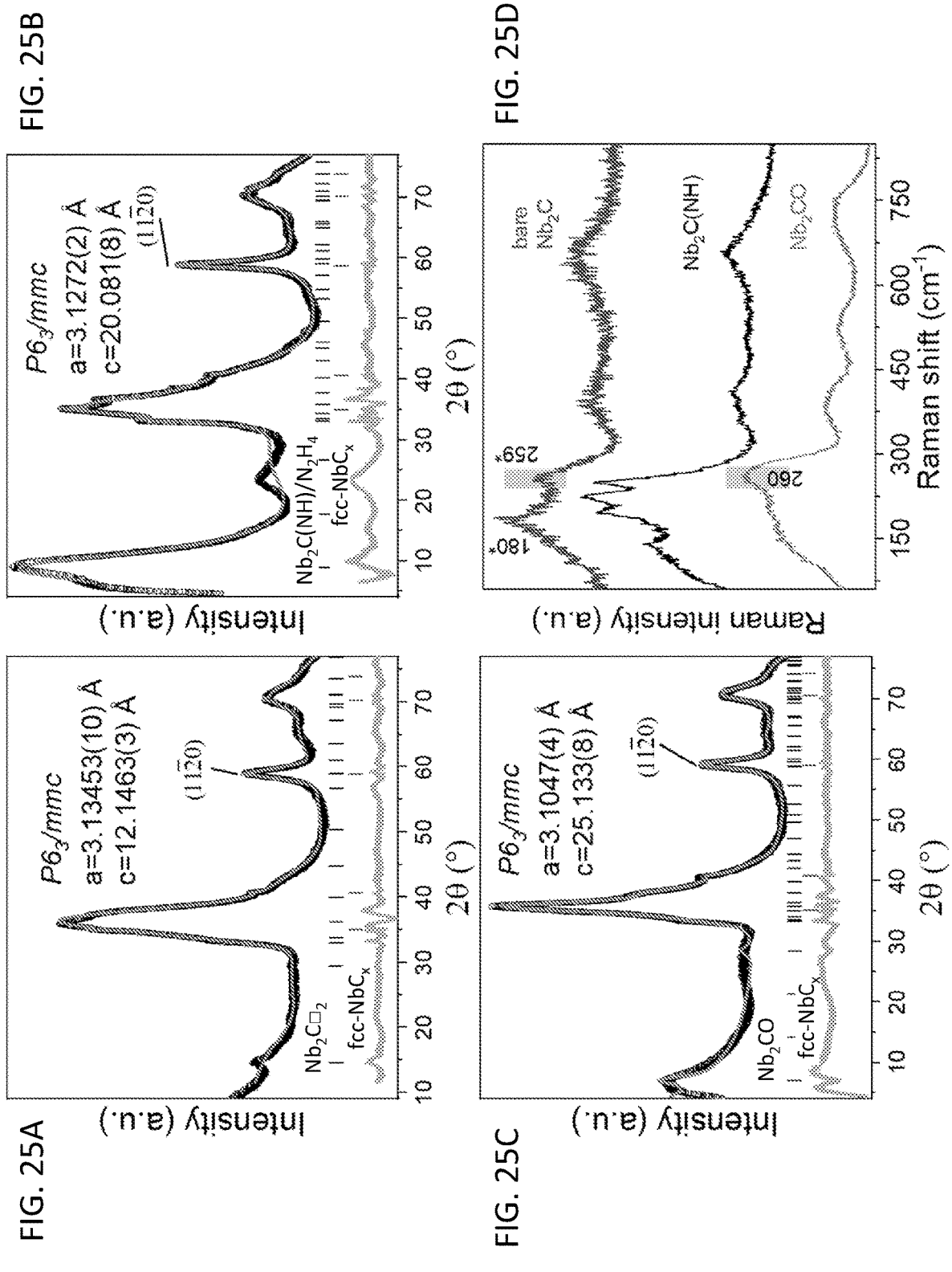

FIG. 27B
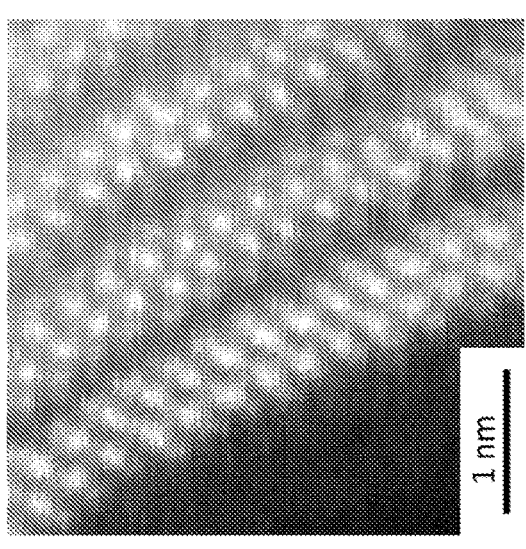
FIG. 27D
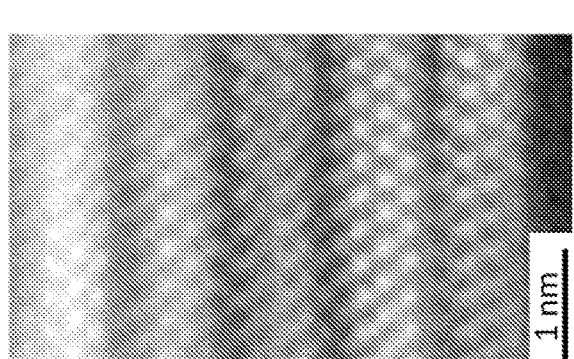
FIG. 27A
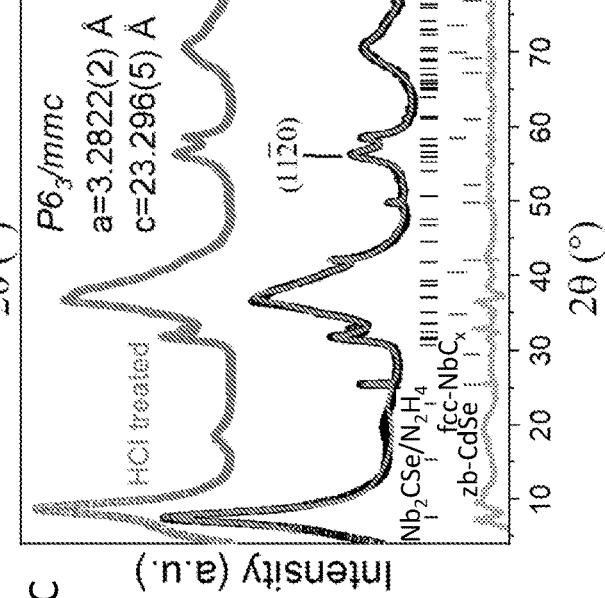
FIG. 27C

Center-to-center(CtC) spacing

| Material | $M_\perp$ (Å) (STEM) | $\Delta M_\perp$ (Å) | $T_\perp$ (Å) (STEM) | $\Delta T_\perp$ (Å) | CtC (Å) (STEM) | $\Delta$ CtC Spacing (Å) | $a$ (Å) (XRD) | $c$ (Å) (XRD) | CtC (Å) (XRD) | $\varepsilon_\perp$ (%) | $\Delta$ (%) | $\varepsilon_\parallel$ (%) | $\nu$ | $\Delta\nu$ |
|---|---|---|---|---|---|---|---|---|---|---|---|---|---|---|
| Ti$_3$C$_2$ | 2.54 | 0.03 | NA | NA | 7.88 | 0.18 | 3.0517 | 15.1889 | 7.59 | 1.6 | 1.2 | -0.3 | NA | NA |
| Ti$_3$C$_2$S | 2.45 | 0.07 | 8.66 | 0.1 | 11.00 | 0.12 | 3.1636 | NA | NA | -2.0 | 2.8 | 3.4 | 0.23 | 0.33 |
| Ti$_3$C$_2$Cl$_2$ | 2.39 | 0.06 | 8.42 | 0.32 | 11.36 | 0.17 | 3.18935 | 22.502 | 11.08 | -4.4 | 2.4 | 4.2 | 0.34 | 0.2 |
| Ti$_3$C$_2$Se | 2.41 | 0.07 | 9.11 | 0.22 | 11.79 | 0.39 | 3.19774 | NA | NA | -3.6 | 2.8 | 4.5 | 0.29 | 0.23 |
| Ti$_3$C$_2$Br$_2$ | 2.36 | 0.07 | 8.45 | 0.2 | 12.12 | 0.2 | 3.36352 | 23.3276 | 11.66 | -5.6 | 2.8 | 9.9 | 0.22 | 0.11 |
| Ti$_3$C$_2$Te | 2.34 | 0.06 | 9.15 | 0.08 | 13.11 | 0.12 | 3.59206 | NA | NA | -6.4 | 2.4 | 17.4 | 0.16 | 0.06 |

COVALENT SURFACE MODIFICATION OF TWO-DIMENSIONAL METAL CARBIDES

CROSS-REFERENCE TO RELATED APPLICATIONS

The present application is a National Stage of International Application No. PCT/US21/30860, filed May 5, 2021, which claims priority to U.S. provisional patent application No. 63/020,885, that was filed May 6, 2020, the entire contents of both of which are incorporated herein by reference.

REFERENCE TO GOVERNMENT RIGHTS

This invention was made with government support under FA9550-18-1-0099 awarded by the Defense Advanced Research Projects Agency, DE-SC0019375 awarded by the U.S. Department of Energy, and 1611371 awarded by the National Science Foundation. The government has certain rights in the invention.

BACKGROUND

MXenes are a large class of two-dimensional (2D) transition-metal carbides and nitrides having applications in supercapacitors, batteries, electromagnetic interference shielding, composites, and catalysts. In contrast to more mature 2D materials, such as graphene and transition metal dichalcogenides, MXenes have chemically modifiable surfaces that offer additional engineerability. MXenes are typically synthesized from a corresponding MAX phases, where M stands for a transition metal element (e.g., Ti, Nb, Mo, V, W, etc.), A stands for a main group element, and X stands for C or N, by selectively etching the main group element A (e.g., Al, Ga, Si, etc.). The etching is usually performed in aqueous hydrofluoric acid (HF) solutions rendering MXenes terminated with a mixture of F, O, and OH functional groups, commonly denoted as $T_x$. The surface termination of MXene sheets is defined during MAX phase etching. Electrochemical and hydrothermal methods have been applied for etching MAX phases without resorting to HF, but the use of aqueous solutions introduces a mixture of Cl, O, and OH surface groups.

SUMMARY

Method of making halide anion surface-terminated two-dimensional metal carbides and methods of modifying the surface termination of the halide anion surface-termination two-dimensional metal carbides are provided. Also provided are various two-dimensional metal carbides, which may be made using the methods.

One example of a method of making a halide anion surface-terminated two-dimensional metal carbide includes the steps of: providing a hexagonal layered ternary transition metal carbide having the formula $M_{m+1}AC_m$, where M is a transition metal, A is a metal element, X represents carbon, and m is 1, 2, or 3; selectively etching the A layer of the hexagonal layered ternary transition metal carbide with a transition metal bromide salt in a molten mixture comprising two or more alkali metal halide salts.

One example of a method of modifying the surface termination of a two-dimensional metal carbide includes the steps of: providing particles of a first two-dimensional metal carbide having surface terminating halide anions; dispersing the particles of the first two-dimensional metal carbide in an alkali halide molten salt bath with an ionic compound having a cation and a non-halide anion, whereby non-halide anions from the ionic compound replace surface terminating halide anions on the first two-dimensional metal carbide to form a second two-dimensional metal carbide comprising surface terminating non-halide anions.

Examples of novel two-dimensional metal carbides that can be made using the methods described herein include: two-dimensional titanium carbides having the formula $Ti_3C_2T_n$ or the formula $Ti_2CT_n$, where T is O, S, Se, Te, or NH and n has a value from 1 to 2; two-dimensional titanium carbides having the formula $Nb_2CT_n$, where T is O, S, Se, Te, or NH and n has a value from 1 to 2; two-dimensional metal carbides having the formula $M_{m+1}C_mX_2$, where M is a transition metal element, X is a surface terminating bromide anion, and n has a value from 1 to 2; two-dimensional metal carbides having the formula $Ti_3C_2Br_2$, $Ti_2CBr_2$, $Nb_2CBr_2$, or $Nb_2CCl_2$.

BRIEF DESCRIPTION OF THE DRAWINGS

Illustrative embodiments of the invention will hereafter be described with reference to the accompanying drawings, wherein like numerals denote like elements.

FIGS. 1A-1E show surface reactions of MXenes in molten inorganic salts. FIG. 1A shows schematics for etching of MAX phases in Lewis acidic molten salts and an atomic resolution high-angle annular dark-field (HAADF) image of $Ti_3C_2Br_2$ MXene sheets synthesized by etching $Ti_3AlC_2$ MAX phase in $CdBr_2$ molten salt. The electron beam is parallel to $[2\overline{1}\overline{1}0]$ zone axis. FIG. 1B shows energy dispersive X-ray (EDX) elemental analysis (line scan) of $Ti_3C_2Br_2$ MXene sheets. FIGS. 1C-1D show HAADF images of (FIG. 1C) $Ti_3C_2Te$ and (FIG. 1D) $Ti_3C_2S$ MXenes obtained by substituting Br for Te and S surface groups, respectively. FIG. 1E shows a HAADF image of $Ti_3C_2\infty2$ MXene ($\square$ stands for the vacancy) obtained by reactive elimination of Br surface groups. All scale bars are 1 nm.

FIGS. 2A-2E show surface groups can induce giant strain in the MXene lattice. FIG. 2A shows local interatomic distances in $Ti_2CT_n$ MXenes (T=S, Cl, Se, Br and Te) probed by small r region of the atomic pair distribution functions, G(r). The vertical lines show the Ti—C, Ti-T bond lengths and Ti—Ti1 and Ti—Ti$_2$ interatomic distances obtained from a Rietveld refinement of powder XRD patterns (dashed lines) and EXAFS analysis (dotted lines). FIG. 2B shows the unit cells of $Ti_2CT_n$ MXenes (T=S, Cl, Se, Br) obtained from a Rietveld refinement. FIG. 2C shows dependence of the in-plane lattice constant a (equivalent to Ti—Ti$_2$ distance in FIG. 2A) for $Ti_2CT_n$ and $Ti_3C_2T_n$ MXenes on the chemical nature of the surface group ($T_n$). FIG. 2D shows a proposed unit cell of $Ti_2CTe$ MXene (see FIGS. 24A-24E). FIG. 2E shows biaxial straining of $Ti_3C_2T_n$ MXene lattice induced by the surface groups. The in-plane ($\varepsilon_\parallel$) and out-of-plane ($\varepsilon_\perp$) strain components are evaluated with respect to the bulk cubic TiC lattice with $a_{TiC}$=4.32 Å.

FIG. 3A shows temperature-dependent resistivity for cold-pressed pellets of $Nb_2AlC$ MAX phase and $Nb_2CCl_2$ MXene. Inset: Magnetic susceptibility of $Nb_2CCl_2$ MXene as a function of temperature. FC and ZFC correspond to the field cooled and zero-field cooled measurements, respectively. FIG. 3B shows temperature-dependent resistivity for the cold pressed pellets of $Nb_2CT_n$ MXenes. Inset: Resistance as a function of temperature at different applied magnetic fields (0 to 8 T) for the cold-pressed pellets of $Nb_2CS_2$ MXene.

FIG. 4A shows a schematic of a delamination process. FIG. 4B shows a transmission electron microscopy (TEM) image of $Ti_3C_2Cl_2$ MXene flakes deposited from a colloidal solution. Inset: Fast Fourier transform of the high-lighted region showing crystallinity and hexagonal symmetry of the individual flake. FIG. 4C shows X-ray diffraction (XRD) patterns of multilayer MXene and delaminated flakes in a film spin casted on a glass substrate.

FIG. 8C shows $Nb_2CCl_2$ MXene starts to form at 650° C. with the appearance of a broad $(0002)_{MXene}$ peak at ~10° 2θ. The advantage of using $CdCl_2$ is that it has a boiling point of 960° C. compared to 732° C. of $ZnCl_2$. As a result, $CdCl_2$ molten salt can etch $Nb_2AlC$ MAX phase into the corresponding $Nb_2CCl_2$ MXene at 710° C.

FIGS. 13A-13B show XPS survey spectra of: (FIG. 13A) $Ti_3C_2Br_2$ MXene; (FIG. 13B) $Ti_3C_2Te$ MXene. The Br peaks have been replaced with the Te peaks after the surface group exchange in CsBr/LiBr/KBr molten salt. The Cs 3d peak corresponds to either intercalated $Cs^+$ ions or residue $Cs^+X^-$ salt.

FIGS. 14A-14F show high resolution XPS spectra (see XPS section for fitting details) of: (FIG. 14A), (FIG. 14C), and (FIG. 14E) $Ti_3C_2Br_2$ MXene; (FIG. 14B), (FIG. 14D), and (FIG. 14F) $Ti_3C_2Te$ MXene. The Ti—C component binding energy of $Ti_3C_2Br_2$ MXene (FIGS. 14A, 14C) shifts to a lower value after Bf has been substituted for $Te^{2-}$ (FIGS. 14B, 14D). This result is in accordance with Te being less electronegative than Br. The Te 3d region of $Ti_3C_2Te$ MXene (FIG. 14F) can be modelled using two components: $Te^{2-}$ as the major component (83%) and Te in higher oxidation state (probably in the form of $Te_n^{2-}$) as the minor component (17%).

FIGS. 18A-18D show experimental XRD patterns and Le Bail fits of: (FIG. 18A) bare $Ti_3C_2$ MXene; (FIG. 18B) $Ti_3C_2(NH)$ MXene; (FIG. 18C) $Ti_3C_{20}$ MXene. (FIG. 18D) Raman spectra of the same MXenes measured using 632 nm laser excitation. The $E_g$ mode corresponding to the in-plane vibration of the surface groups in 300-400 cm$^{-1}$ region (grey area) is absent in the case of the bare $Ti_3C_2$ MXene. The assignment of the vibrational modes (marked with *) of the bare $Ti_3C_2$ is based on the work of Hu et al. (T. Hu et al., Phys. Chem. Chem. Phys. 17, 9997-10003 (2015).) The appearance of the Raman forbidden (IR allowed) $E_u$ mode at 277 cm$^{-1}$ is probably related to the disorder present in the stacks of the bare $Ti_3C_2$ MXene sheets.

FIG. 19A shows survey spectrum with the highlighted N is region. Elemental analysis of this survey spectrum results in Ti:N ratio of 3:1.1. FIG. 19B shows analysis of the high-resolution N is spectrum suggests presence of three components. The 396.2 eV peak (59%) belongs to the chemisorbed $\beta$-N on Ti surface. The 397.5 eV peak (26%) could correspond to the chemisorbed $\alpha$-$N_2$ on Ti surface. The 399.9 eV peak (16%) likely corresponds to N—H bond.

FIGS. 21A-21C show experimental XRD patterns and Le Bail fits of: (FIG. 21A) Bare $Ti_2C$ MXene with the smallest c lattice constant of just ~10.5 Å (Inset shows HAADF image of bare $Ti_2C$ MXene); (FIG. 21B) $Ti_2C(NH)$ MXene; (FIG. 21C) $Ti_2CO$ MXene.

FIG. 24A shows an experimental XRD pattern (0.2412 Å, transmission, upper curve) and Le Bail fit (overlapping upper curve) of $Ti_2CTe$ MXene. FIGS. 24B-24C show (FIG. 24B) HAADF and (FIG. 24C) LAADF images of $Ti_2CTe$ MXene. Also shown is an experimental XRD pattern and Rietveld refinement of $Ti_2CTe$ MXene. FIG. 24E shows the structure of $Ti_2CTe$ MXene derived from FIG. 24D.

FIGS. 25A-25D show experimental XRD patterns and Le Bail fits of: (FIG. 25A) Bare $Nb_2C$ MXene with the c lattice constant larger than that of the bare $Ti_2C$ MXene (FIGS. 21A-21C), probably due to the larger ionic size of Nb atoms; (FIG. 25B) $Nb_2C(NH)$ MXene recovered from the salt matrix using anhydrous hydrazine; (FIG. 25C) $Nb_2CO$ MXene. FIG. 25D shows Raman spectra of the same MXenes. The assignment of the vibrational modes (marked with *) of the bare $Nb_2C$ is based on the work of Hu et al. (T. Hu et al., J. Phys. Chem. C 122, 18501-18509 (2018).)

FIG. 26A shows a survey spectrum with the highlighted N is region. Elemental analysis of this survey spectrum results in Nb:N ratio of 2:1.1. FIG. 26B shows that analysis of the high-resolution N is spectrum suggests presence of three components, similar to that of $Ti_3C_2(NH)$. The 396.4 eV peak (64%) belongs to the chemisorbed $\beta$-N on Nb surface. The 397.4 eV peak (21%) could correspond to the chemisorbed $\alpha$-$N_2$ on Nb surface. The 399.4 eV peak (16%) likely corresponds to N—H bond.

FIGS. 27A-27D show experimental XRD patterns and Le Bail fits of: (FIG. 27A) $Nb_2CS_2$ MXene recovered from the salt matrix using anhydrous hydrazine; (FIG. 27C) $Nb_2CSe$ MXene recovered from the salt matrix using anhydrous hydrazine and subsequently washed with aqueous HCl to remove traces of bulk zb-CdSe; and STEM-LAADF images of (FIG. 27B) $Nb_2CS_2$ MXene and (FIG. 27D) LAADF image of $Nb_2CSe$ MXene.

FIGS. 29A-29B shows XPS survey spectra of: (FIG. 29A) $Nb_2CCl_2$ MXene; (FIG. 29B) $Nb_2CS_2$ MXene. The Cl peaks have been replaced with the S peaks after the surface group exchange in CsBr/LiBr/KBr molten salt.

FIGS. 30A-30E show high resolution XPS spectra (see XPS section for fitting details) of: (FIG. 30A), (FIG. 30C), and $Nb_2CCl_2$ MXene; (FIG. 30B), (FIG. 30D), and (FIG. 30E) $Nb_2CS_2$ MXene. The Cl 2p peaks disappear after the S$^{2-}$ surface group exchange. The Nb—C component binding energy of $Nb_2CCl_2$ MXene (FIGS. 30A, 30C) shifts to a lower value after Cl$^-$ has been substituted for S$^{2-}$ (FIGS. 30B, 30D). This result is in accordance with S being less electronegative than Cl. S 2p region of $Nb_2CS_2$ MXene (FIG. 30E) can be modelled using two components: S$^{2-}$ as the major component (70%) and S in higher oxidation state (probably in the form of $S_n{}^{2-}$) as the minor component (30%).

FIGS. 31A-31B show temperature dependent WAXS patterns of: (FIG. 31A) pure KCl/LiCl salt; (FIG. 31B) KCl/LiCl salt with $Ti_3C_2Cl_2$ MXene. The peaks corresponding to KCl and LiCl salts shift to lower angles at high temperatures, consistent with the expansion of the ionic lattice. The (000l) peaks corresponding to the multi-layer $Ti_3C_2Cl_2$ MXene remain temperature independent up to 500° C.

FIG. 35C shows secondary electron cut-off regions of the UPS spectra of $Nb_2CCl_2$ and $Nb_2CS_2$ MXenes. In addition to rendering MXenes with tunable transport and superconducting properties (FIGS. 3A-3B), surface groups allow to tune MXenes' work function (WF). The WF of $Nb_2CCl_2$ MXene measured is 4.3 eV, while that of $Nb_2CS_2$ MXene is 3.7 eV.

FIGS. 38A-38B show resistivity as a function of temperature for the cold pressed pellet of: (FIG. 38A) $Nb_2CO$ MXene after thermal annealing at 220° C. and 400° C.; (FIG. 38B) $Nb_2C(NH)$ MXene before and after thermal annealing at 220° C., 400° C., and 550° C. The cold pressed pellet of $Nb_2CO_x$ MXene did not enter the superconducting state even after thermal annealing at 400° C. The cold pressed pellet of $Nb_2C(NH)$ MXene before thermal processing behaves as an insulator, presumably due to the poor electronic coupling between the sheets. After thermal annealing (under vacuum) at 400° C., $Nb_2C(NH)$ MXene becomes a superconductor with a $T_c$ of 5.5 K. Additional annealing at 550° C. results in $Nb_2C(NH)$ MXene with a $T_c$ of 7.1 K.

FIG. 42A shows a comparison of EDX spectra (normalized w.r.t. Ti K$\alpha$) for multilayer and delaminated MXene. Slight increase in Ti/Cl ratio in delaminated MXenes can be associated with the partial breakage of Ti—Cl bonds. FIG. 42B shows the Raman spectrum of delaminated $Ti_3C_2Cl_2$ MXene still contains $A_{1g}$ peak associated with the out-of-plane vibration of surface Cl groups. FIG. 42C shows zeta potential is negative for the delaminated MXenes, consistent with the injection of electron after n-BuLi treatment. FIG. 42D shows size distribution of MXene flakes measured by DLS with the average flake size ~300 nm.

DETAILED DESCRIPTION

Figures 3A, 3B:
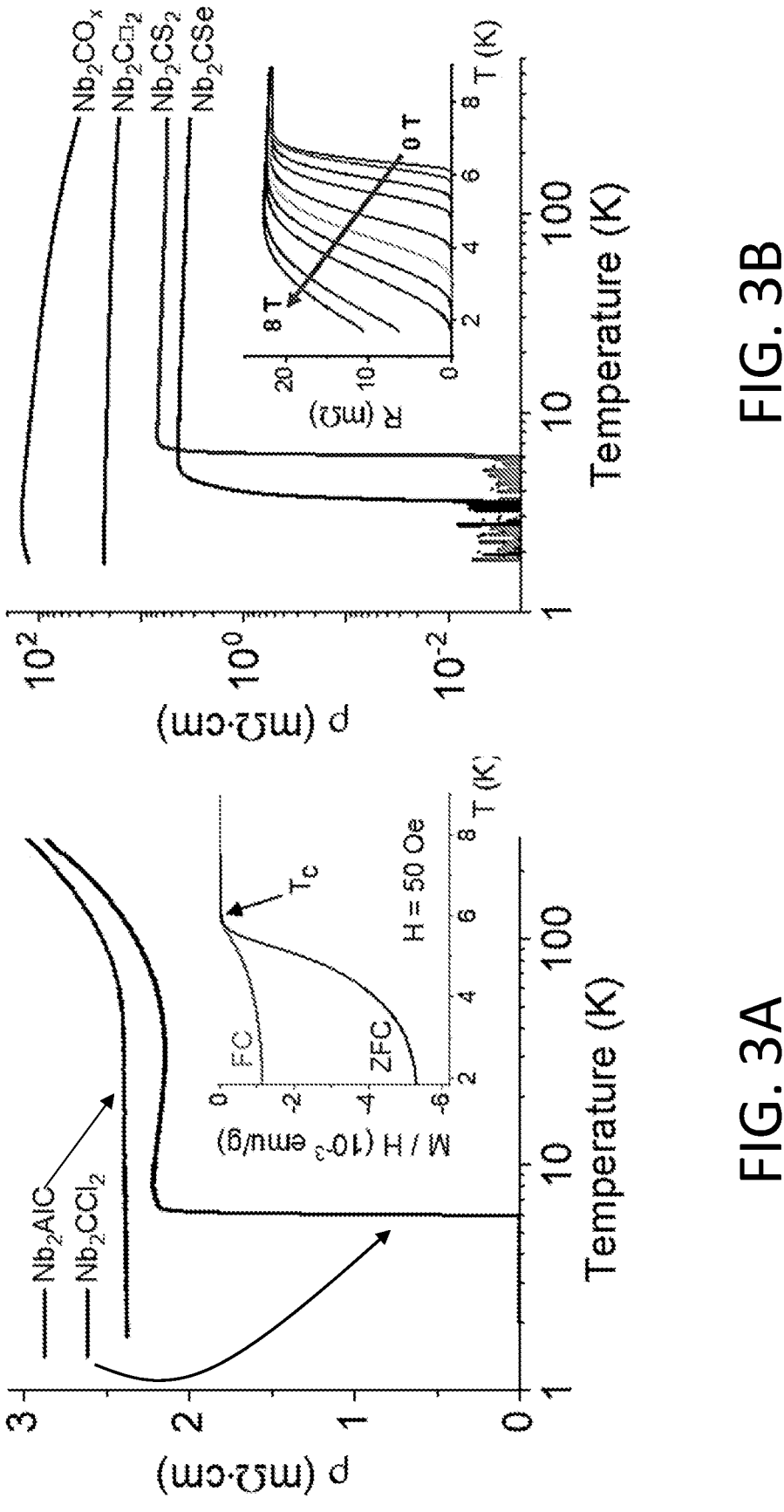
FIGS. 3A-3B show electronic transport and superconductivity in $Nb_2CT_n$ MXenes.
Figures 4A, 4B, 4C:
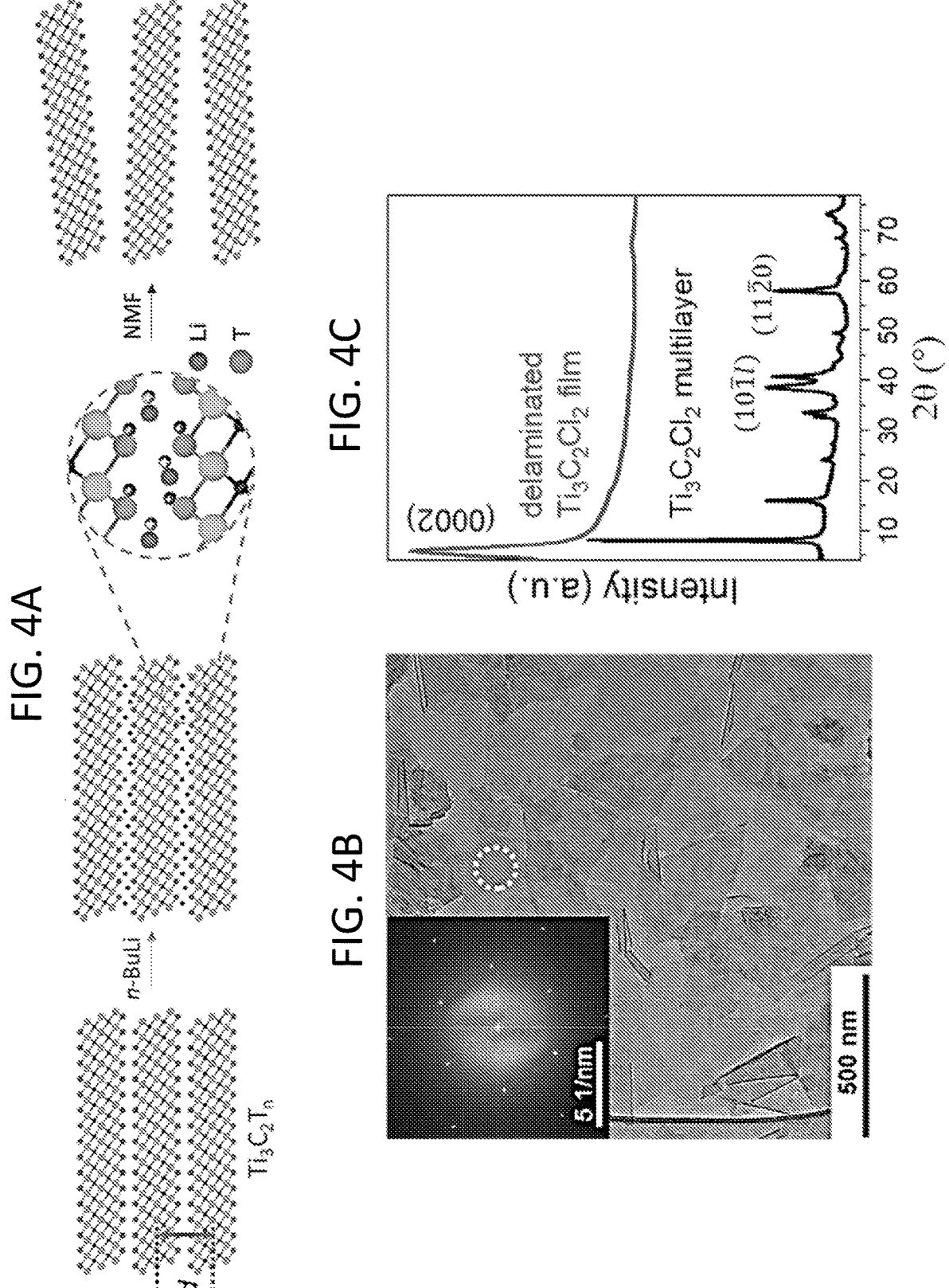
FIGS. 4A-4C show delamination of multilayer $Ti_3C_2T_n$ MXenes.
Figures 5A, 5B, 5C, 5D, 5E:
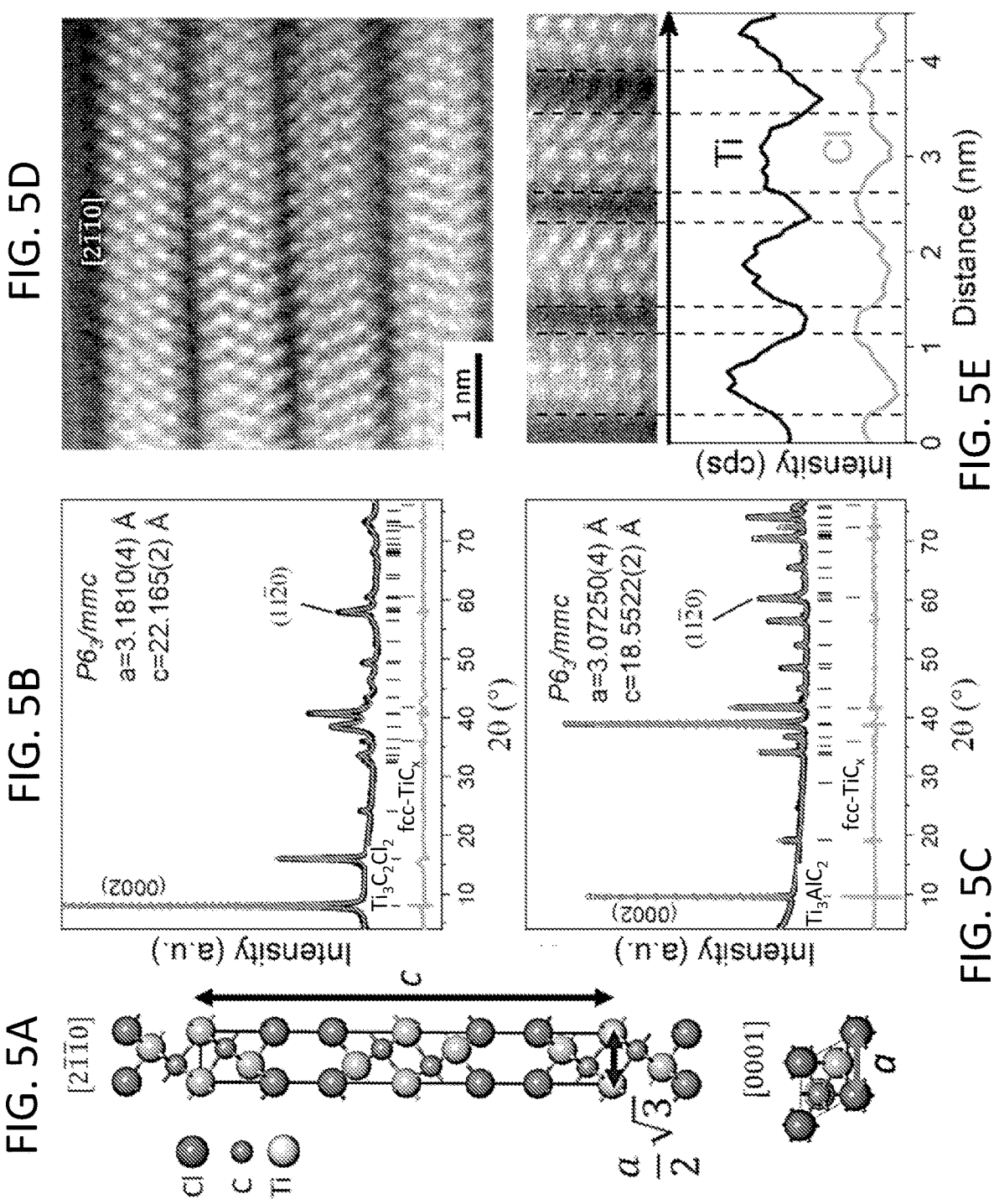
FIG. 5A shows the structure of $Ti_3C_2Cl_2$ MXene can be approximated using $P6_3/mmc$ space group with the two lattice parameters: in-plane, a, and out of plane, c.
FIGS. 5B-5C show experimental XRD patterns (Cu K$\alpha$, reflection; upper curves), Le Bail fits (upper curves) and the corresponding residues (lower curves) of (FIG. 5B) $Ti_3C_2Cl_2$ MXene derived from (FIG. 5C) $Ti_3AlC_2$ MAX phase. The successful MXene synthesis can be visualized from the shift of (0002) and (11$\overline{2}$0) peaks to lower angles compared to that of the parent MAX phase. In the direct space, these changes are reflected by the increase of both a and c lattice parameters. The initial $Ti_3AlC_2$ MAX phase contains small amounts of bulk fcc-$TiC_x$ (Fm-3m space group) impurity which propagates into the final MXene product.
FIG. 5D shows an atomic-column resolved HAADF image of $Ti_3C_2Cl_2$ MXene. The electron beam is parallel to [$2\overline{1}\overline{1}0$] zone axis.
FIG. 5E shows the EDX elemental line scans of $Ti_3C_2Cl_2$ MXene using Ti K$\alpha$ and Cl K$\alpha$, which suggest the presence of Cl surface groups on each $Ti_3C_2$ sheet. Due to their low Z contrast, C atoms could not be observed.
Figures 6A, 6B, 6C, 6D, 6E:
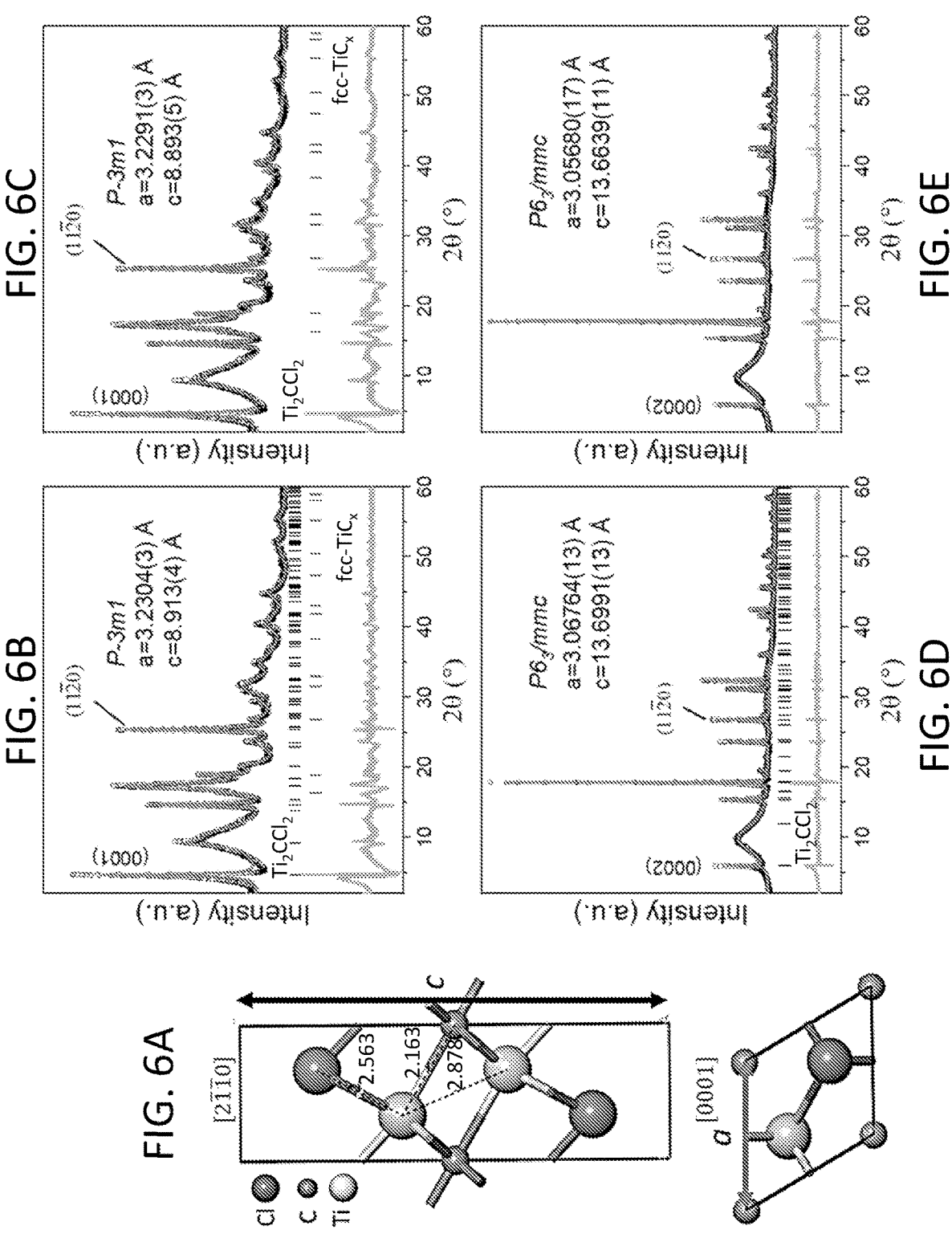
FIG. 6A shows side and top views of the unit cells of $Ti_2CCl_2$ MXene derived from the Rietveld refinement in FIG. 6C.
FIGS. 6B-6E show experimental XRD patterns (Mo K$\alpha$1, transmission, upper curves) and Le Bail fits (upper curves) of (FIG. 6B) $Ti_2CCl_2$ MXene derived from $Ti_2AlC$ MAX phase in FIG. 6D and experimental XRD patterns (upper curves) and Rietveld refinements (upper curves) of (FIG. 6C) $Ti_2CCl_2$ MXene derived from (FIG. 6E) $Ti_2AlC$ MAX phase.
Figures 7A, 7B, 7C, 7D, 7E:
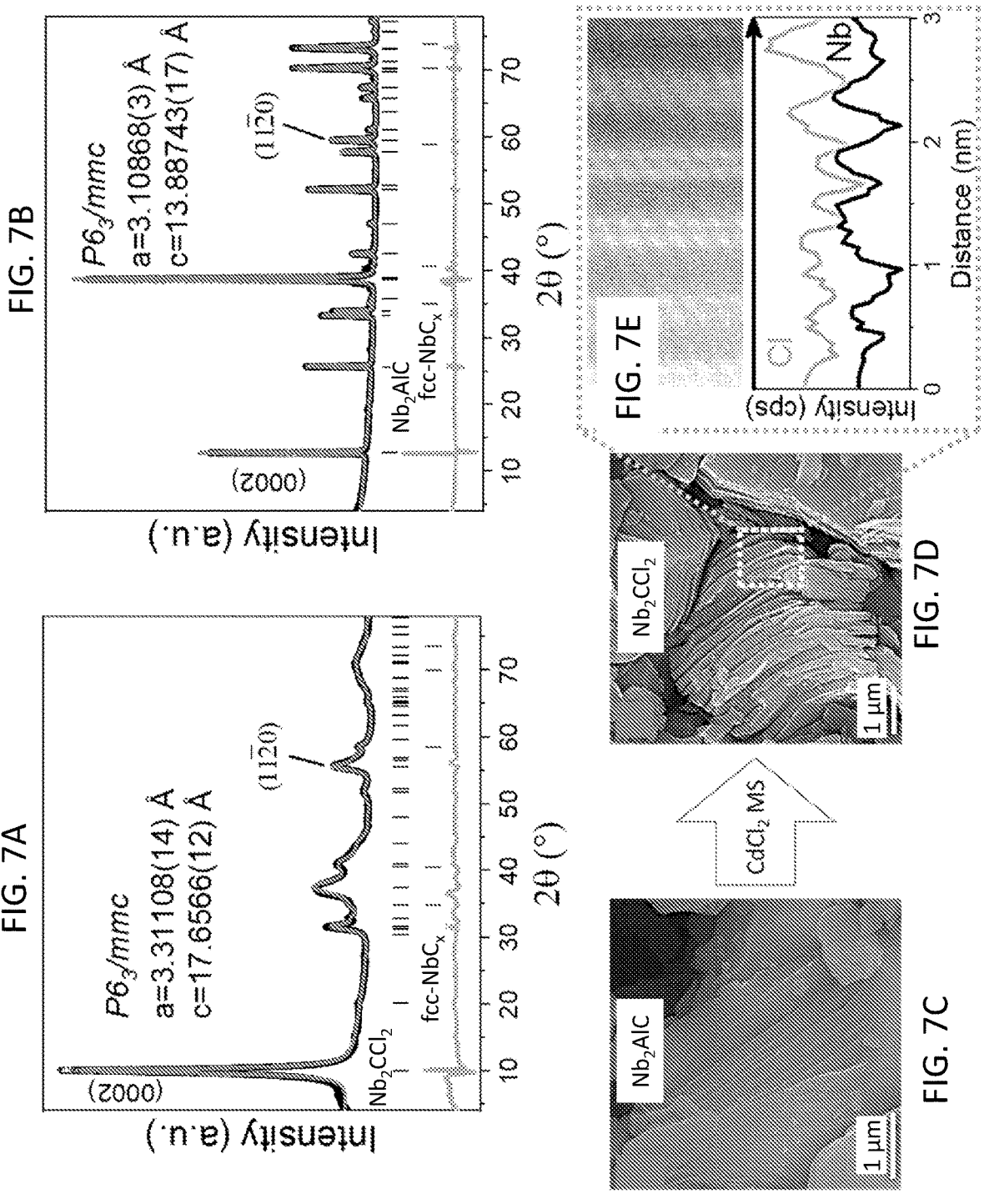
FIGS. 7A-7D show experimental XRD patterns and Le Bail fits of $Nb_2CCl_2$ MXene (FIG. 7A) derived from $Nb_2AlC$ MAX phase (FIG. 7B). SEM images of $Nb_2CCl_2$ MXene (FIG. 7D) and $Nb_2AlC$ MAX phase (FIG. 7C). Accordion-like morphology can be observed in the case of $Nb_2CCl_2$ MXene.
FIG. 7E shows the EDX elemental line scans using Cl K$\alpha$ and Nb K$\alpha$ confirm presence of Cl surface groups on each $Nb_2C$ sheet.
Figures 8A, 8B, 8C:
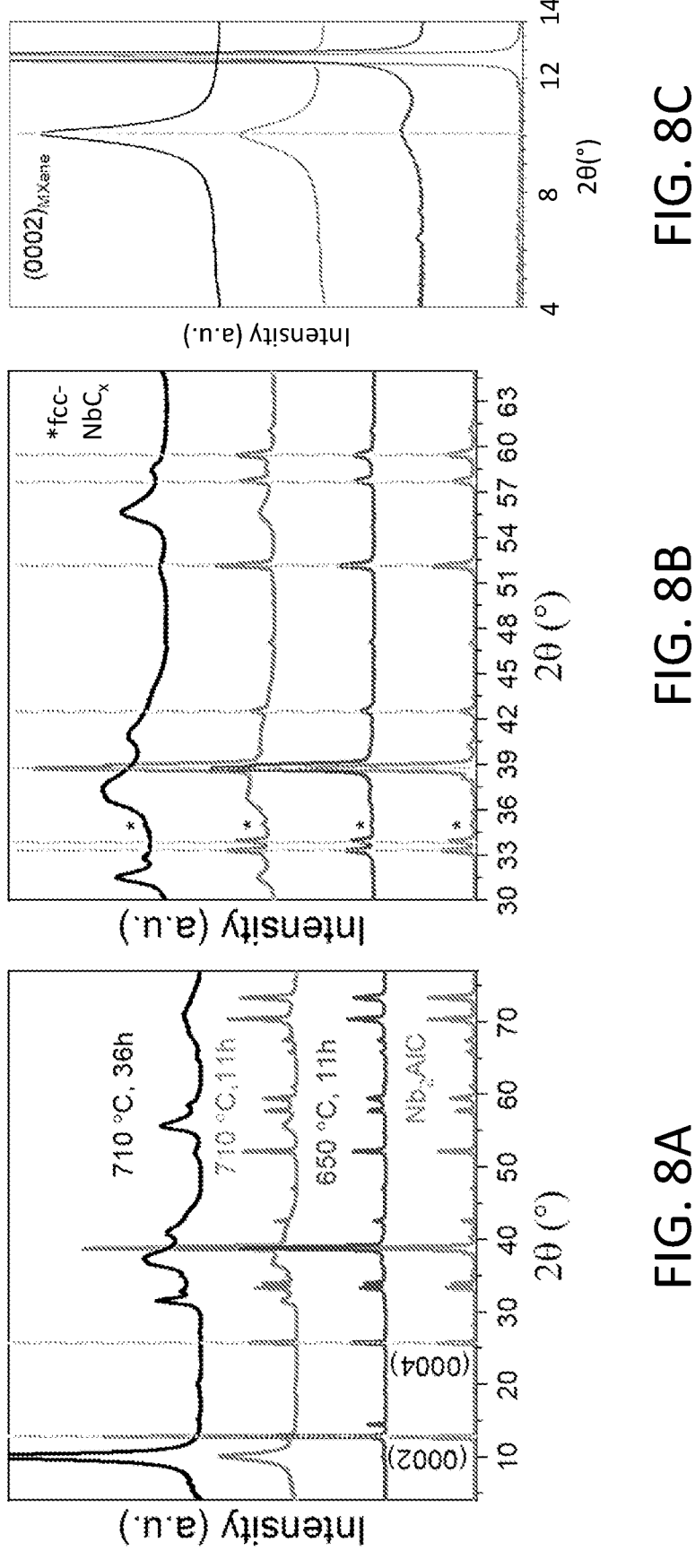
FIGS. 8A-8C show XRD patterns of the etching products of $Nb_2AlC$ MAX phase in $CdCl_2$ molten salt as a function of the etching time and temperature. The diffraction peaks belonging to $Nb_2AlC$ MAX phase do not shift during the intermediate etching steps at which both MAX phase and MXene are present. Hence it can be concluded that there is no intermediate $Nb_2CdC$ MAX phase formation.
Figures 9A, 9B:
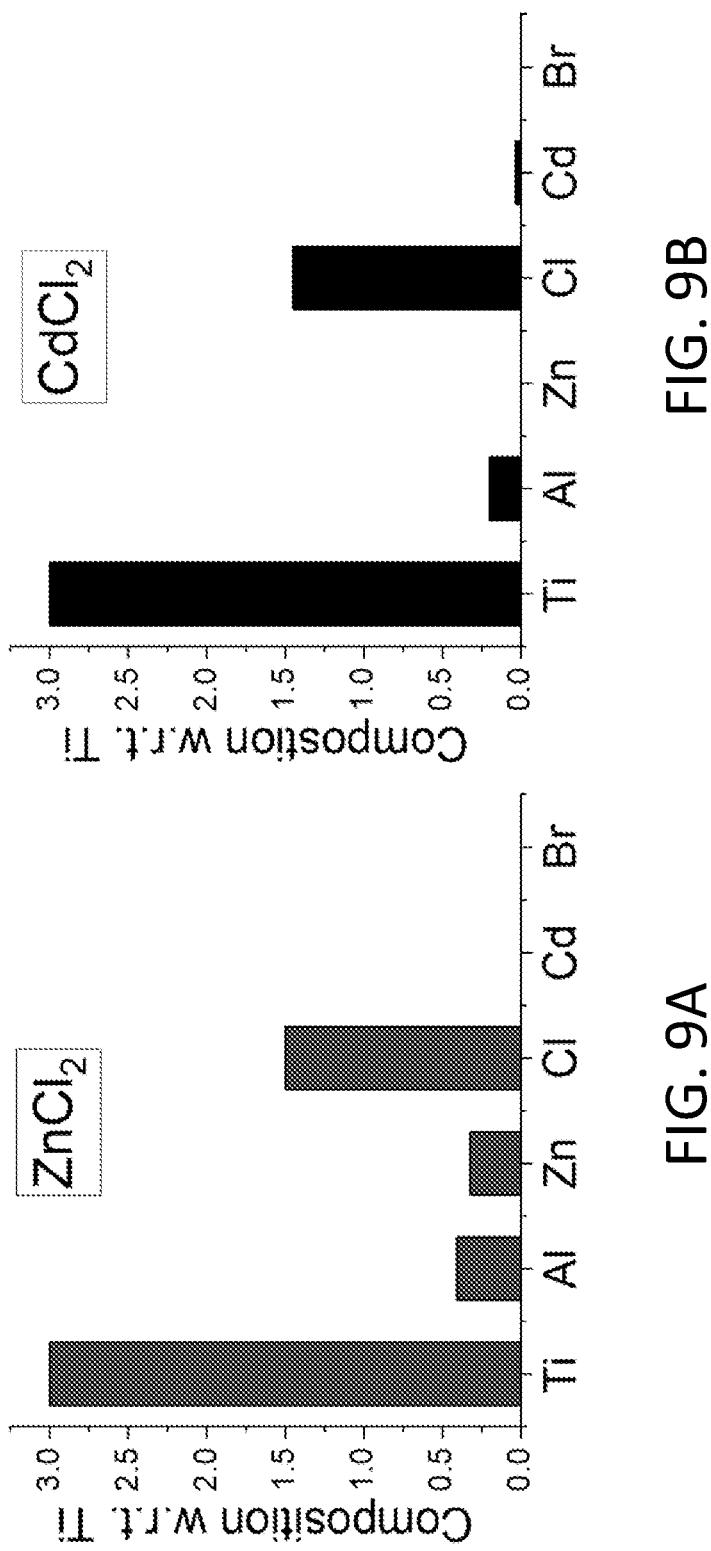
FIGS. 9A-9B show X-ray fluorescence (XRF) elemental analysis for the purified $Ti_3C_2Cl_{1.5}$ MXene (approximated as $Ti_3C_2Cl_2$) obtained through etching of $Ti_3AlC_2$ in (FIG. 9A) $ZnCl_2$ and (FIG. 9B) $CdCl_2$ molten salts. Etching in $CdCl_2$ results in $Ti_3C_2Cl_2$ MXene with minimum Cd contamination (~1 mol. % w.r.t. Ti) unlike contamination with Zn (10 mol. % w.r.t. Ti) in case of etching in $ZnCl_2$ molten salt. This is presumably related to the result in FIGS. 8A-8C.
Figure 10:
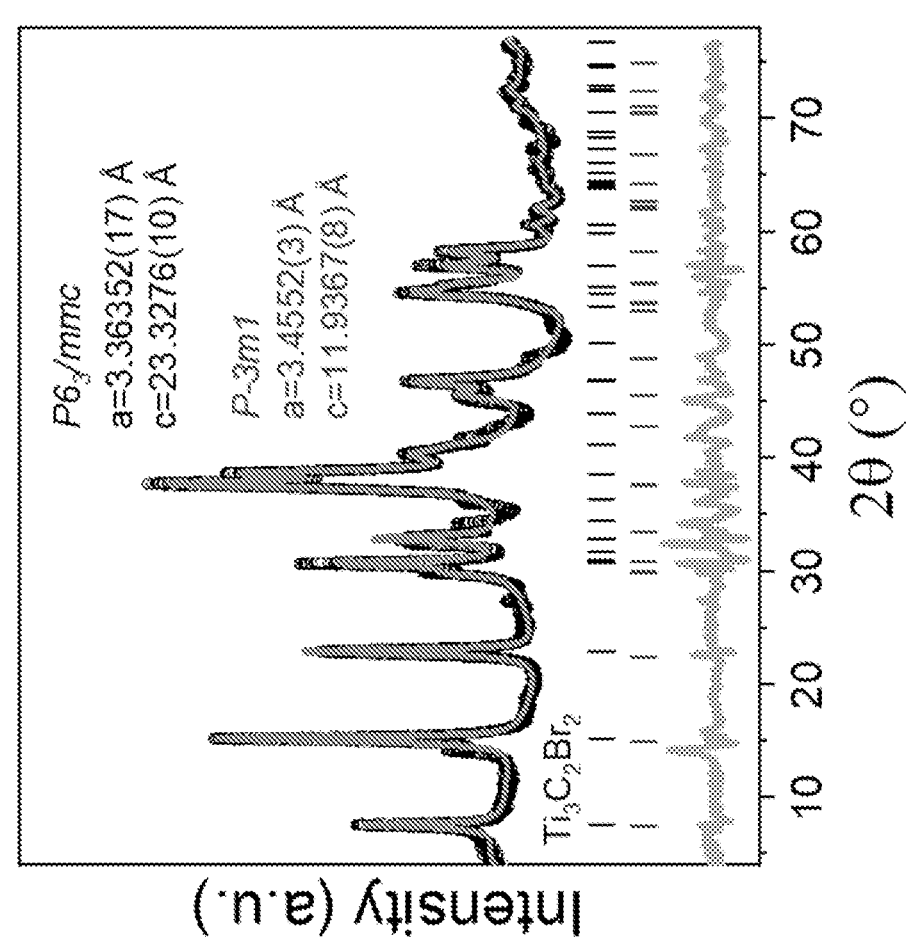
FIG. 10 shows an experimental XRD pattern and corresponding Le Bail fit of $Ti_3C_2Br_2$ MXene. In contrast to $Ti_3C_2Cl_2$ MXene for which $P6_3/mmc$ space group can account for all the peaks in the diffraction pattern (FIGS. 5A-5E), $Ti_3C_2Br_2$ MXene requires addition of P-3m1 space group with a slightly different a lattice parameter.
Figures 11A, 11B, 11C, 11D, 11E:
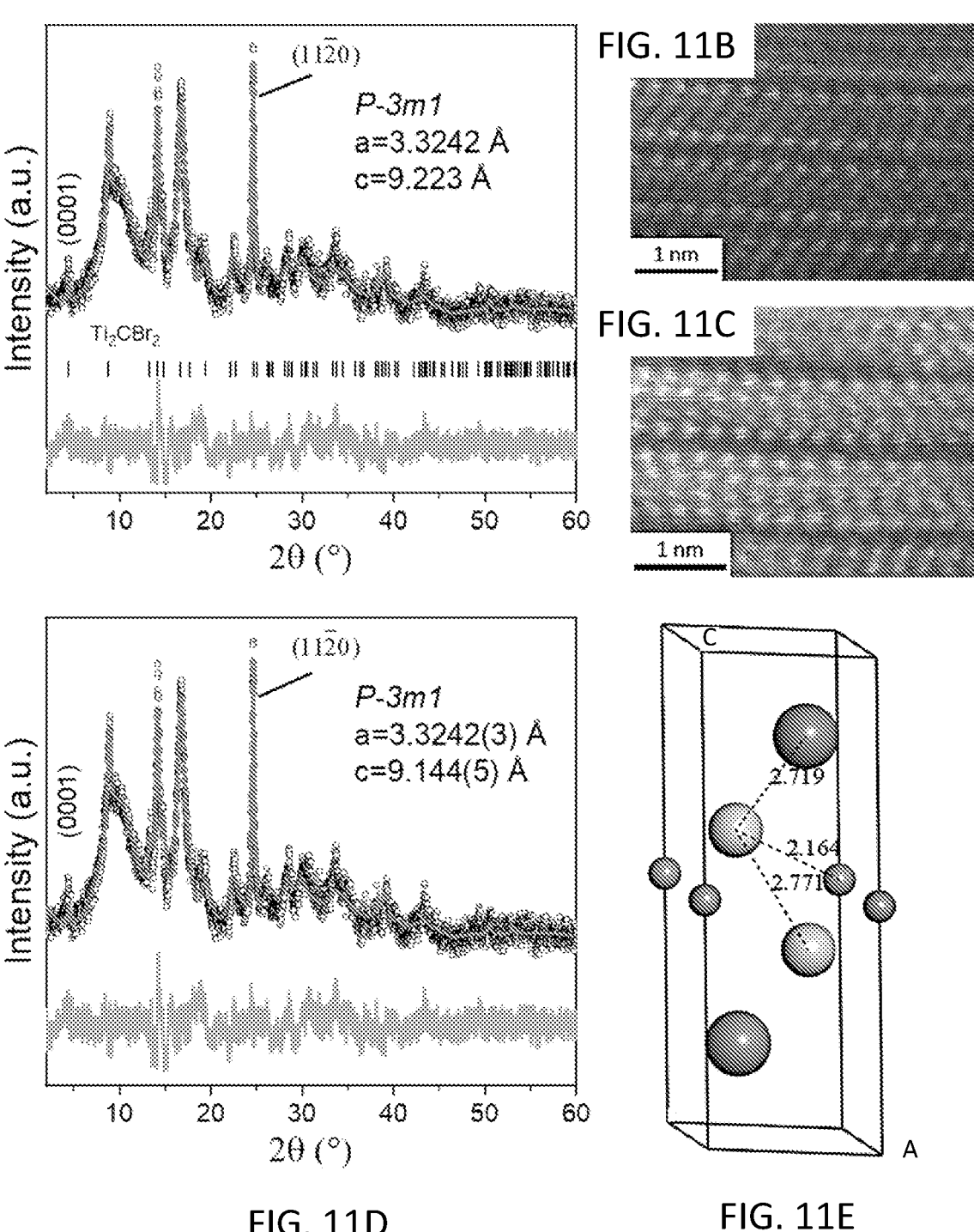
FIG. 11A shows an experimental XRD pattern (Mo K$\alpha$1, transmission, upper curve) and Le Bail fit (upper curve) of $Ti_2CBr_2$ MXene.
FIGS. 11B-11C show atomically resolved (FIG. 11B) STEM-HAADF and (FIG. 11C) low angle annular dark field (LAADF) images of $Ti_2CBr_2$ MXene and an experimental XRD pattern (upper curve) and Rietveld refinement (upper curve) of $Ti_2CBr_2$ MXene.
FIG. 11E shows the structure of $Ti_2CBr_2$ MXene derived from FIG. 11D.
Figures 12A, 12B:
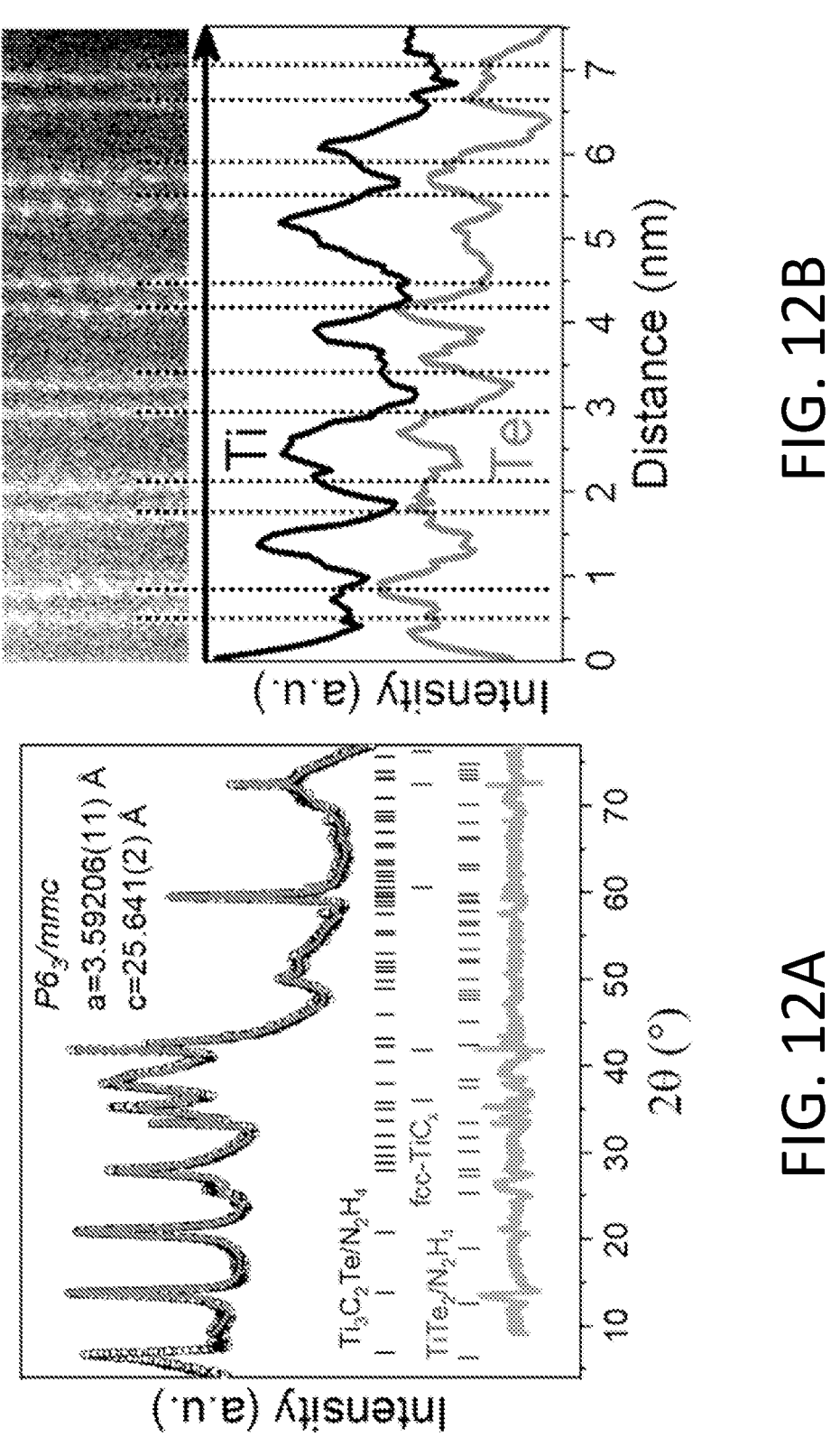
FIG. 12A shows an experimental XRD pattern (Cu K$\alpha$, reflection, upper curve) and Le Bail fit (overlapping upper curve) of $Ti_3C_2Te$ MXene derived from $Ti_3C_2Br_2$ MXene. $Ti_3C_2Te$ MXene was recovered from the salt matrix using anhydrous $N_2H_4$.
FIG. 12B shows the EDX elemental line scans of $Ti_3C_2Te$ MXene using Ti K$\alpha$ and Te L$\alpha$ suggest presence of Te surface groups on each $Ti_3C_2$ sheet.
Figures 13A, 13B:
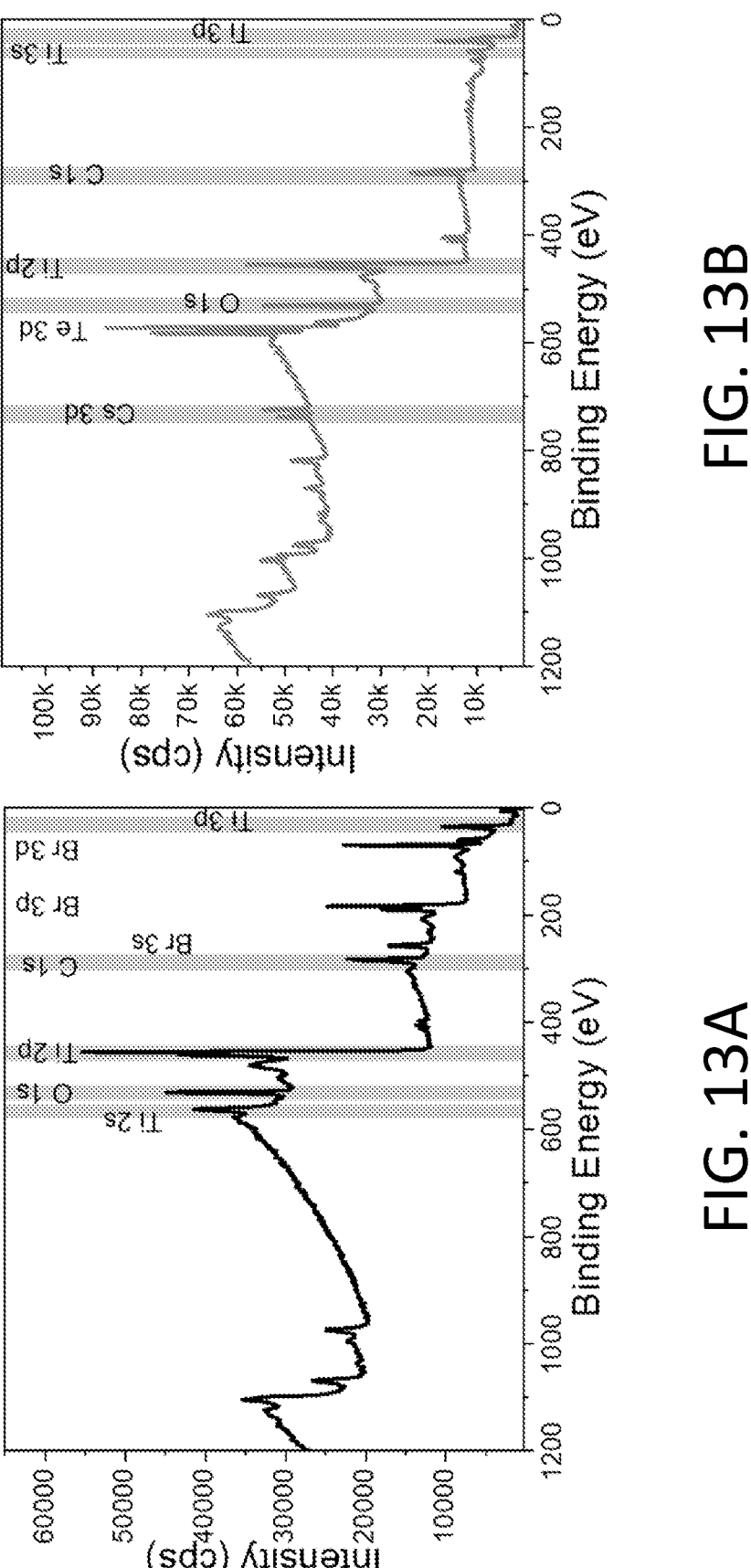
Figures 14A, 14B, 14C, 14D, 14E, 14F:
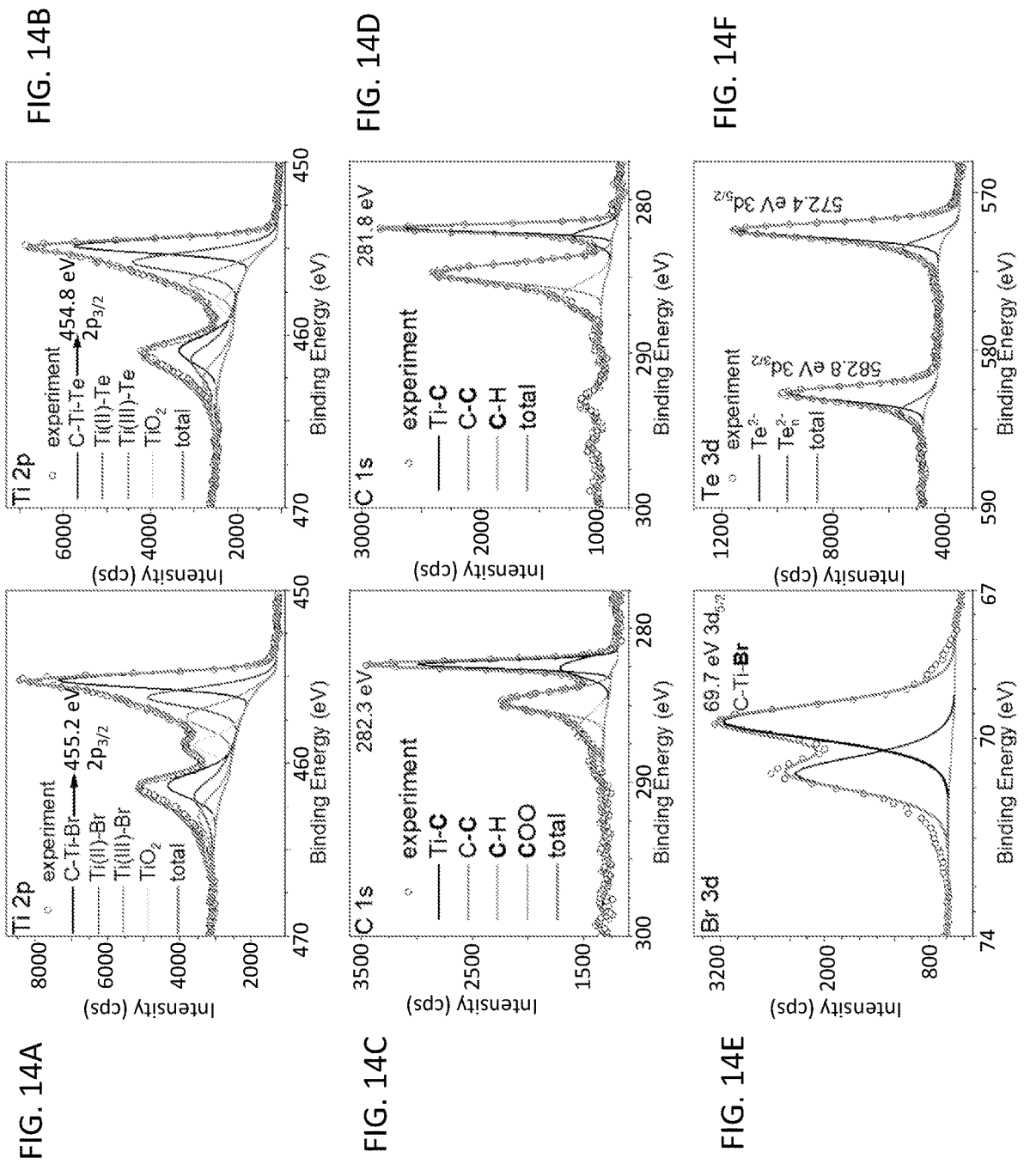

Methods for modifying the surface termination of 2D transition metal carbides (MXenes) are provided. The methods, which allow for versatile chemical modification of the terminating anions via halide substitution and elimination reactions in molten inorganic salts, provide a processing approach that is widely applicable to MXenes as a broad class of functional materials.

The MXenes used in the methods described herein are 2D transition-metal carbides in which a $M_{m+1}X_m$ structure forms 2D sheets, where M is a transition metal, X is carbon and m is 1, 2, or 3. A MXene is composed of n layers of element X alternatively sandwiched between n+1 layers of element M. The MXenes can be surface terminated with various functionalities, denoted $T_n$ (also referred to herein as ligands), where the particular surface termination generally depends on the chemical synthesis used to form the MXenes. Thus, MXenes can be represented by the general formula $M_{m+1}X_mT_n$ Examples of transition metals (M) that can be present in the MXenes include Ti, Zr, V, Nb, Ta, Cr, Mo, and Sc.

One example of a method of modifying the surface termination of a MXene begins with a metal carbide MXene that is surface terminated with halide anions, such as chloride ions ($Cl^-$) and/or bromide ions (Br). Although other halide anions, such as fluoride anions and/or iodide anions can be used as surface terminating anions, the use of chloride or bromide surface terminating anions is advantageous because Cl— and, even more so, Br-terminated MXenes are particularly efficient at engaging in surface reactions in which the halide ions are exchanged for other atoms or functional groups. Examples of halide-terminated MXenes include those having the general formula $M_{m+1}X_mCl_2$ and the general formula $M_{m+1}C_mBr_2$, where m is 1 or 2. In some embodiments of these MXenes, M is Ti or Nb. However, other transition metal elements can be used.

The MXenes with halide surface termination can be made from hexagonal layered ternary transition metal carbides or nitrides, which may be represented by the general formula $M_{m+1}AX_m$, where M is a transition metal, A is a metal that is typically a group 13 or group 14 element, X represents carbon or nitrogen, and m is 1, 2, or 3. The ternary transition metal carbides are referred to as MAX phases. Examples of a suitable MAX phase that can be used to make chloride and bromide terminated MXenes are $Ti_3AlC_2$ or $Ti_2AlC$. The MAX phases are converted into MXenes by selective etching of the A layer in the MAX phase by an acidic molten halide salt. Examples of molten salts that can be used include cadmium chloride ($CdCl_2$) and cadmium bromide ($CdBr_2$) salts. The use of the Lewis acidic bromide salt $CdBr_2$ is advantageous because it provides a molten salt etching route for the preparation of Br-terminated MXenes, such as $Ti_3C_2Br_2$ and $Ti_2CBr_2$ MXenes. Other Lewis acidic bromide salts that can be used include $CuBr_2$, $NiBr_2$, and $FeBr_2$. These salts can also be mixed with eutectic alkali metal halides (LiBr/KBr/CsBr) to lower their melting points.

The etching can be accomplished by forming a molten mixture of a MAX phase and a halide salt at an elevated temperature (e.g., $\geq 600°$ C.) for a time sufficient for the etching reaction (e.g., $\geq 6$ hours (h)) to occur. The halide terminated MXene can then be separated from any excess salt and metal. The molar ratio of MAX phase to halide salt in the mixture can be varied over a wide range, but generally the salt will have a higher molar concentration. By way of illustration, the molar ratio of MAX phase to halide salt in the mixture can be in the range from 1:6 to 1:12.

The surface termination of the MXenes is modified by dispersing particles of the halide anion surface terminated MXenes in an inorganic molten salt bath to which a reactive ionic compound is added. Prior to the modification of the surface termination, the MXenes may be washed to remove residual metal or any other impurities left over from the methods used to make them in order to provide a pure or substantially pure halide-terminated MXene. The ionic compound used in the modification has a cation and a non-halide anion. In the molten salt bath, the non-halide anions partially or completely replace the surface-terminating halide anions on the MXene to form an MXene that is partially or completely surface terminated with the non-halide anions. By way of illustration, in a partial ion exchange, at least 50%, at least 70%, at least 80%, at least 90%, or at least 99% of the surface-terminating halide anions may be exchanged with non-halide surface-terminating anions.

In some examples of the methods, the ionic compound that is added to the molten salt bath acts as an ion exchange additive, whereby non-halide anions from the ionic compound exchange with halide anions, thus establishing covalent bonding with the MXenes. Examples of non-halide anions that can exchange with the surface-terminating halide anions include chalcogenide anions, such as $O^{2-}$, $S^{2-}$, $Se^{2-}$, and $Te^{2-}$. Examples of ionic compounds that include chalcogenide anions include metal salts of the chalcogenides. These include lithium chalcogenide salts, such as $Li_2O$, $Li_2S$, $Li_2Se$, and $Li_2Te$. Amide ions are another example of a non-halide anion that can be used in a substitution reaction with the halide-terminated MXene. Ionic compounds that include amide ions include sodium amide ($NaNH_2$).

In some examples of the methods, the ionic compound that is added to the molten salt bath can engage in an elimination reaction in which anions from the compound first replace halide anions terminating the MXenes and then the new anions get reductively-eliminated from the surface producing bare MXenes. Examples of non-halide anions that can be used in an elimination reaction with the halide-terminated the MXene include hydride ions. Ionic compounds that include hydride ions include lithium hydride (LiH).

The molten salt bath is composed of at least one molten alkali halide salt. However, eutectics of two or more molten alkali halide salts can be used. The use of an alkali halide molten salt bath is advantageous because the MXene surface exchange reactions typically require a temperature of 300° C. or greater, and such high temperatures are difficult to achieve using traditional solvents. By way of illustration, various embodiments of the surface exchange reactions can be carried out at temperatures in the range from 300° C. to 700° C. In contrast to traditional solvents, alkali metal halides have high-temperature stability, are able to solubilize high concentrations of various ionic compounds, and have wide electrochemical windows. Suitable alkali halide mixtures include CsBr—LiBr—KBr mixtures and KCl—LiCl mixtures. The halide of the alkali halide salt bath may be chosen to match the halide termination of MXene. Such matching may avoid the introduction of undesired halide impurities in the final product. However, the halide of the alkali halide salt bath and the halide of the MXene need not be the same.

As demonstrated in the following Example, the methods described herein are able to form MXenes with unique structural and electronic properties. For example, the surface terminating groups can be used to control interatomic distances in the MXene lattice and to impart MXenes, such as niobium carbide MXenes (e.g., $Nb_2CCl_2$, $Nb_2C(NH)$, $Nb_2CS_2$, and $Nb_2CSe$) with superconductivity. As such, these MXenes have uses in Josephson Junctions and other superconducting circuit elements at superconducting temperatures.

EXAMPLE

This Example describes the synthesis of $Ti_3C_2Cl_2$, $Ti_2CCl_2$, and $Nb_2CCl_2$ MXenes from $Ti_3AlC_2$, $Ti_2AlC$, and $Nb_2AlC$ MAX phases in $CdCl_2$ molten salt (FIGS. 5A-5E, 6A-6E, 7A-7E, 8A-8C, and 9A-9B). The use of Lewis acidic $CdBr_2$ allowed for the extension of the molten salt etching route beyond chlorides to prepare the first Br-terminated $Ti_3C_2Br_2$ and $Ti_2CBr_2$ MXenes from $Ti_3AlC_2$ and $Ti_2AlC$ MAX phases (FIGS. 1A-1B, and FIG. 10 and FIGS. 11A-11E). The morphology, structure, and composition of all new MXenes were characterized using high-resolution scanning transmission electron microscopy (STEM), Raman spectroscopy, and a combination of x-ray methods, including energy-dispersive elemental mapping, diffraction (XRD), atomic pair distribution function (PDF), fluorescence (XRF), extended x-ray absorption fine structure (EXAFS), and photoelectron spectroscopy (XPS).

The transition metal atoms from the outer layers of MXene sheets (Ti, Mo, Ta, V) form relatively weak M-Cl and M-Br bonds, in comparison to M-F and M-OH bonds typical for MXenes with $T_x$ surface groups. This point can be demonstrated by the enthalpies of formation for $TiBr_4$ (−617 kJ $mol^{-1}$), $TiCl_4$ (−804 kJ $mol^{-1}$) vs. $TiF_4$ (−1649 kJ $mol^{-1}$), as well as by direct comparison of the bond energies (Table 1). Strong Ti—F and Ti—O bonds make it difficult to perform any post-synthetic covalent surface modifications of MXenes. In contrast, Cl- and Br-terminated MXenes with labile surface bonding act as versatile synthons for further chemical transformations.

TABLE 1

| Summary of the bond dissociation energies for M—O and M—X bonds relevant for this example. | |
| --- | --- |
| Bond | Bond dissociation energy at 298 K (kJ/mol) |
| Ti—O | 666.5 ± 5.6 |
| Ti—F | 569 ± 33 |
| Ti—Cl | 405.4 ± 10.5 |
| Ti—Br | 373 |
| Nb—O | 726.5 ± 10.6 |
| Nb—Cl | 393 |
| Nb—Br | 347 |

Figure 15:
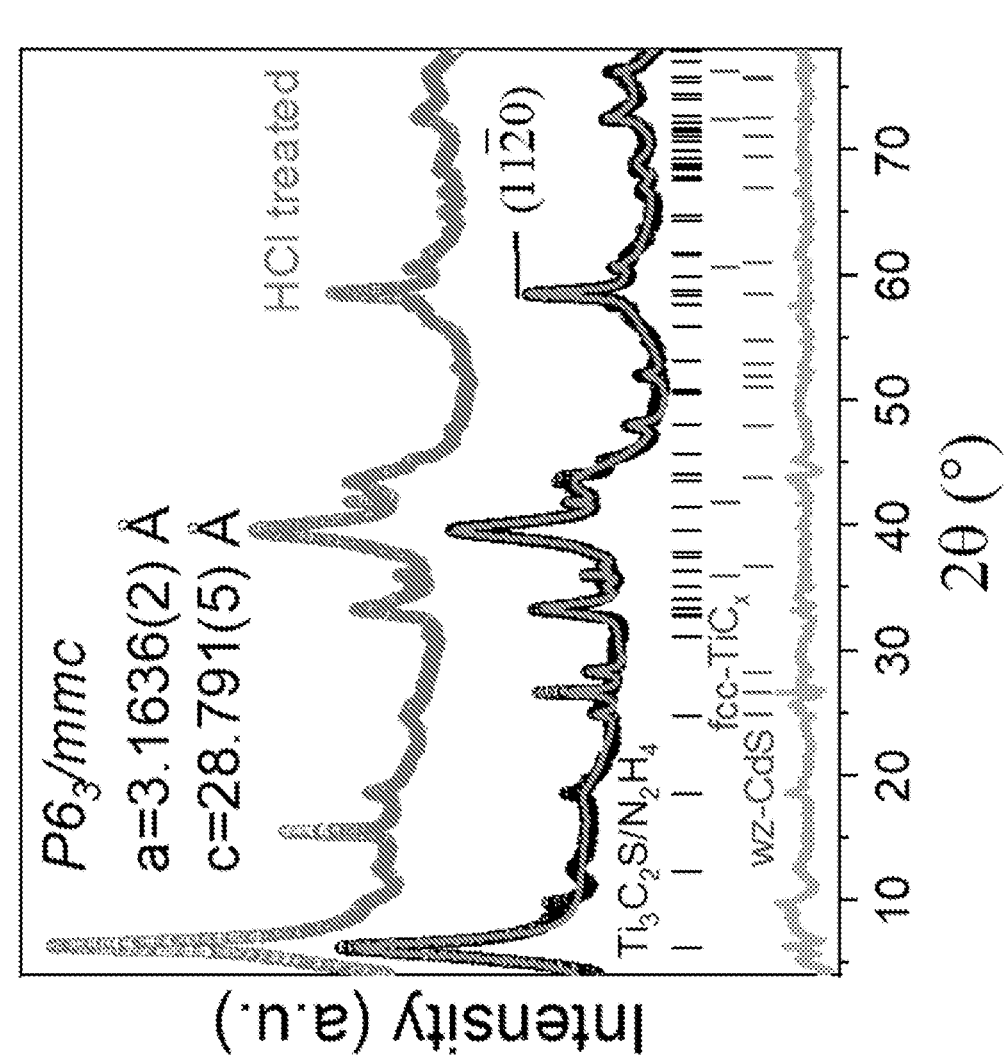
FIG. 15 shows an experimental XRD pattern and Le Bail fit of $Ti_3C_2S$ MXene derived from $Ti_3C_2Br_2$ MAX phase. $Ti_3C_2S$ MXene was recovered from the salt matrix using anhydrous hydrazine (black curve) and subsequently washed with aqueous HCl (dark cyan) to remove traces of bulk wz-CdS.
Figures 16A, 16B, 16C:
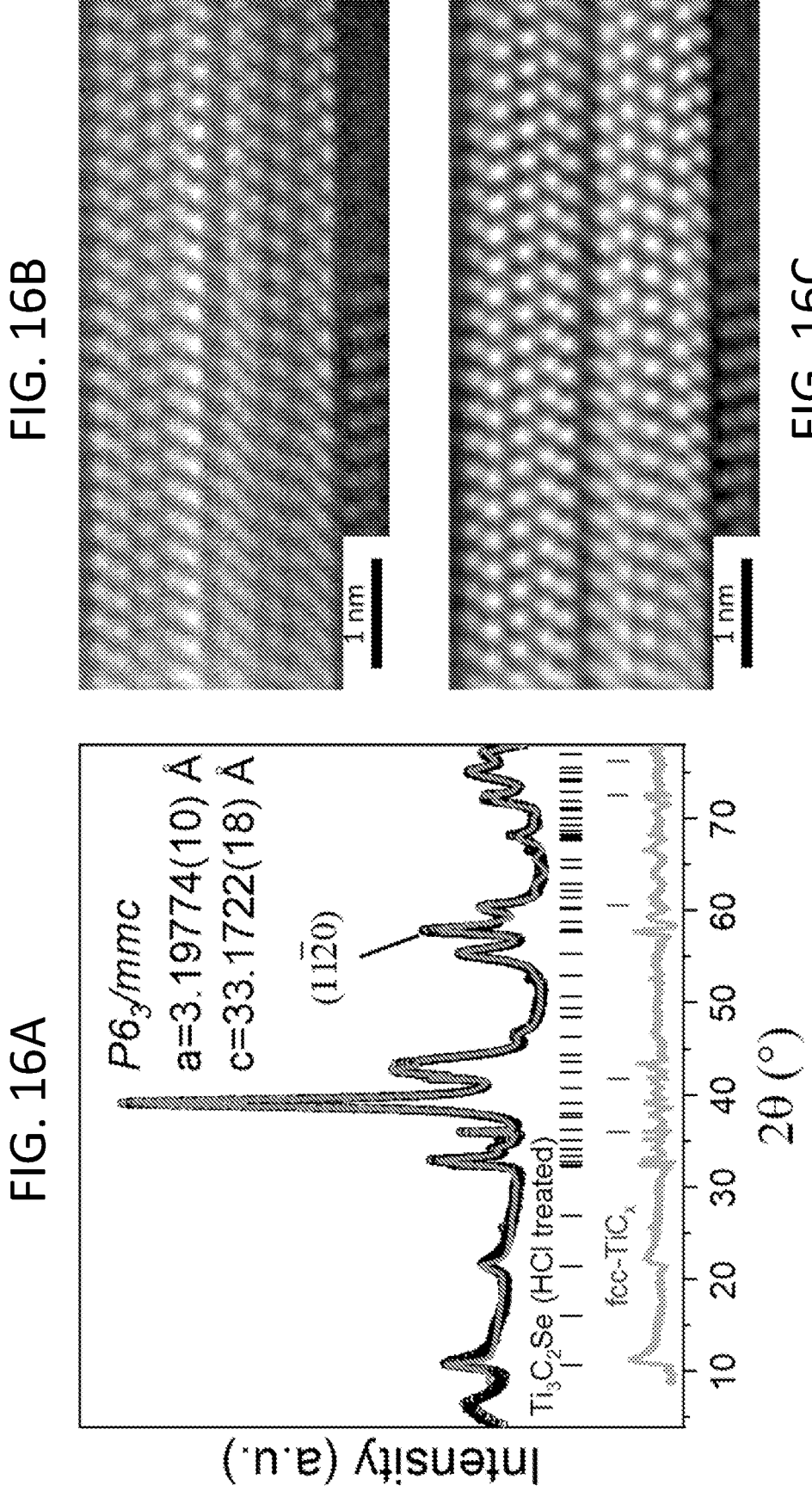
FIG. 16A shows an experimental XRD pattern and Le Bail fit of $Ti_3C_2Se$ MXene recovered from the salt matrix using anhydrous hydrazine and subsequently washed with aqueous HCl to remove traces of bulk zb-CdSe.
FIGS. 16B-16C show (FIG. 16B) HAADF and (FIG. 16C) LAADF images of $Ti_3C_2Se$ MXene.
Figures 17A, 17B:
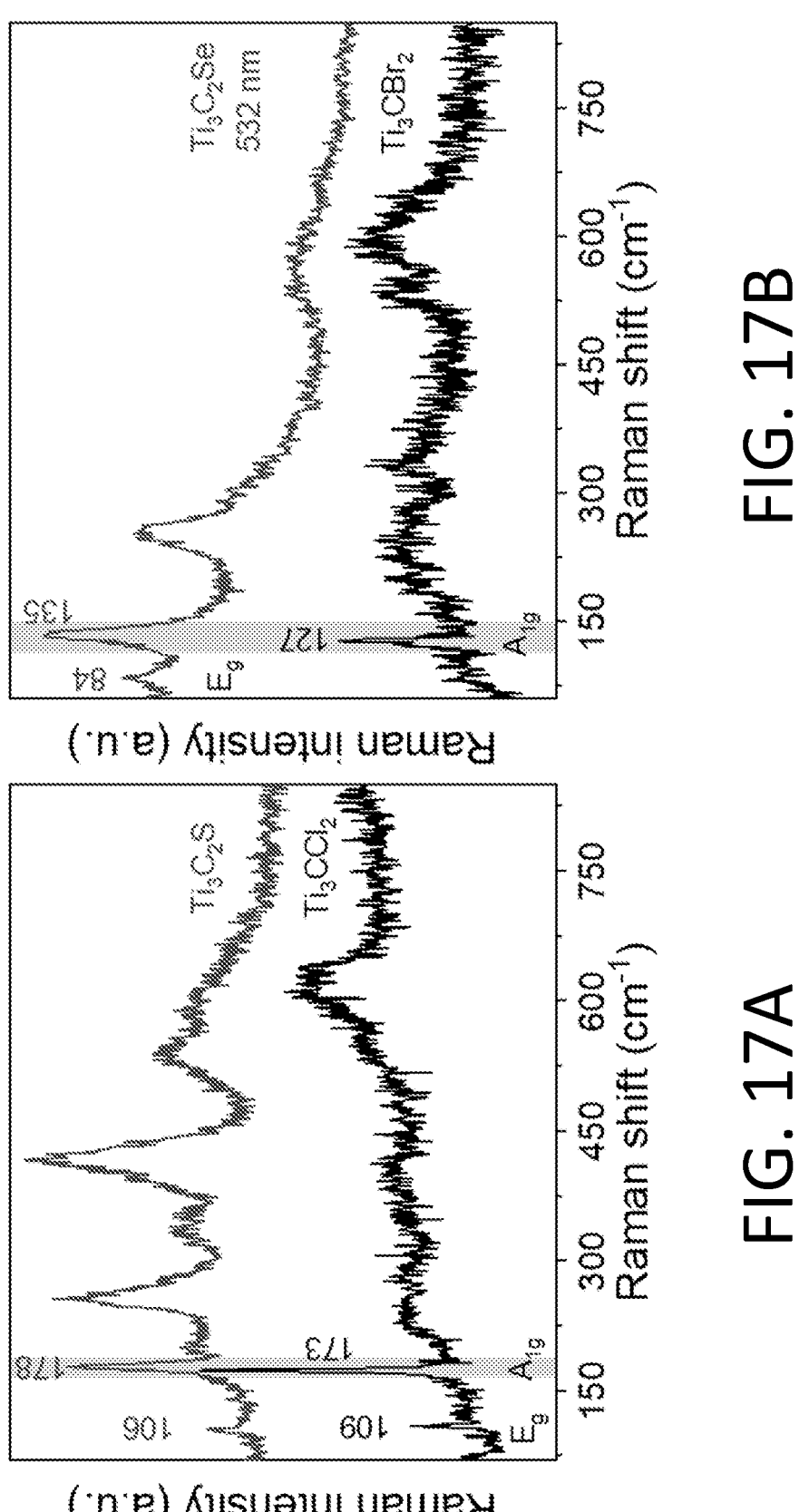
FIGS. 17A-17B show Raman spectra of $Ti_3C_2$ MXene functionalized with (FIG. 17A) Cl, S, and (FIG. 17B) Br, Se surface groups. The position of the $A_{1g}$ mode corresponding to the out-of-plane vibration of the surface groups is primarily determined by the atomic mass of the surface group with Br and Se resulting in lower frequencies than Cl and S. Similar trend holds for the $E_g$ mode corresponding to the in-plane vibration of the surface groups and outer Ti atoms.
Figures 19A, 19B:
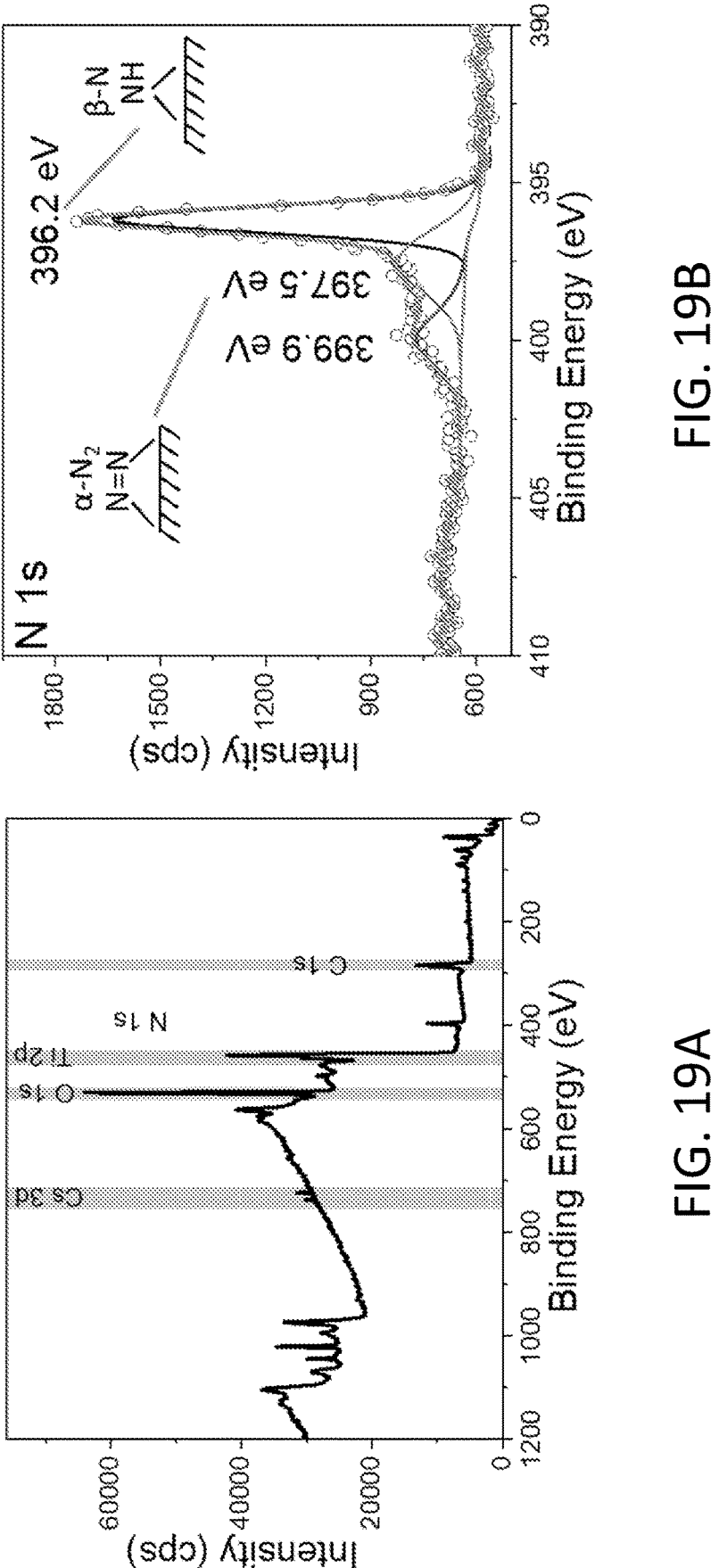
FIG. 19A-19B show XPS spectra of $Ti_3C_2(NH)$ MXene.
Figures 20A, 20B:
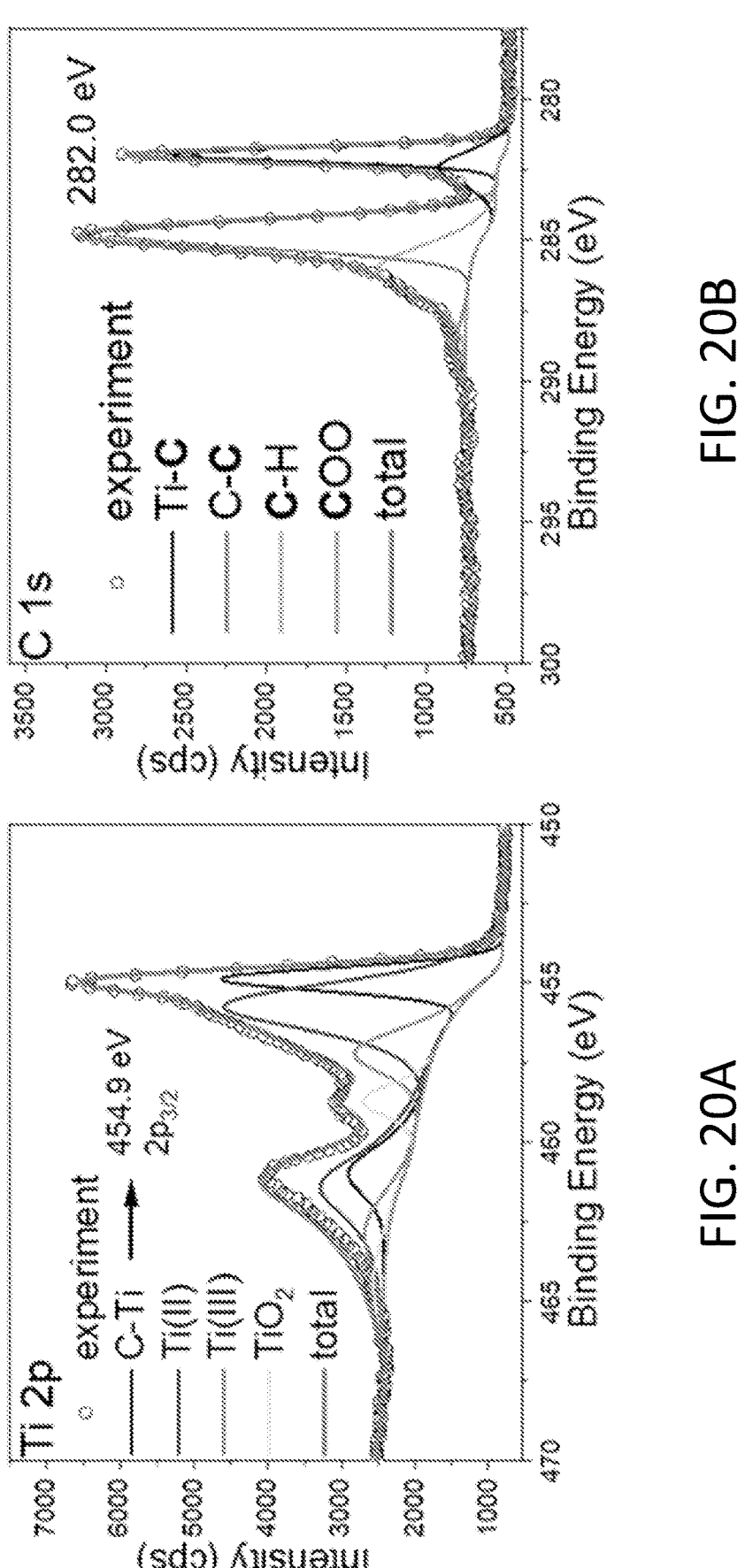
FIGS. 20A-20B show high resolution XPS spectra (see XPS section for fitting details) of $Ti_3C_2\square 2$ MXene. The Ti—C component binding energy of $Ti_3C_2Br_2$ MXene (FIGS. 14A-14F) shifts to a lower value after Br has eliminated with H$^-$.
Figures 21A, 21B, 21C:
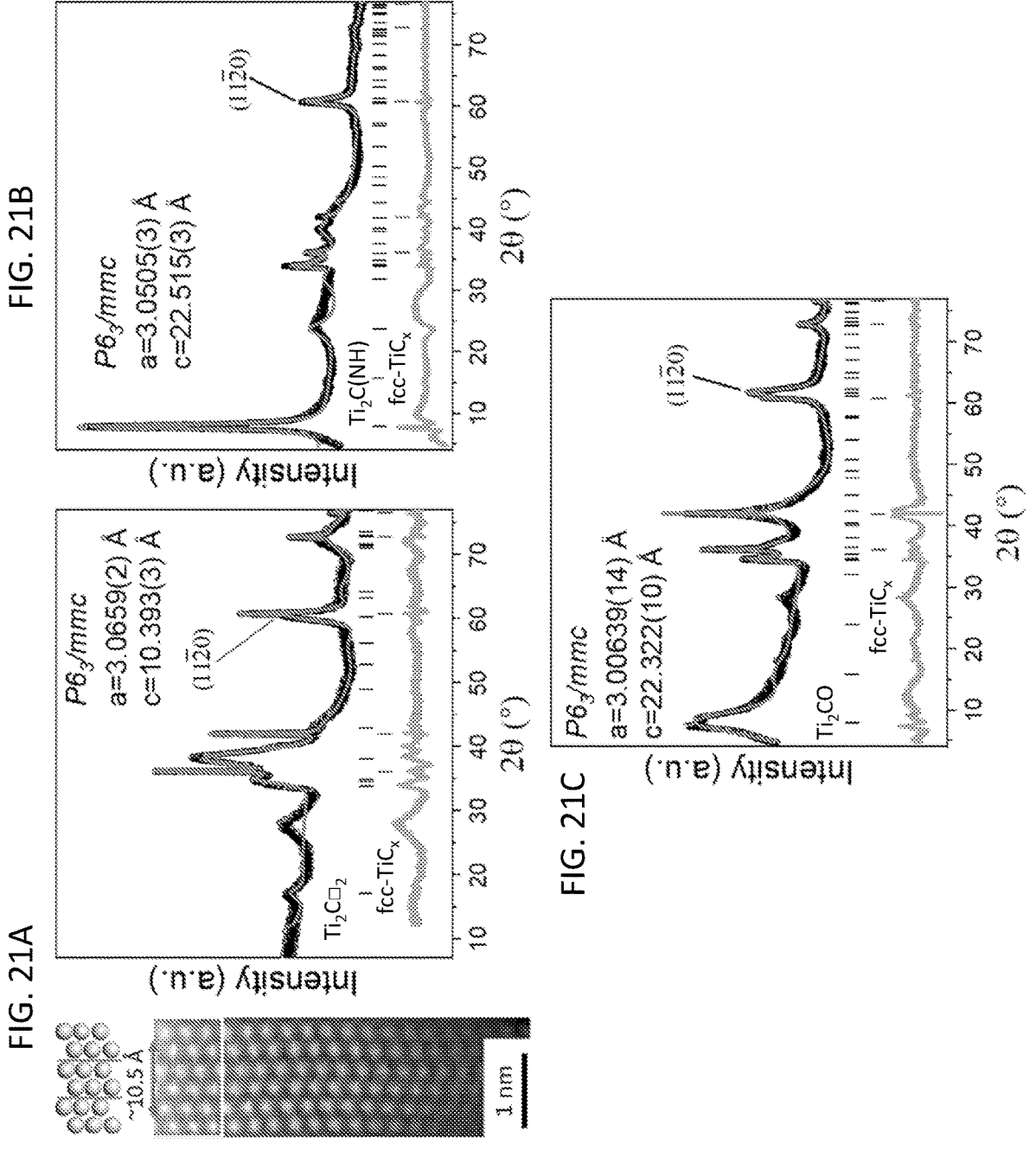
Figures 22A, 22B, 22C, 22D:
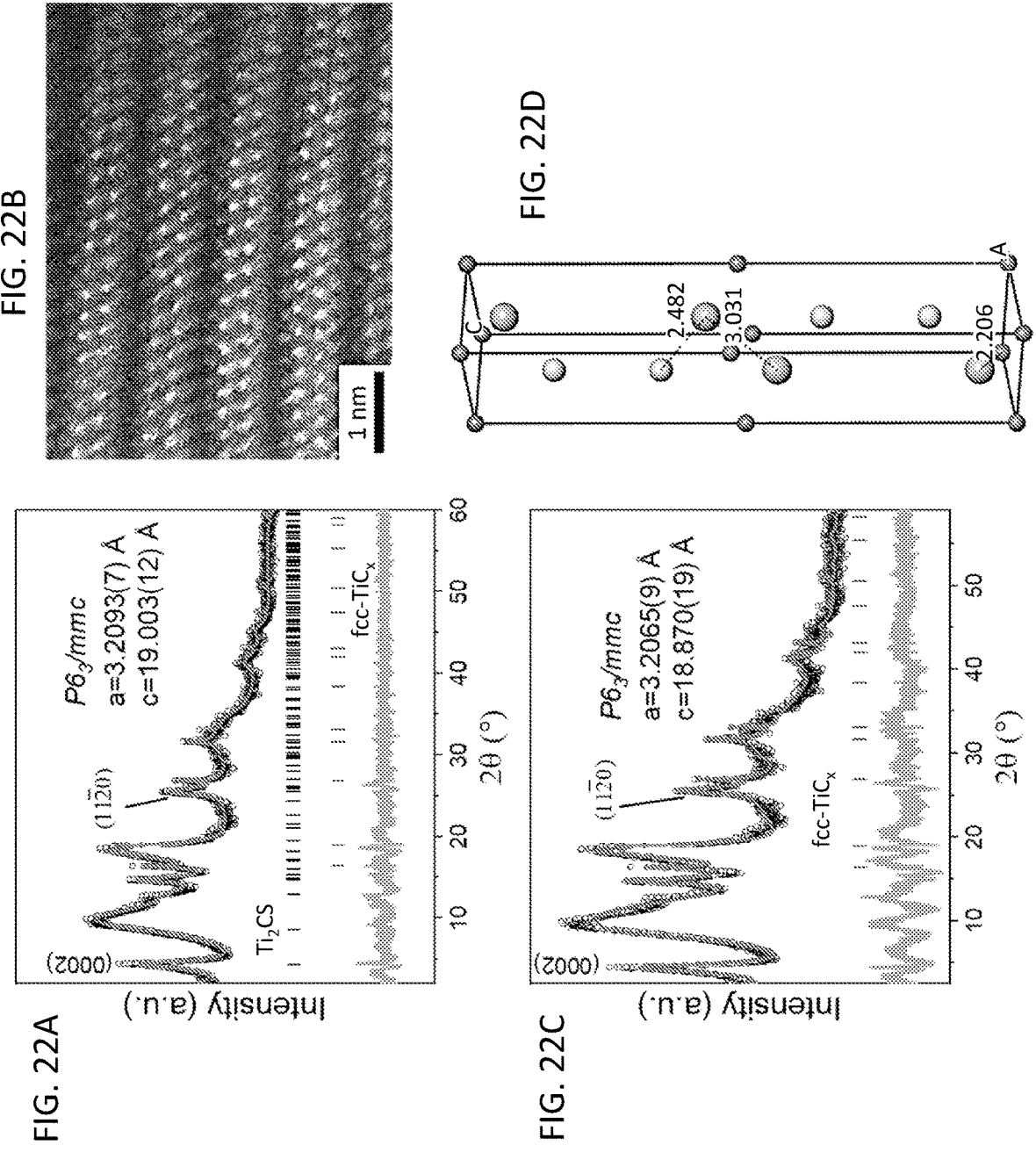
FIG. 22A shows an experimental XRD pattern (Mo K$\alpha$1, transmission, upper curve) and Le Bail fit (upper curve) of $Ti_2CS$ MXene.
FIG. 22B shows an atomically resolved STEM-HAADF image of $Ti_2CS$ MXene.
FIG. 22C shows an experimental XRD pattern (upper curve) and Rietveld refinement (overlapping upper curve) of $Ti_2CS$ MXene.
FIG. 22D shows a structure of $Ti_2CS$ MXene derived from FIG. 22C.
Figures 23A, 23B, 23C:
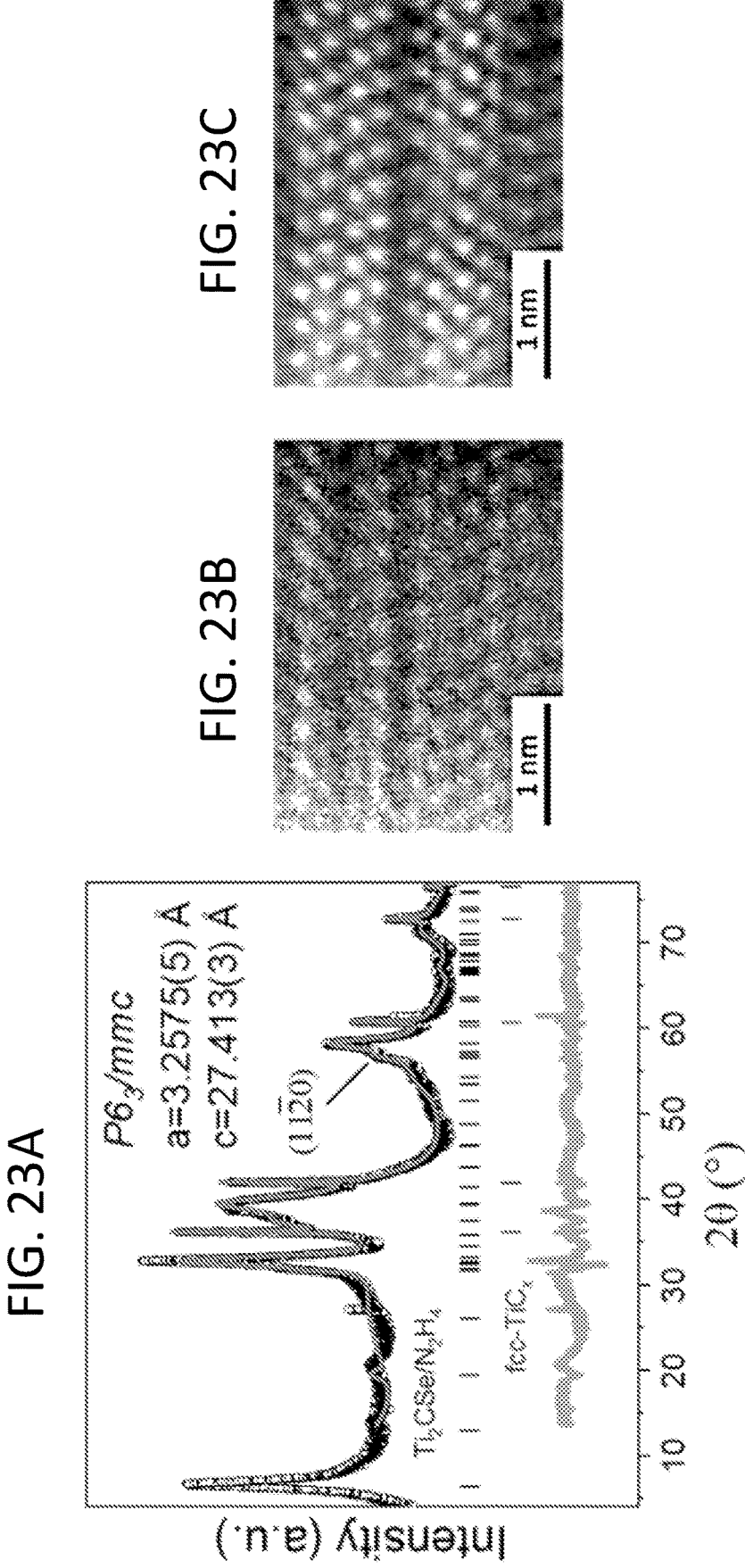
FIG. 23A shows an experimental XRD pattern (Cu K$\alpha$, reflection, upper curve) and Le Bail fit (overlapping upper curve) of $Ti_2CSe$ MXene recovered from the salt matrix using anhydrous hydrazine.
FIGS. 23B-23C show (FIG. 23B) HAADF and (FIG. 23C) LAADF images of $Ti_2CSe$ MXene.
Figures 26A, 26B:
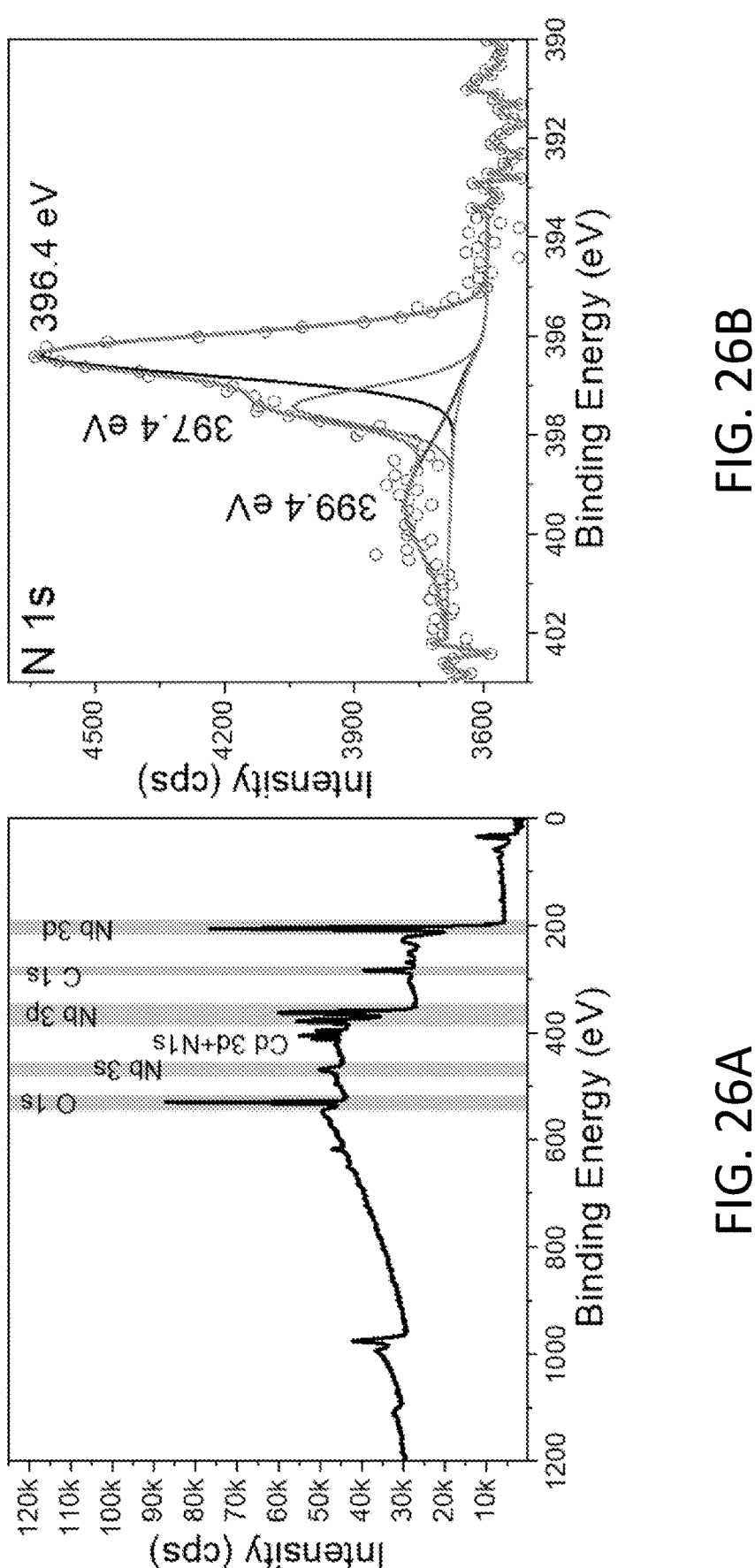
FIGS. 26A-26B show XPS spectra of $Nb_2C(NH)$ MXene.

MXene surface exchange reactions typically require temperatures of 300° C. to 600° C., which are difficult to achieve using traditional solvents. Therefore, molten alkali metal halides were used as solvents. For example, $Ti_3C_2Br_2$ MXene (FIG. 1A) dispersed in CsBr/KBr/LiBr eutectic (m.p. 236° C.) can react with $Li_2Te$ and $Li_2S$ to form new $Ti_3C_2Te$ (FIG. 1C and FIGS. 12A-12B, 13A-13B, and 14A-14F) and $Ti_3C_2S$ (FIG. 1D and FIG. 15) Mxenes, respectively. The reactions of $Ti_3C_2Cl_2$ and $Ti_3C_2Br_2$ with $Li_2Se$, $Li_2O$, and $NaNH_2$ yielded $Ti_3C_2Se$, $Ti_3C_2O$, and $Ti_3C_2(NH)$ MXenes, respectively (FIGS. 16A-16C, 17A-17B, 18A-18D, 19A-19B, and 20A-20B). Similar covalent surface modifications can be achieved for $Ti_2CCl_2$, $Ti_2CBr_2$, and $Nb_2CCl_2$ MXenes (FIG. 2A and FIGS. 21A-21C, 22A-22D, 23A-23C, 24A-24E, 25A-25D, 26A-26B, 27A-27D, 28, 29A-29B, and 30A-30E). The ability to perform surface exchange reactions on the thinnest MXenes demonstrates that the 2D sheets stayed intact during all stages of the transformation. The exact metal/surface group elemental ratios for new MXenes were close to the expected values, as summarized in Table 2. It should be noted that $Ti_3C_2T_n$ MXenes, where T is Cl, S, or NH, can be successfully delaminated into single layer individual sheets. (FIGS. 4A-4C and FIGS. 41, 42A-42D, 43A-43F, and 44A-44B).

TABLE 2

Summary of the metal to surface group (M/T) elemental ratios for the MXenes used in this example. EDX elemental mapping was performed in SEM (marked with *) and STEM. Light element (NH, O) terminated MXenes and bare MXenes are not included. XRF analysis was performed on the sample area of 79 mm$^2$.

| Material | M/T ratio EDX | M/T ratio XRF |
|---|---|---|
| $Ti_3C_2Cl_2$ | 3/1.9* | 3/1.5 |
| $Ti_3C_2Br_2$ | 3/1.8* | 3/1.8 |
| $Ti_3C_2S$ | 3/1.1 | 3/1.1 |
| $Ti_3C_2Se$ | 3/1.1 | 3/1.2 |
| $Ti_3C_2Te$ | 3/1.0 | 3/1.2 |
| $Nb_2CCl_2$ | 2/1.7* | 2/1.7 |
| $Nb_2CS_2$ | 2/1.6 | 2/1.7 |
| $Nb_2CSe$ | 2/1.0* | 2/1.0 |
| $Ti_2CCl_2$ | 2/1.7 | 2/1.5 |
| $Ti_2CBr_2$ | 2/1.6 | 2/2.0 |
| $Ti_2CS$ | 2/1.2* | 2/1.2 |
| $Ti_2CSe$ | 2/1.1* | 2/1.2 |
| $Ti_2CTe$ | 2/1.2 | 2/1.2 |

The reactions of $Ti_3C_2Br_2$ and $Ti_2CBr_2$ with LiH at 300° C. resulted in bare $Ti_3C_2\square 2$ (FIG. 1E and FIGS. 18A-18D) and $Ti_2C\square_2$ MXenes (FIGS. 21A-21C), where $\square$ stands for the vacancy site. Since H-terminations are difficult to reveal by STEM and other methods, this conclusion was based on the experimental value of the center-to-center distance between the $Ti_3C_2$ sheets (7.59 Å), which was substantially smaller than the theoretical prediction for $Ti_3C_2H_2$ MXene (8.26 Å) and close to the smallest theoretically possible spacing of 7.23 Å. Since XPS shows reduction of Ti after removal of the hydride groups (FIGS. 20A-20B), this process can be formally described as a reductive elimination step following the exchange reaction.

The chemical transformations of solids are generally impeded by slow diffusion, which severely limits the scope of synthesizable solid-state compounds. The complete exchange of surface groups in stacked MXenes was also expected to be kinetically cumbersome, especially if the entering ions are bulkier than the leaving ones, as in the case of $Cl^-$ (the ionic radius, $R_i$=1.81 Å) exchanged for $Te^{2-}$ ($R_i$=2.21 Å). Counterintuitively, the reactions of $Ti_3C_2Cl_2$ and $Ti_2CCl_2$ MXenes with $O^{2-}$, $S^{2-}$, $Se^{2-}$, and $Te^{2-}$ occurred at similar temperatures and with comparable reaction rates.

Figures 31A, 31B:
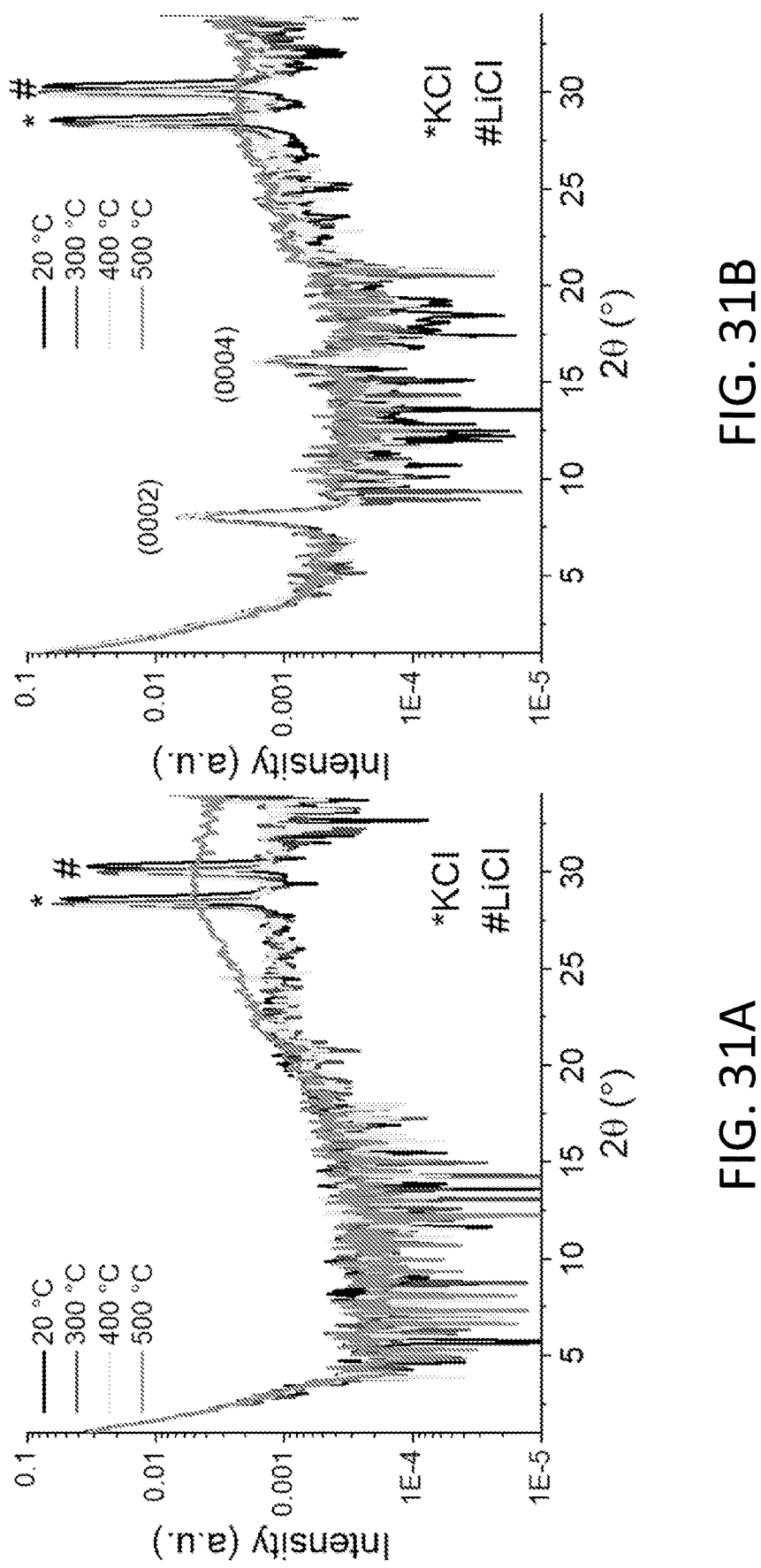

To understand this reactivity, the evolution of the (0002) diffraction peak corresponding to the center-to-center separation (d) between two adjacent MXene sheets was followed during surface exchange reactions. In the initial state, $Ti_3C_2Cl_2$ sheets formed stacks (FIGS. 6A-6E) with d=11.25 Å, and the van der Waals gap between MXenes is ~2.8 Å (FIG. 40), which is smaller than the dimensions of entering or leaving ions. No measurable changes of the d-spacing were detected upon heating $Ti_3C_2Cl_2$ in KCl—LiCl molten salt to 500° C. (FIGS. 31A-31B). However, heating MXene in the same molten salt but in the presence of $Li_2O$ resulted in d=13.2 Å (FIG. 32), which corresponds to a 4.7-6.3 Å gap between the surface atoms on adjacent MXene sheets, depending on the local surface terminations. A similar d=13.5 Å was observed during reaction of $Ti_3C_2Cl_2$ MXene with $Li_2Se$, although with a larger disorder (FIG. 33). The unstacking of MXene sheets in molten salts greatly facilitates diffusion of ions and makes MXene surfaces sterically accessible. The interaction potential of MXenes in a molten salt is likely to be similar to the interactions between inorganic nanoparticles dispersed in molten salts. For two parallel surfaces, surface-templated ion layering in a molten salt leads to an exponentially decaying oscillatory interaction energy. It was speculated that the free energy released in the surface exchange reaction caused MXene sheets to "swell" into one of the energy minima and stay in this state during chemical transformation.

Figure 28:
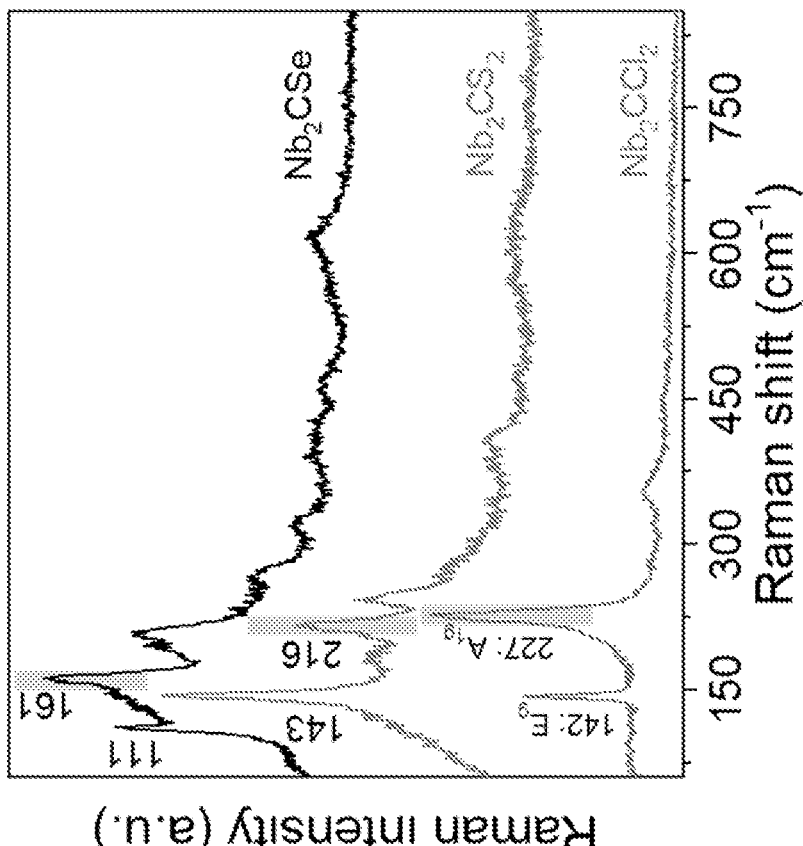
FIG. 28 shows Raman spectra of $Nb_2C$ MXene functionalized with Cl, S and Se surface groups. A trend similar to the case of functionalized $Ti_3C_2$ MXene (FIGS. 17A-17B) was observed: the position of the $A_{1g}$ and $E_g$ mode is primarily determined by the atomic mass of the surface group with Se resulting in lower frequencies than Cl and S.
Figures 29A, 29B:
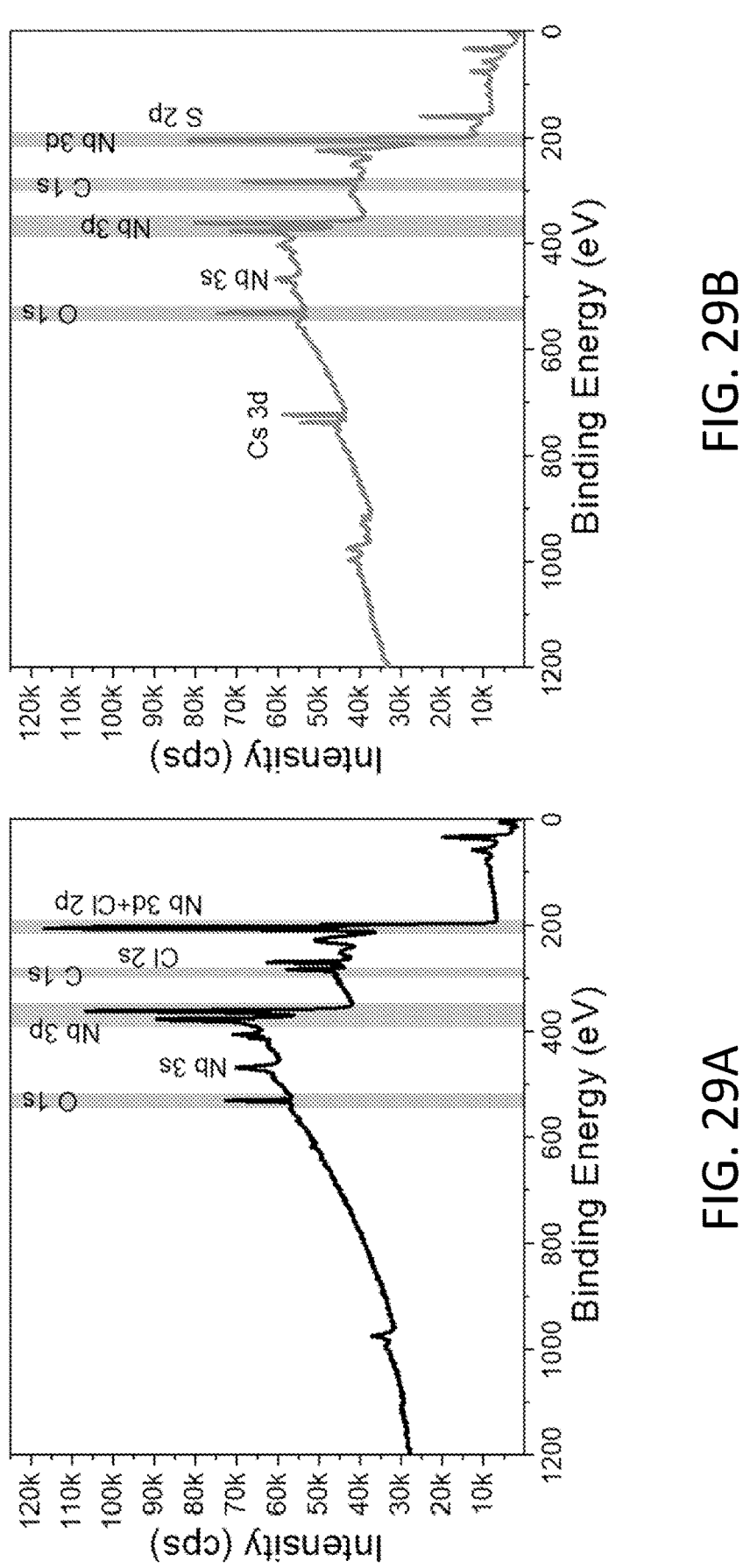
Figures 30A, 30B:
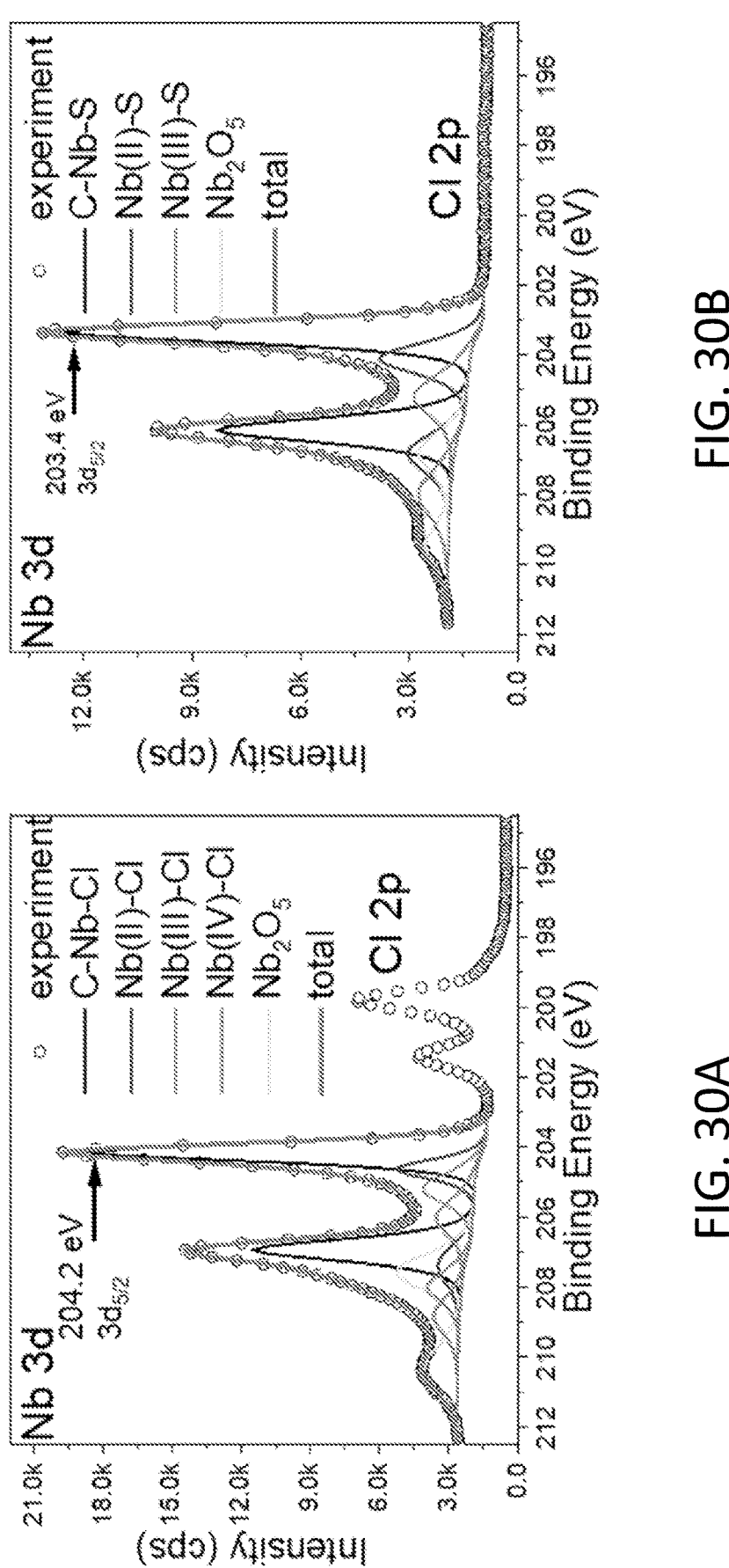
Figures 30C, 30D, 30E:
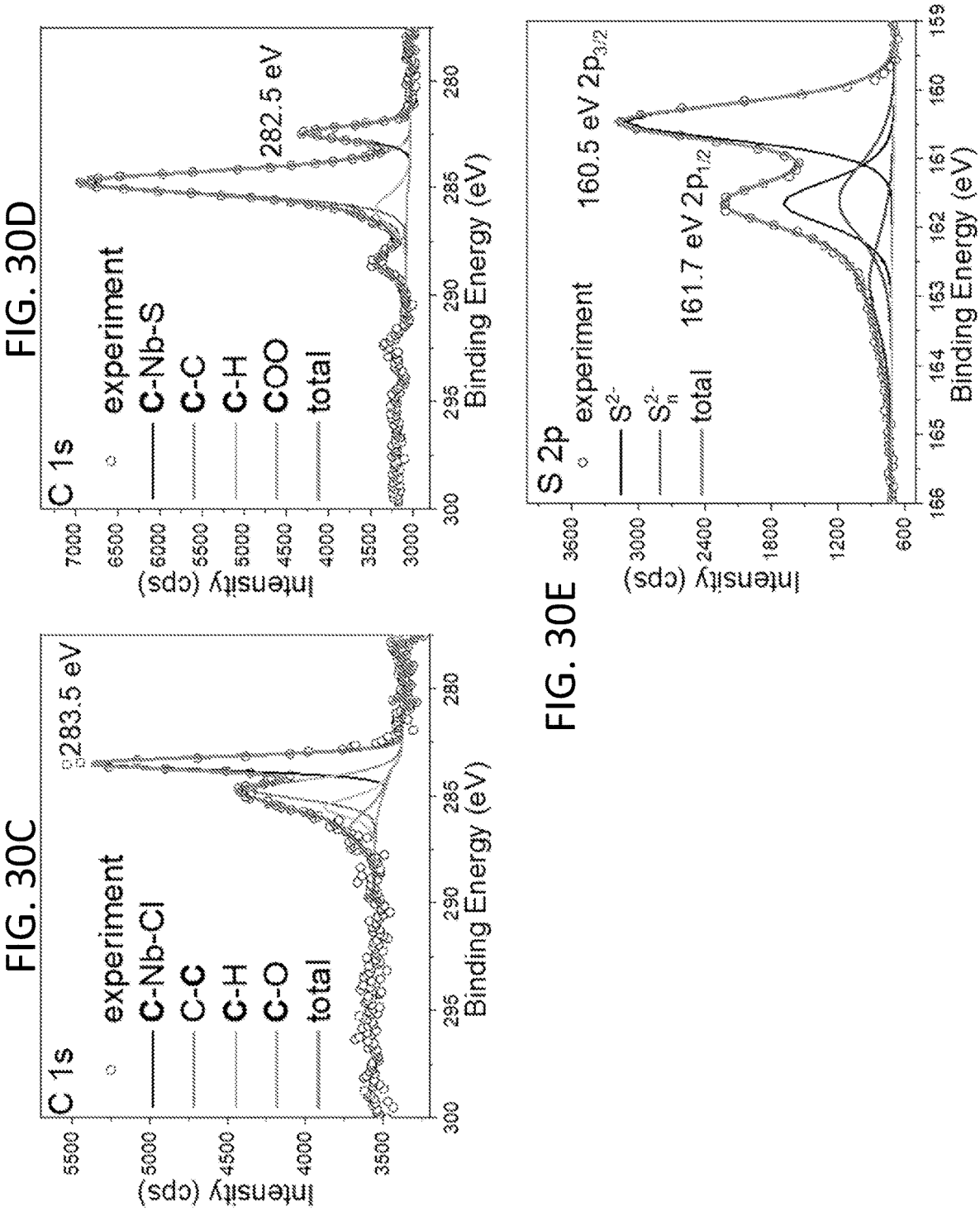

Moreover, the nature of the surface groups had an unusually strong impact on the MXene structure. The XRD patterns of $Ti_3C_2T_n$ and majority of $Ti_2CT_n$ MXenes were modeled using the space group of the parent $Ti_3AlC_2$ and $Ti_2AlC$ MAX phases (P6$_3$/mmc)=. Due to the simpler structure of thinner $Ti_2CT_n$ MXenes, their representative XRD patterns were further modeled using the Rietveld refinement. The fitting of the experimental Fourier-transformed EXAFS functions of $Ti_2CT_n$ MXenes (FIG. 2A) demonstrated that the local structure around Ti atoms was consistent with the respective crystallographic models. The real space interatomic PDFs, G(r), showed systematic shifts of Ti-T and Ti—$Ti_2$ distances to larger values in S to Te series of $Ti_2CT_n$ MXenes (FIG. 2A). In MXenes, Ti—$Ti_2$ distance is equal to the nearest-neighbor distance between Ti atoms in the basal (0001) plane and hence it represents the in-plane lattice constant (FIGS. 2B, 2C). For example, for $Ti_2CBr_2$ the Rietveld, EXAFS, and PDF methods converged on a=3.32 Å. After exchanging $Br^-$ for $O^{2-}$, the resultant MXene showed a=3.01 Å, and the reaction with $Te^{2-}$ produced MXene with a=3.62 Å (FIG. 2C). The simulated XRD patterns of $Ti_2CT_n$ MXenes suggest that large $Te^{2-}$ groups are likely positioned on top of the neighboring Ti atoms (FIG. 2D, FIG. 28). This is distinctively different from the MXenes with smaller surface groups which are positioned between hexagonally-packed Ti surface atoms, on top of the opposite Ti atoms of the same $Ti_2CT_n$ sheet (FIG. 2B).

The vdW radii and packing density of surface atoms had a huge effect on a (FIG. 2C). For comparable ion radii, e.g., S vs. Cl and Se vs. Br, halido-terminated MXenes showed larger a, likely because of the smaller number of chalcogenide ions required for charge compensation of the MXene surface. To estimate the in-plane strain ($\epsilon_\parallel$) imposed on the titanium carbide lattice by surface groups in the new MXene species, a was compared to the nearest-neighbor distance between Ti atoms in (111) plane of bulk cubic TiC that is structurally equivalent to the basal (0001) MXene plane. For $Ti_3C_2T_n$ and $Ti_2CT_n$ MXene families, the mixed ($T_x$=F, O, OH) and pure $O^{2-}$ terminations resulted in a compressive $\varepsilon_H$. Bare ($\square$) and NH-terminated MXenes were nearly strain-free, whereas Cl, S, Se, and Br-terminated MXenes all had tensile $\varepsilon_\parallel$. The thinner $Ti_2CT_n$ MXenes had, on average, a slightly larger in-plane expansion or contraction with respect to the bulk TiC lattice, compared to the thicker $Ti_3C_2T_n$ MXenes. The $Ti_2CTe$ MXene (FIGS. 2A, 2C and FIGS. 24A-24E) had the largest magnitude of tensile $\varepsilon_\parallel$ of 18.2% in accordance with $Te^{2-}$ having the largest vdW radius among all groups used in this example. This degree of lattice expansion in a crystalline solid is very unusual. For comparison, the lattice of bulk TiC expands by "only" 2.5% when heated from room temperature to 2700° C.

Figure 40:
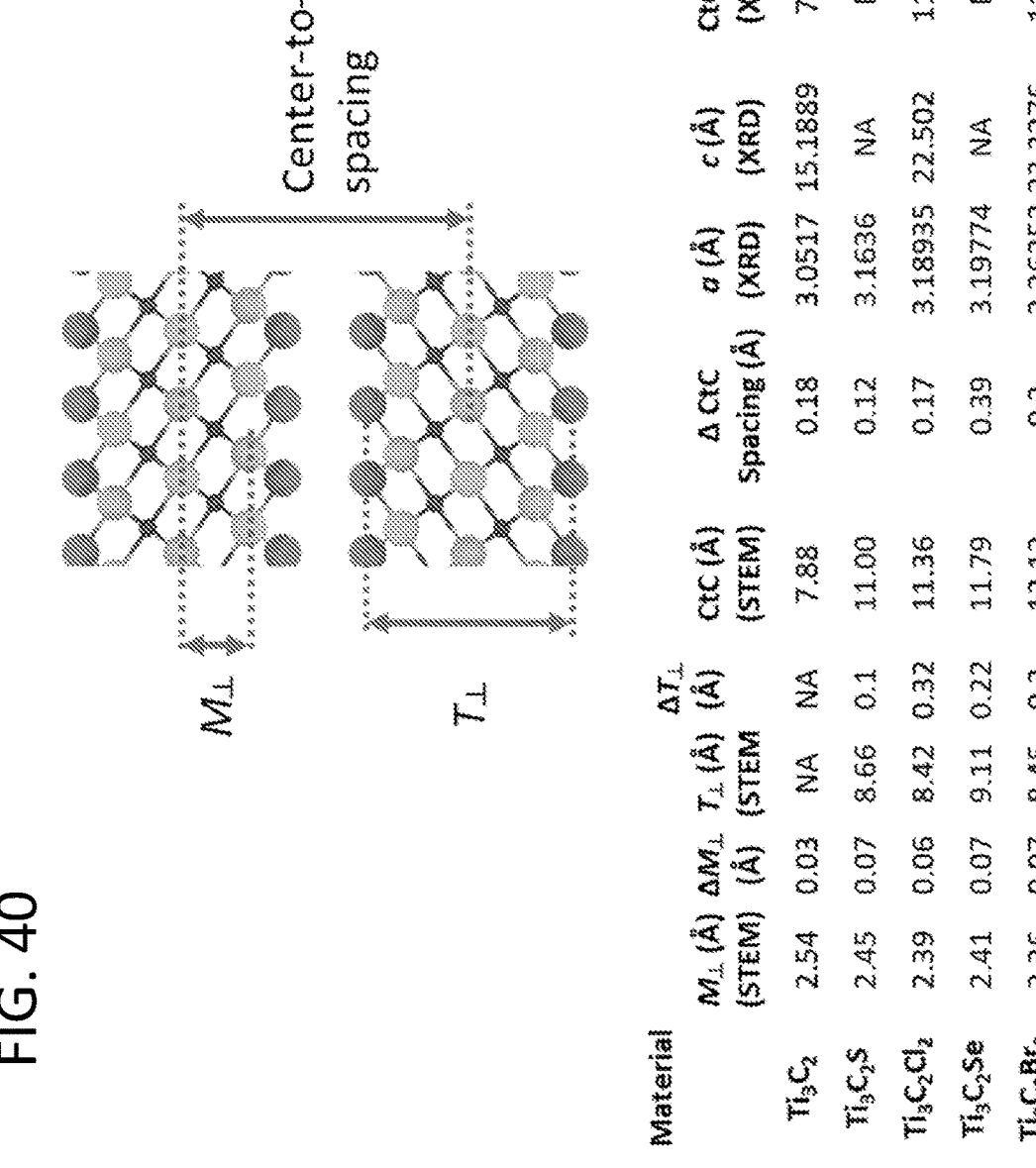
FIG. 40 shows a summary of the STEM and XRD derived lattice parameters, interatomic and center-to-center (CtC) interlayer distances for $Ti_3C_2T_n$ MXenes. The strain paraments ($\varepsilon_\perp$, $E_\parallel$) and Poisson ratios ($v$) were calculated according to Equations (3)-(5). The XRD CtC distances are not available for S, Se, and Te functionalized MXenes due to the presence of intercalated $N_2H_4$ solvent.
Figure 41:
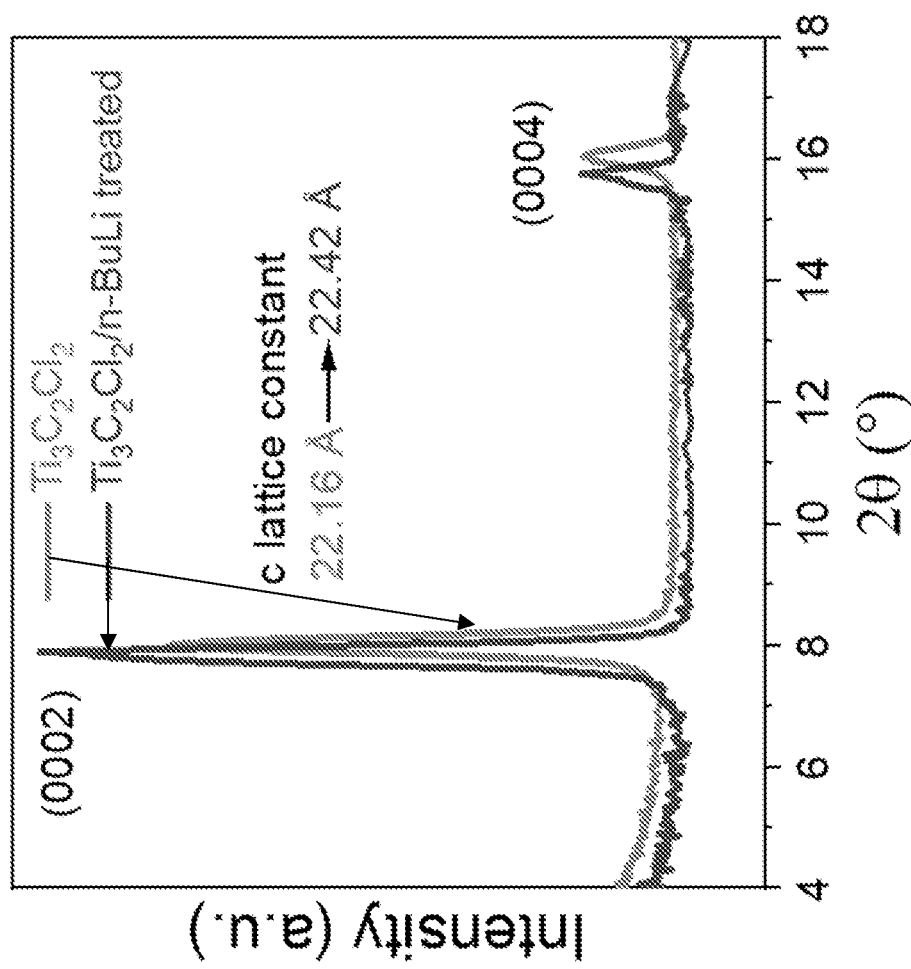
FIG. 41 shows WAXS patterns of the multilayer and $Li^+$ intercalated $Ti_3C_2Cl_2$ MXene. The c-lattice parameter expands after $Li^+$ intercalation. Similar interlayer expansion was observed in case of intercalation of desolvated $Li^+$ between the MXene layers during cyclic voltammetry experiments.
Figures 42A, 42B, 42C, 42D:
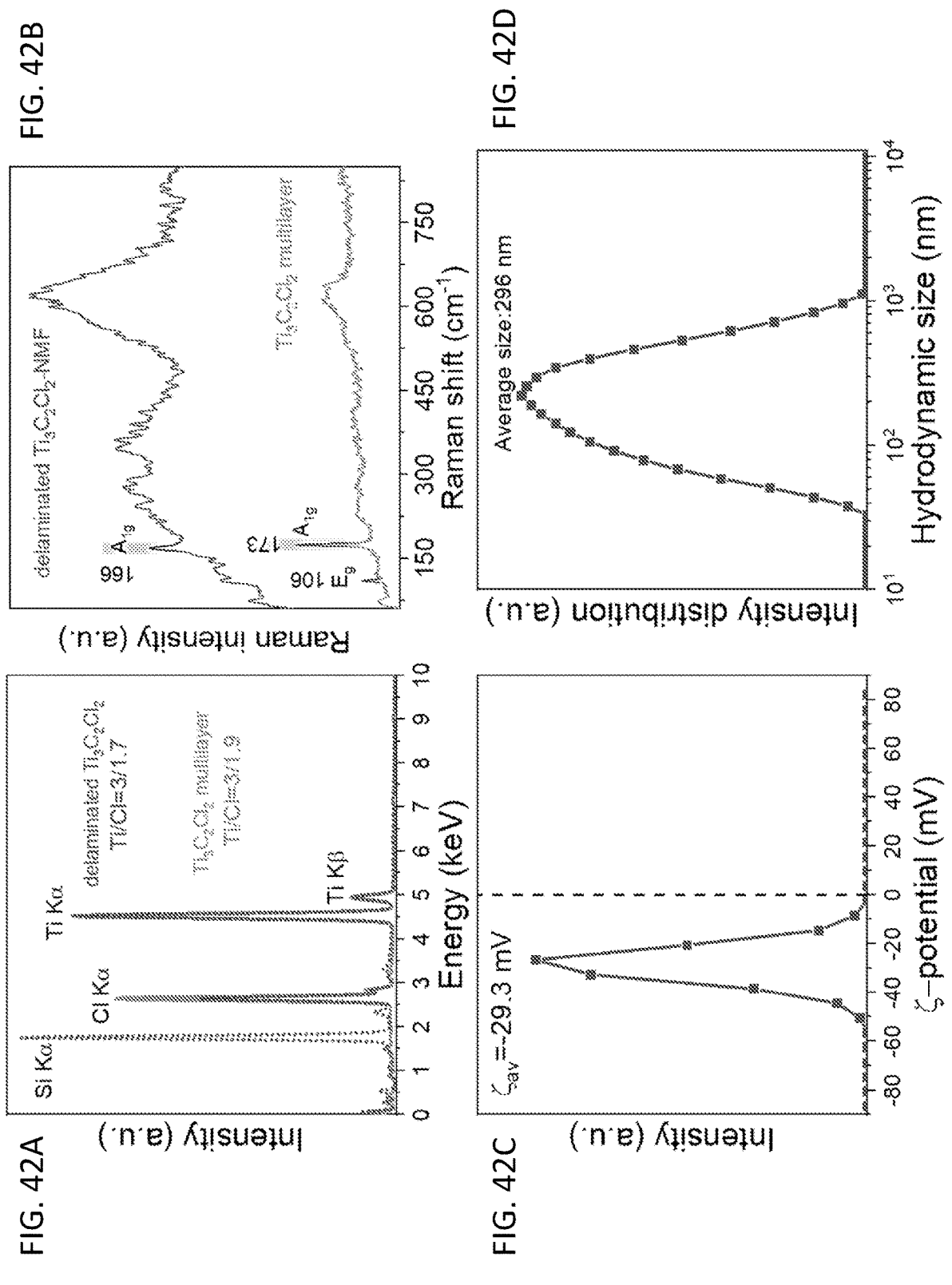
FIGS. 42A-42D show characterization of delaminated $Ti_3C_2Cl_2$ MXene.
Figures 43A, 43B:
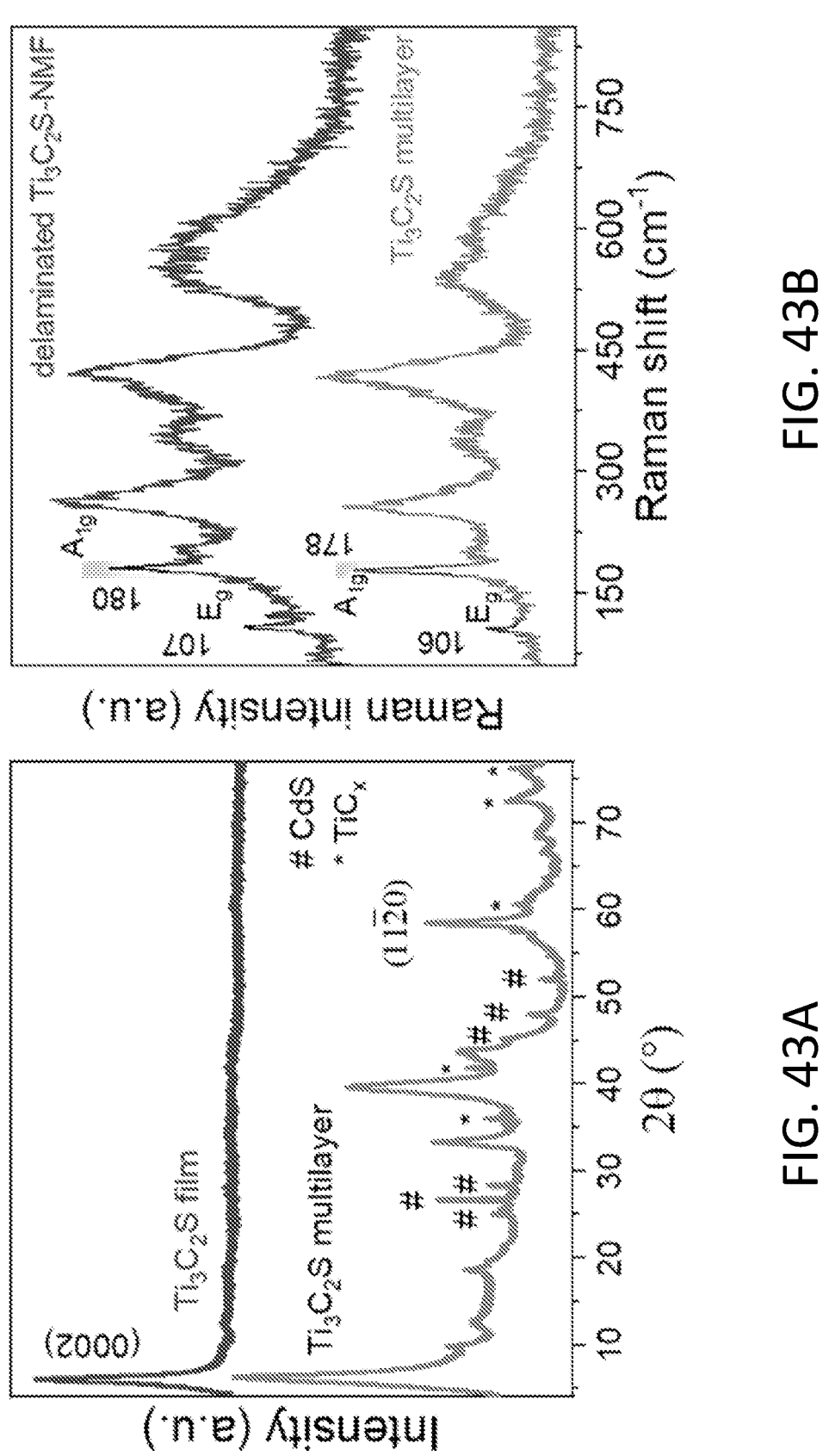
FIG. 43A shows XRD patterns of delaminated and multilayer $Ti_3C_2S$ MXene. The MXene film does not contain $TiC_x$ and CdS impurities present in the multilayer sample. The film's XRD pattern contains only (0002) peak consistent with most flakes aligned parallel to the substrate.
FIG. 43B shows the Raman spectrum of delaminated $Ti_3C_2S$ flakes still contains $A_{1g}$ and $E_g$ peaks associated with the vibration of surface S groups.
Figures 43C, 43D, 43E, 43F:
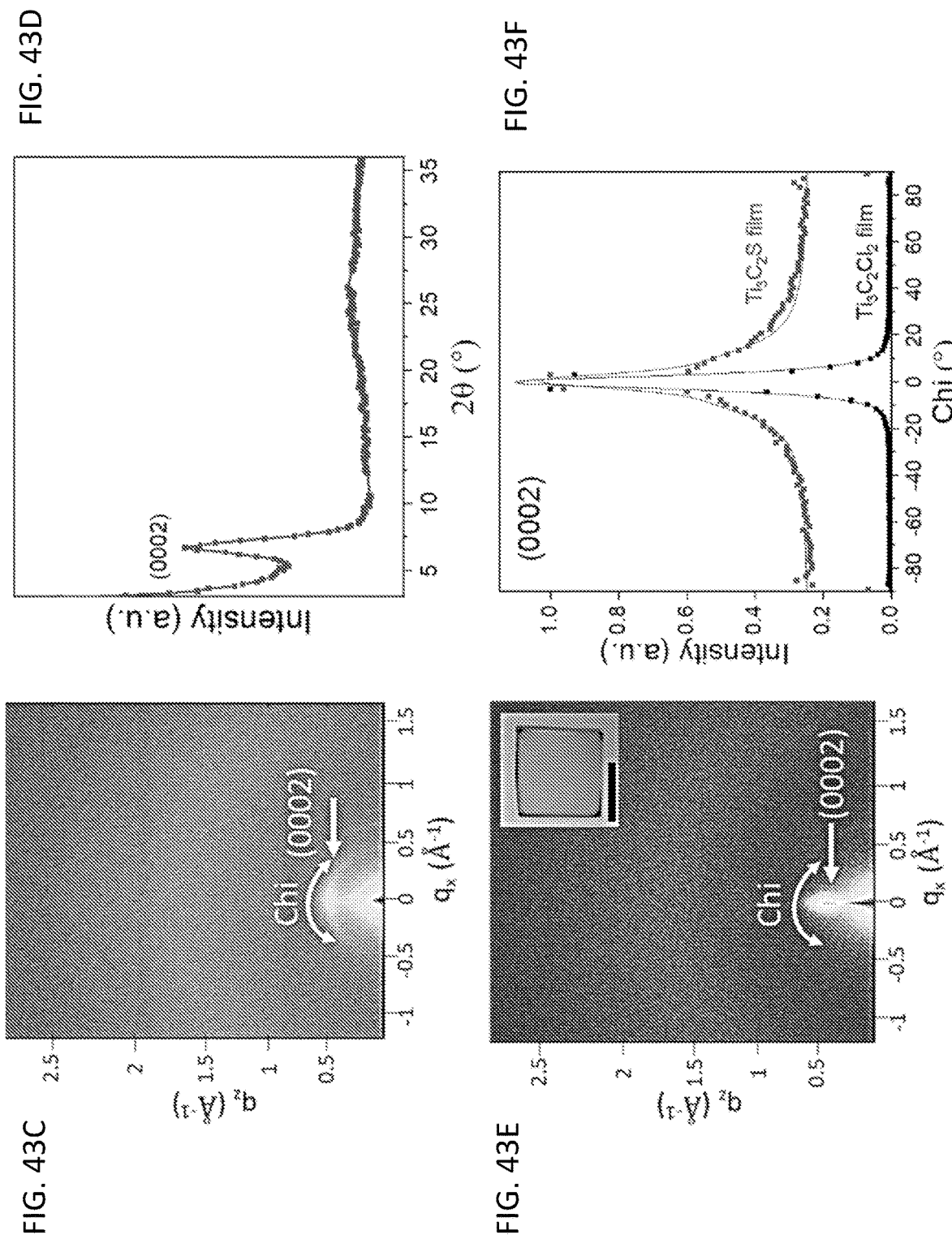
FIG. 43C shows 2D GIWAXS pattern of $Ti_3C_2S$ MXene film.
FIG. 43D shows 1D line cut along $q_z$ of the 2D GIWAXS pattern shows a (0002) peak similar to that in FIG. 43A.
FIG. 43E shows 2D GIWAXS pattern of $Ti_3C_2Cl_2$ MXene film. Inset: a photograph of spin casted film on a glass substrate (scale bar 1 cm).
FIG. 43F shows chi integrated intensity for $Ti_3C_2S$ MXene film does not decay to 0 as in case of $Ti_3C_2Cl_2$ MXene film. This suggests that $Ti_3C_2S$ MXene flakes are not as well aligned as $Ti_3C_2Cl_2$ flakes.
Figures 44A, 44B:
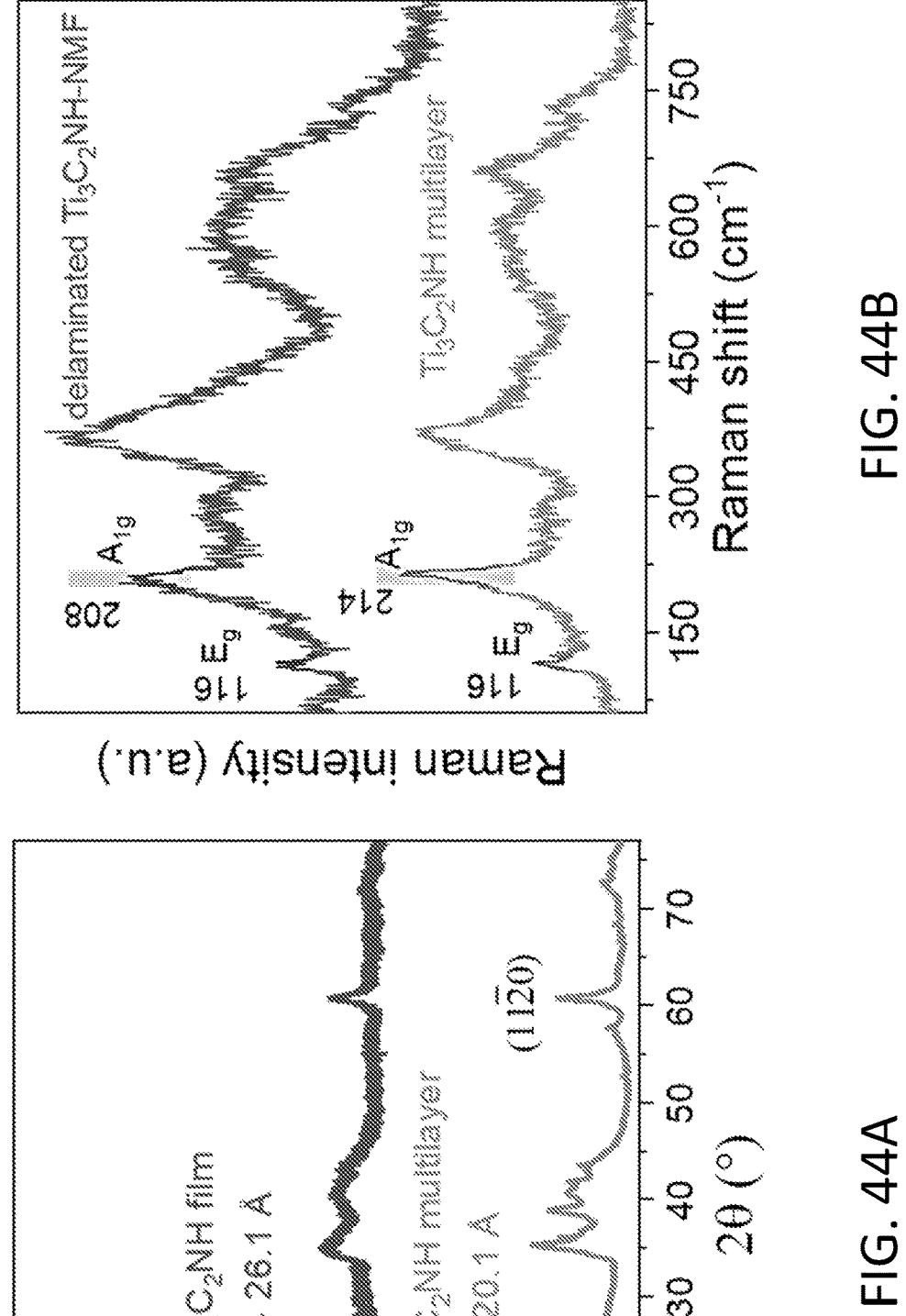
FIG. 44A shows XRD patterns of delaminated and multilayer $Ti_3C_2NH$ MXene. (0002) peak is shifted to a lower angle in case of $Ti_3C_2NH$ film, consistent with NMF intercalation. However, presence of ($10\bar{1}1$) and ($11\bar{2}0$) peaks suggests incomplete alignment of the flakes parallel to the substrate.
FIG. 44B shows the Raman spectrum of delaminated $Ti_3C_2NH$ MXene still contains $A_{1g}$ and $E_g$ peak associated with the vibration of surface NH groups.

Since the out-of-plane (c) lattice constant is strongly affected by the intercalation of ions and solvent molecules between MXene sheets, high-resolution STEM images were used to assess the distances between the Ti planes along the c axis of the unit cell (FIG. 40). The magnitude of the out-of-plane strain in the MXene core ($\varepsilon_\perp$) can be calculated by referencing experimental distances between Ti planes inside the MXene sheets ($M_\perp$) to the distance between the (111) planes of bulk TiC (FIG. 40). FIG. 2E shows that the expansion of the a-lattice parameter in $Ti_3C_2T_n$ MXenes functionalized with S, Cl, Se, Br, and Te atoms is accompanied by the corresponding contraction of the $Ti_3C_2$ layers along the c axis. This observation is consistent with the behavior of the $Ti_3C_2$ layers as an elastic 2D sheet under biaxial stress imposed by the surface atoms (FIG. 2E). The Poisson effect can account for the relations between the stress and the strain components reflected by observed changes of a and $M_\perp$ distances. Unfortunately, the atomic-resolution STEM images of MXenes measured $M_\perp$ values with relatively large error bars (due to projection effects and bending of the MXene sheets) which complicated an accurate estimation of the Poisson's ratio (v) for new MXenes. A simple elastic model applied to $Ti_3C_2T_n$ yielded v~0.22 for T=S and Br. On the other hand, $Ti_3C_2Te$ showed v=0.16±0.06, likely due to the additional stiffening of the $Ti_3C_2$ layers under very large in-plane stress.

Figures 35A, 35B, 35C:
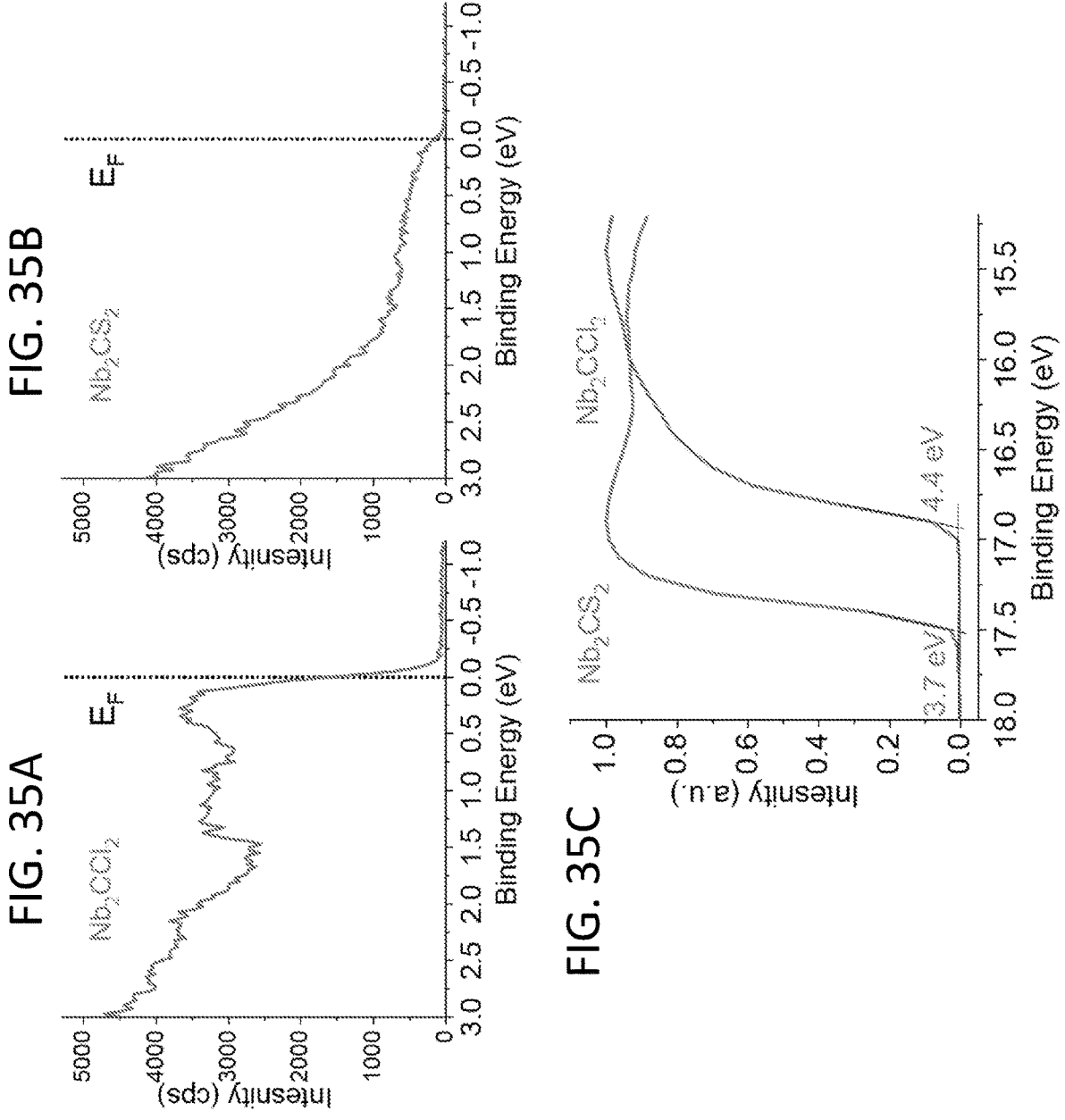
FIGS. 35A-35C show UPS spectra of the valence band region of (FIG. 35A) $Nb_2CCl_2$ and (FIG. 35B) $Nb_2CS_2$. There is finite density of states at the Fermi level (set to 0 eV) at non-zero temperature suggesting metal-like behavior for both MXenes.
Figure 36:
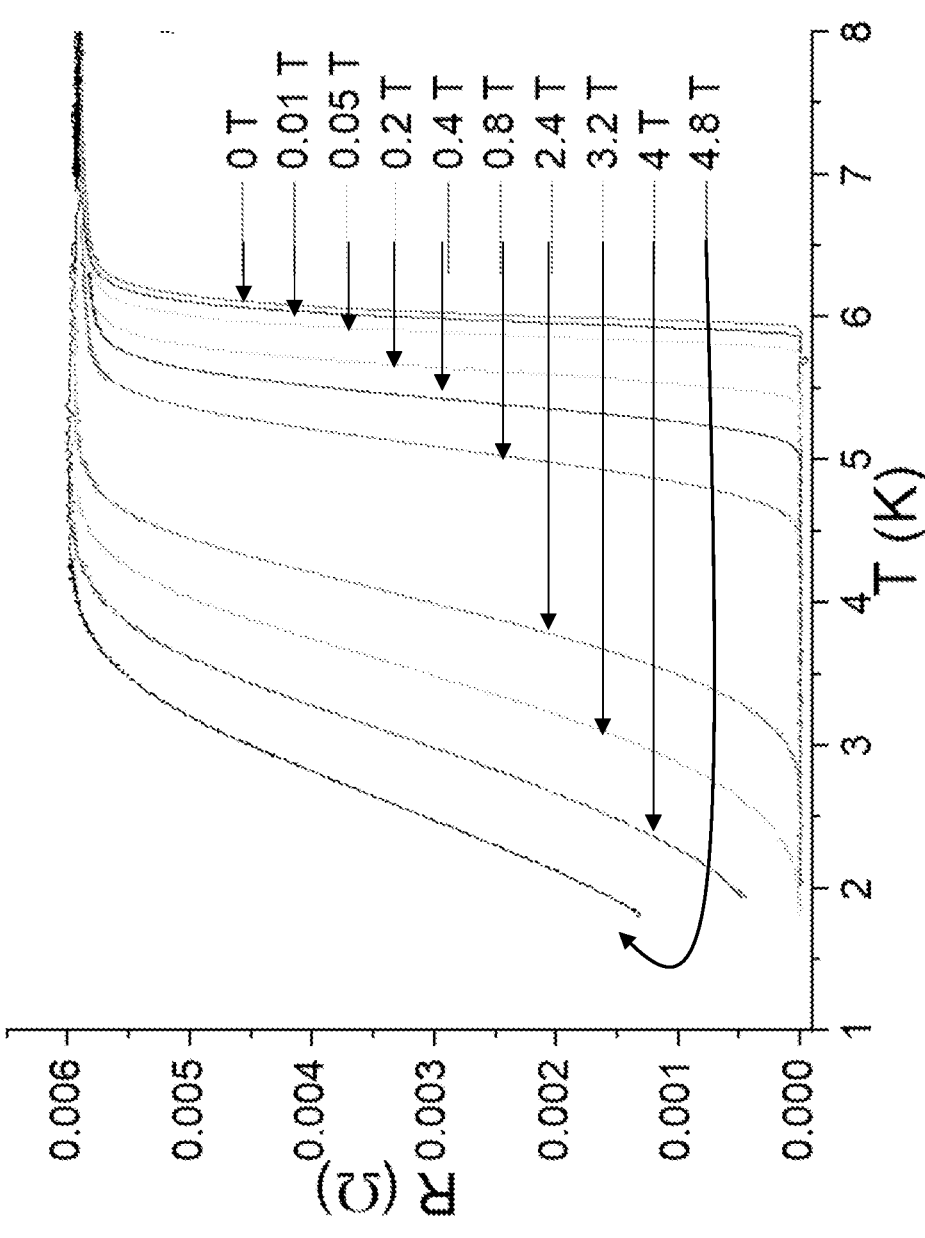
FIG. 36 shows resistance as a function of temperature at different applied magnetic fields (0 to 4.8 T) for the cold pressed pellet of $Nb_2CCl_2$ MXene. The $T_c$ shifts to lower temperature with the increase in the magnetic field.
Figure 37:
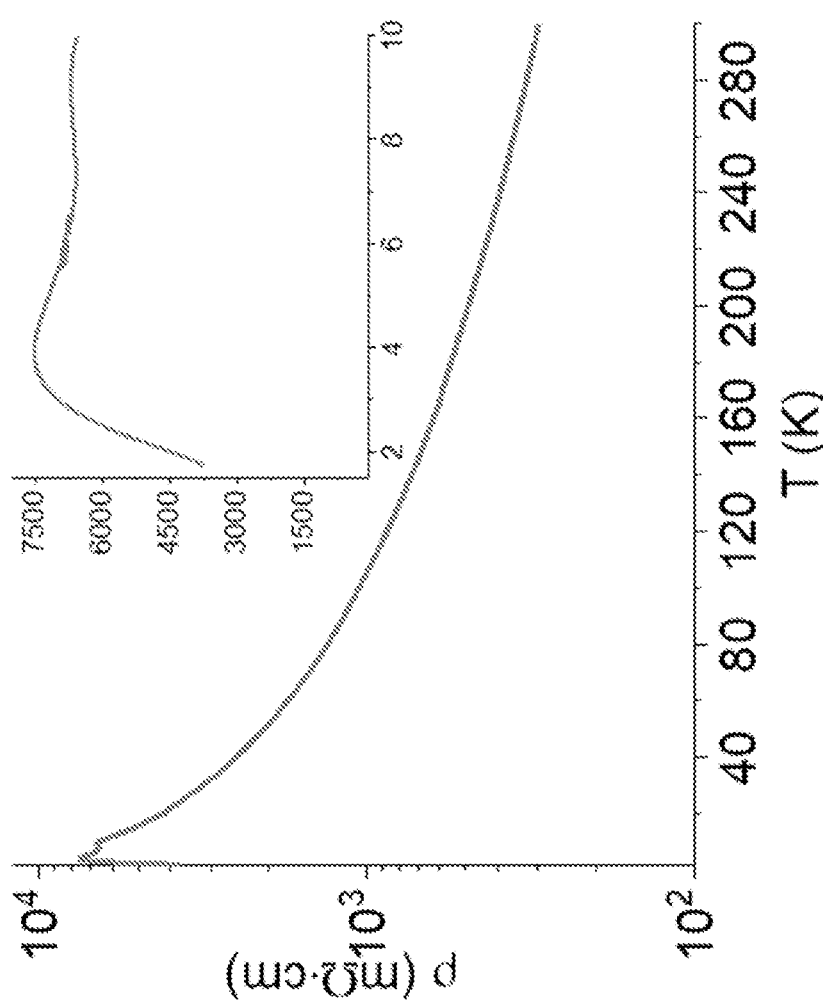
FIG. 37 shows resistivity as a function of temperature for the cold pressed pellet of $Nb_2CT_x$ MXene.

The above examples show that the composition and structure of MXenes can be engineered with previously unattainable versatility. Next, this example shows that the surface groups define the nature of electronic transport in $Nb_2CT_n$ MXenes. FIGS. 3A-3B show temperature-dependent four-probe resistivity ($\rho$) measured on cold-pressed pellets of $Nb_2CT_n$ (T=$\square$, Cl, O, S, Se) MXenes, all synthesized by the procedures described herein. FIG. 3A also compares the conductivity of the parent $Nb_2AlC$ MAX phase with that of $Nb_2CCl_2$ MXene. Above 30 K, both MAX phase and MXene samples show similar specific resistivity, which decreased when the sample was cooled. Such behavior is often associated with metallic conductivity. The ultraviolet photoelectron spectroscopy (UPS) confirms nonzero density of electronic states at the Fermi energy $E_F$ (FIGS. 35A-35C), which is consistent with the metallic behavior. When the $Nb_2CCl_2$ MXene was cooled below 30 K, the resistivity started increasing, possibly due to the beginning of localization. This was followed by a sharp drop of resistivity by several orders of magnitude at a critical temperature $T_c$~6.0 K (FIG. 3A), which is reminiscent of a superconductive transition. The magnetic susceptibility measurements show the development of a strong diamagnetism below 6.3 K interpreted as the Meissner effect. From the magnitude of zero-field-cooled data at 1.8 K, the lower bound was estimated for the superconducting volume fraction of $Nb_2CCl_2$ MXene as ~35%. Consistent with superconductivity, the transition broadened, and $T_c$ shifted to lower temperatures with the application of external magnetic field (FIG. 36). In contrast, the parent $Nb_2AlC$ MAX phase behaved as a normal metal down to the lowest measured temperature (1.8 K). To the best of the inventors' knowledge, this is the first experimental observation of superconductivity in top-down fabricated MXenes. For reference, $Nb_2CT_x$ MXene with mixed O, OH, F termination prepared by the traditional aqueous HF etching route showed two orders of magnitude higher resistivity and no superconductivity (FIG. 37).

Figures 38A, 38B:
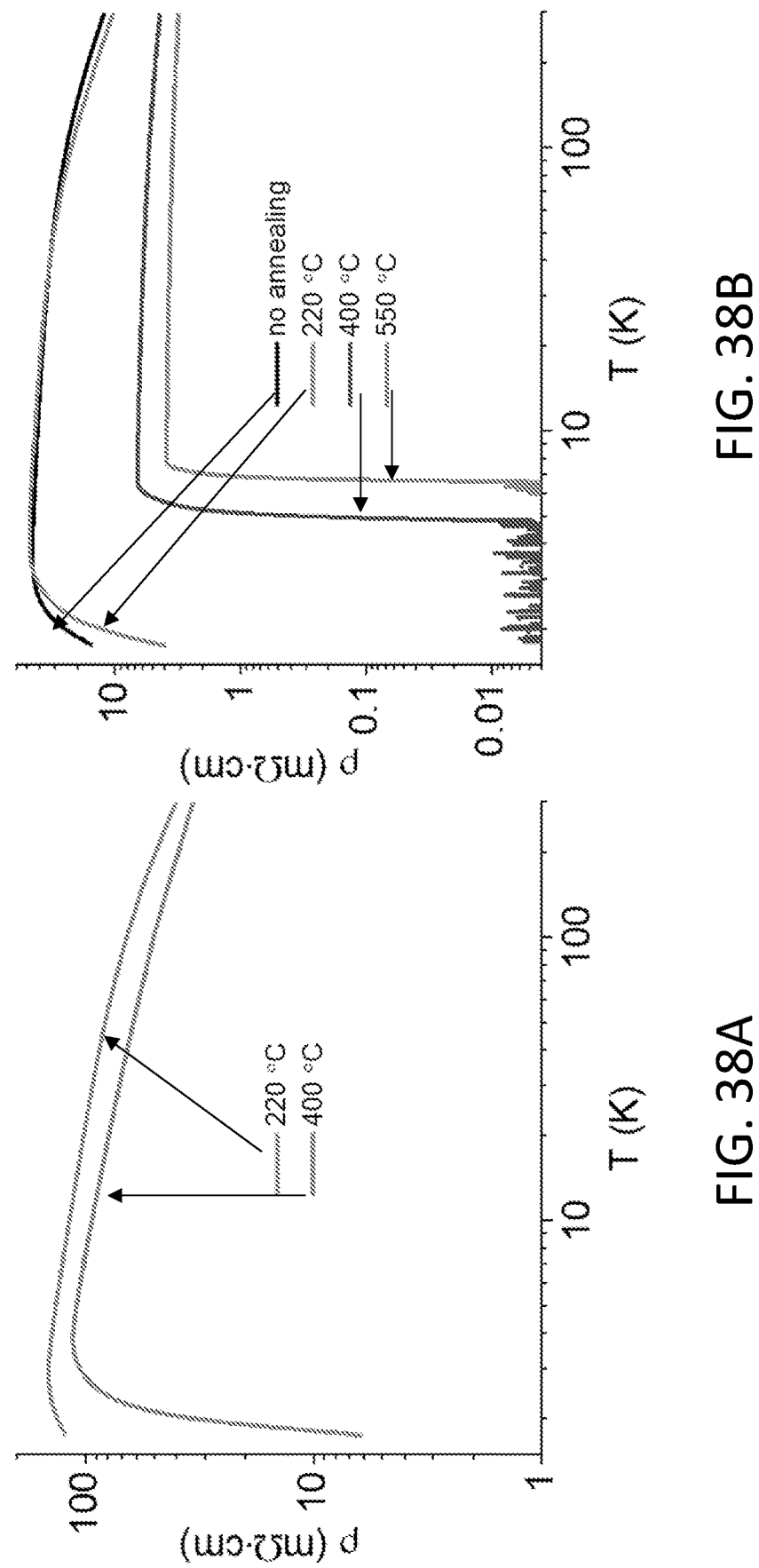
Figure 39:
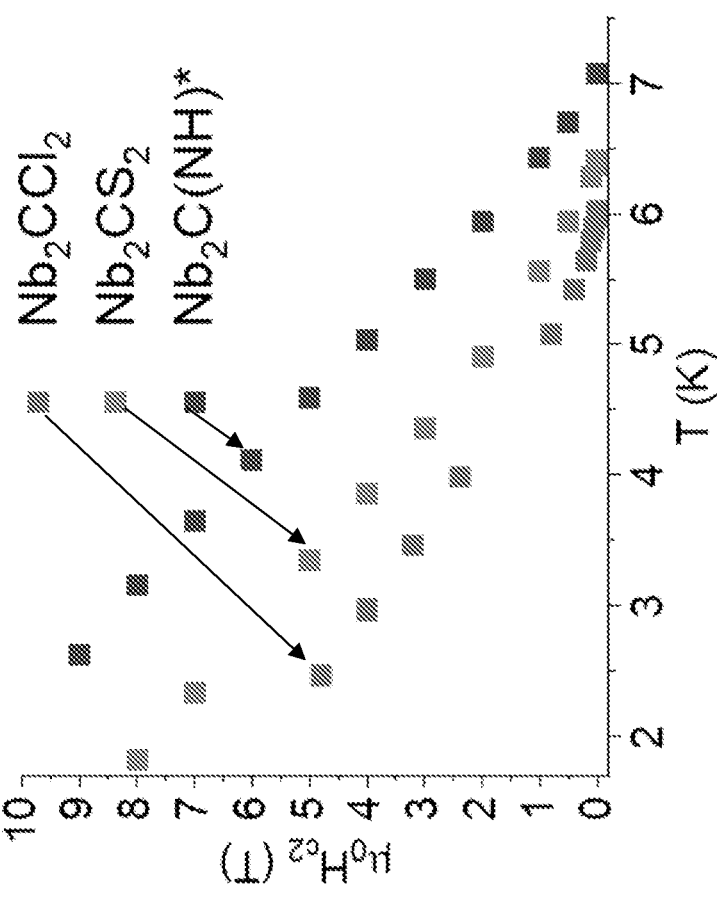
FIG. 39 shows dependence of the upper critical field ($\mu_0 H_{c2}$) on the surface group of the superconducting $Nb_2CT_n$ MXenes. *$Nb_2C(NH)$ MXene pellet was annealed at 550° C. under vacuum (FIG. 37).

In contrast to $Nb_2CCl_2$ MXene, the resistivity of MXenes terminated with chalcogenide ions (O, S, Se) gradually increased when the sample was cooled (FIG. 3B), consistent with the activated transport regime. Since UPS shows the finite density of states at $E_F$ in $Nb_2CS_2$ (FIGS. 35A-35C), it is reasonable to hypothesize that the localization is controlled by the tunneling rates for charge carriers between metallic MXene sheets. The oxo-terminated $Nb_2CT_n$ MXene shows the highest, and the seleno-terminated MXene the lowest resistivity, consistent with the reduction of the tunneling barrier heights between the MXene sheets. In the low-temperature region, superconducting transitions were observed in $Nb_2CS_2$ ($T_c$~6.4 K), $Nb_2CSe$ ($T_c$~4.5 K), and $Nb_2C(NH)$ ($T_c$~7.1 K, FIGS. 38A-38B), while $Nb_2CO$ did not enter the superconducting state (FIGS. 38A-38B). In granular metals, the development of macroscopic superconductivity can be suppressed by weak coupling of individual superconducting domains, which is also reflected by the high resistivity in the normal state. The upper critical field ($\mu_0H_{c2}$) shows strong dependence on the surface functional group. For example, $Nb_2CS_2$ MXene exhibits higher $\mu_0H_{c2}$ compared to $Nb_2CCl_2$ (FIG. 3B, inset, and FIG. 39). Interestingly, bare $Nb_2C\square_2$ MXenes showed no transition to the superconducting state down to 1.8 K (FIG. 3B). This demonstrates that the surface groups are not spectators but active contributors to the MXene superconductivity.

Experimental Section

Chemicals and Materials

Al powder (99.5%, 325 mesh, Alfa Aesar), C (graphite, 99.8%, 325 mesh, Alfa Aesar), Ti powder (99.5%, 325 mesh, Alfa Aesar), $Nb_2AlC$ (200 mesh, Forsman Scientific), KCl (99.95%, ultra dry, Alfa Aesar), NaCl (99.99%, ultra dry), $CdCl_2$ (99.996%, ultra dry, Alfa Aesar), $ZnCl_2$ (99.999%, ultra dry, Alfa Aesar), $CdBr_2$ (99.999%, ultra dry, Alfa Aesar), CsBr (99.9%, ultra dry, Alfa Aesar), KBr (99.9%, ultra dry, Alfa Aesar), LiBr (99.9%, ultra dry, Alfa Aesar), LiCl (99.995%, ultra dry, Alfa Aesar), LiH (99.4%, Alfa Aesar), $NaNH_2$ (99%, extra pure, Acros Organics), $Li_2O$ (99.5%, Alfa Aesar), $Li_2S$ (98%, Strem), $N_2H_4$ (98%, anhydrous, Sigma), HCl (36.5-38%, Fisher), HBr (48%, Sigma), MeCN (99.8%, anhydrous, Sigma), MeOH (99.8%, anhydrous, Sigma), LiF (98.5%, Alfa Aesar), HF (48%, Sigma). Alumina crucibles were 99.8% grade from CoorsTek. Borosilicate glass capillaries were 0.5 mm in diameter and 10 μm wall thickness from Hampton Research.

$Li_2Se$ and $Li_2Te$ were synthesized according to Owen's method. (A. N. Beecher et al., *J. Am. Chem. Soc.* 136, 10645-10653 (2014).) In order to avoid oxidation of MXenes at high temperatures, it is paramount that the alkali metal chalcogenide precursors do not contain polysulfides, polyselenides, and polytellurides.

MAX Phase Synthesis $Ti_3AlC_2$ MAX phase was synthesized from TiC, Ti, and Al according to a well-established procedure described in detail elsewhere. (M. Alhabeb et al., *Chem. Mater.* 29, 7633-7644 (2017).) $Ti_2AlC$ MAX phase was synthesized using the modified molten salt approach. (M. Li et al., *J. Am.*

*Chem. Soc.* 141, 4730-4737 (2019).) In brief, Ti (0.356 g), C (0.045 g), and Al (0.12 g) (2:1:1.2 molar ratio) powders were mixed with NaCl (0.87 g) and KCl (1.109 g) salts using mortar and pestle. The resultant mixture was heated in an alumina crucible at 1080° C. for 2 h under the flow of Ar.

Synthesis of MXenes with Mixed (F, OH, 0) Termination

Mixed terminated $Ti_3C_2T_x$ were synthesized by etching $Ti_3AlC_2$ MAX phase in aqueous LiF—HCl solution as described in detail elsewhere. (Alhabeb, 2017.) Mixed terminated $Nb_2CT_x$ MXenes were synthesized by etching $Nb_2AlC$ MAX phase in 48 wt. % HF as described in detail elsewhere. (M. Naguib et al., *J. Am. Chem. Soc.* 135, 15966-15969 (2013)).

Synthesis of Cl- and Br-Terminated MXenes

Molten salt-based etching of MAX phases and surface group substitution/elimination reactions were all performed in an Ar-filled glovebox with oxygen and moisture levels below 1 ppm unless stated otherwise.

$Ti_3AlC_2$ (0.5 g) and $Ti_2AlC$ (0.346 g) MAX phases were mixed with $CdCl_2/CdBr_2$ salts in 1:8 molar ratio using mortar and pestle. The resultant mixture was heated in an alumina crucible at 610° C. for at least 6 h. $Nb_2AlC$ MAX phase (0.578 g) was mixed with $CdCl_2$ salt in 1:10 molar ratio using mortar and pestle. The resultant mixture was heated in an alumina crucible at 710° C. for 36 h. The Cl functionalized MXenes were recovered from the reaction mixture by dissolving excess $CdCl_2$ and Cd metal in concentrated HCl followed by washing with deionized (DI) water until neutral pH. The Br functionalized MXenes were recovered from the reaction mixture by dissolving excess $CdBr_2$ and Cd metal in concentrated HBr for at least 24 h followed by washing with DI water until neutral pH. The resultant MXene powders were dried under vacuum at 45° C. for >12 h for further use.

In case of the scaled-up synthesis of $Nb_2CCl_2$ MXene (>1 g of MXene powder), the recovered powder still contained unreacted $Nb_2AlC$ MAX phase (as evidenced by XRD analysis). In order to increase the reaction yield, the product after 36 h of etching in $CdCl_2$ molten salt was recovered from the reaction mixture. The recovered powder containing $Nb_2CCl_2$ MXene and unreacted $Nb_2AlC$ MAX phase was mixed with new $CdCl_2$ salt and further annealed at 710° C. for another 36-48 h.

Substitution/Elimination of Cl/Br Surface Groups

The Cl- and Br-terminated MXenes acted similarly during the substitution/elimination reactions. In a typical reaction procedure, $Ti_3C_2Br_2$ MXene (70 mg) was stirred in CsBr/KBr/LiBr (25:18.9:56.1 molar ratio, m.p. 236° C.) eutectic (1.777 g) at 300° C. for 60 minutes in an alumina crucible using a glass coated stir bar. At least 3 times mole excess of the reactive ionic compound was further added to the MXene/salt mixture and stirred at 300° C. In the case of LiH and $NaNH_2$, the elimination and surface functionalization with NH, respectively, were complete after 2 h of stirring at 300° C. In the case of $Li_2O$, $Li_2S$, $Li_2Se$, and $Li_2Te$, the stir bar was first removed with a magnet before annealing the reaction mixture at 500-550° C. (functionalization with S, Se, and Te) or 600° C. (functionalization with O) for 12-24 h in a muffle furnace. All products were recovered by dissolving the salt matrix in anhydrous $N_2H_4$ followed by washing with anhydrous MeCN and anhydrous MeOH inside a $N_2$ filled glovebox in order to avoid possible oxidation of the surface groups, especially chalcogenide groups.

The amounts used in this work were not optimized, and the MXene/molten salt ratio can be increased in order to reduce the cost of using ultra dry salts per surface functionalization reaction. For example, in the case of the scaled-up conversion of $Nb_2CCl_2$ MXene to $Nb_2CS_2$ MXene (required for pressing a pellet), the MXene concentration in CsBr/KBr/LiBr eutectic was as high as 122 mg/g, yielding ~600 mg of $Nb_2CS_2$ MXene product per synthesis.

Delamination of $Ti_3C_2T_n$ MXenes

In a typical delamination process, 500 mg $Ti_3C_2Cl_2$ was immersed in 5 mL of 2.5 M n-butyllithium hexanes solution in a sealed vial. Then, the mixture was stirred at 50° C. for 24 h inside $N_2$ filled glovebox. The lithium intercalated MXene was washed with hexane followed by tetrahydrofuran (THF) to remove excess lithium and organic residues. After that, 100 mg of intercalated powder and 10 mL anhydrous N-methylformamide (NMF) were added in a centrifuge tube which was further sealed inside $N_2$ filled glovebox. After bath sonication (<10° C. to avoid possible oxidation) for 1 h, the supernatant was collected by centrifuging at 1500 r.p.m. for 15 min. Finally, the supernatant was centrifuged at 9000 r.p.m. for 15 min to remove small impurities. The sediment was further redispersed in fresh NMF or hydrazine to form stable colloidal solutions. A similar procedure was used for the delamination of $Ti_3C_2S$ and $Ti_3C_2NH$ MXenes.

Thin Film Fabrication

Glass substrates were treated in piranha solution ($H_2SO_4$: $H_2O_2$=5:2) for 30 min, and thoroughly washed with DI water and treated with oxygen plasma for 30 min. The MXene film was obtained by spin-coating colloidal $Ti_3C_2Cl_2$ in NMF on a substrate at 90° C. inside a $N_2$ filled glovebox.

In-Situ WAXS Experiment

Due to the high attenuation coefficient of Cu Kα X-rays by CsBr salt (995.8 $cm^{-1}$), a mixture of KCl (245 $cm^{-1}$) and LiCl (178.4 $cm^{-1}$) in 1:2 molar ratio was used instead. $Ti_3C_2Cl_2$ MXene was mixed with KCl/LiCl salt at a 100 mg/g concentration (mixture 1). In case of the surface group substitution, 3 times mole excess of $Li_2O$ or $K_2Se$ (w.r.t. $Ti_3C_2Cl_2$ MXene) was added to mixture 1 above (mixture 2). The resultant mixture (mixture 1 or mixture 2) was annealed at 500-550° C. in an alumina crucible for 12-24 h. The annealed mixture was crushed with mortar and pestle, and the fine powder was loaded into 0.5 mm borosilicate glass capillary. The capillary was first sealed with epoxy inside the nitrogen filled glovebox before flame sealing outside the glovebox. The in-situ heating experiments were performed in the Linkam stage. The heating rate was 10 K/min, and the capillary was allowed to equilibrate for an additional 20 minutes before the measurement.

Characterization Techniques

XRD

The diffraction patterns in the reflection mode were obtained using a Bruker D8 diffractometer equipped with Vantec 2000 area detector using Cu Kα X-ray source (1.5418 Å) operating at 40 kV and 40 mA.

Representative samples of $Ti_2CT_n$ MXenes such as $Ti_2CCl_2$, $Ti_2CBr_2$, $Ti_2CS$ and $Ti_2AlC$ MAX phase were additionally collected in spinning capillary in the transmission mode using monochromatic Mo Kα1 radiation (0.7093 Å, STOE Stadi-MP). Synchrotron radiation (0.2412 Å, Advanced Photon Source, 17-BM-B) was used to measure $Ti_2CTe$ sample (due to its strong absorption of Mo Kα1 radiation).

XRD full pattern fittings (Le Bail and Rietveld) were performed using TOPAS Version 5 software. The Le Bail full pattern fitting was used to extract the unit cell parameters. Each MXene and MAX phase sample was assumed to contain at least two phases: MXene ($P6_3/mmc$ or P-3m1 space group) or MAX phase (P6₃/mmc space group) and TiC_x or NbC_x (Fm-3m space group) minor impurity phase typically present in the corresponding MAX phases. The Stephens model (hexagonal symmetry) was used to account for the anisotropic peak broadening of the XRD patterns of MXenes and MAX phases. The Rietveld refinement of the MXene XRD patterns collected in the reflection mode was impeded by the high anisotropy of the MXene samples due to their 2D nature, and the lack of precise ordering in third dimension. Moreover, Rietveld analysis can completely fail for 2D MXenes systems such as recently shown for $Mo_2CT_x$ MXene. The differences between the Le Bail and Rietveld refinements were insignificant and within approximately 0.01 Å for a and 0.1 Å for c lattice constants.

Simulated XRD patterns for three different configurations of surface groups in $Ti_2CCl_2$ and $Ti_2CTe$ MXenes were generated in BIOVIA's Materials Studio program.

WAXS (Transmission)

Transmission WAXS patterns of the MXenes in salt matrices were collected on a SAXSLab Ganesha instrument with Cu Kα X-ray source (1.5418 Å).

X-Ray Total Scattering and Pair Distribution Function (PDF) Analysis

The pair distribution function, G(r), gives the probability of finding a pair of atoms separated by a distance r. High energy X-ray total scattering experiments were performed at 11-ID-B at the Advanced Photon Source, with the X-ray wavelength of 0.2115 Å. The raw 2D data were azimuthally integrated and reduced to 1D intensity versus 2θ in GSAS-II using $CeO_2$ powder for the calibration to determine sample to detector distance. PDFgetX2 program was used to correct and normalize the diffraction data and then Fourier transform the reduced structure factor to obtain the PDF, G(r), according to:

$$G(r) = \frac{2}{\pi} \int_{q_{min}}^{q_{max}} dq\, q(S(q) - 1)\sin(qr)$$

where q is the magnitude of the scattering momentum transfer and S(q) is the properly corrected and normalized powder diffraction intensity measured from $q_{min}$ and $q_{max}$.

X-Ray Absorption (XAS)

Extended X-ray Absorption Fine Structure (EXAFS) spectroscopy and X-ray Absorption Near Edge Structure (XANES) were employed to probe the local environment around Ti using K-edge EXAFS and XANES (4966 eV) and around Nb using K-edge XANES (18999 eV) at the 20-ID-B beam line at the Advanced Photon Source, Argonne National Laboratory. XAS data were collected in the transmission mode at room temperature. The incident, transmitted, and reference X-ray intensities were monitored using gas ionization chambers. A titanium/niobium foil standard was used as a reference for energy calibration and was measured simultaneously with experimental samples. All powder samples were measured as pellets diluted with appropriate amount of BN and sealed in Kapton tape inside a glovebox.

Data collected were processed using Athena software (version 0.9.26) by extracting the EXAFS oscillations χ(k) as a function of photoelectron wave number k. The theoretical paths were generated using FEFF6 and the models were fitted using the Artemis software (version 0.9.26). Data sets were simultaneously fitted in the R-space with k-weights of 1, 2 and 3.

Additional fitting details: Incorporation of two scattering Ti—Ti paths for $Ti_2CT_n$ samples was essential to get a good fit in the area between 2-3 Å in R space. The first scattering Ti—Ti path (Ti—Ti1) corresponds to the nearest neighbor Ti on the opposite side of the same $Ti_2CT_n$ 2D sheet. The second scattering Ti—Ti path (Ti—Ti₂) corresponds to Ti neighbor on the same side of the same $Ti_2CT_n$ sheet. Ti—Ti₂ distance is approximately equal to the in-plane lattice constant a determined from XRD.

STEM Characterization

Atomic-resolution characterization of the MXene samples was conducted using the JEOL ARM200CF at the University of Illinois at Chicago, which is an aberration-corrected scanning transmission electron microscope (STEM) equipped with a cold field emission gun operated at 200 kV, a Gatan Continuum electron energy-loss spectrometer (EELS) and an Oxford XMAX100TLE X-ray detector, providing a sub-Å probe-size and 350 meV energy resolution. The emission current was reduced to 12 μA in order to reduce damage from the electron beam. An electron probe convergence semi-angle of 24 mrad was used and the inner detector angle for high angle annular dark field imaging was chosen to be 75 mrad, while an inner angle for low angle annular dark field (LAADF) imaging was chosen at 30 mrads.

The MXene samples were initially prepared for STEM analysis by dropcasting particles suspended in isopropyl alcohol onto a 3 mm holey-carbon covered TEM grid. The chalcogenide functionalized MXenes still contained inter-calated $N_2H_4$, which required heating the samples to 100° C. prior to performing the STEM characterization. The samples were heated using the Protochip Aduro Double Tilt heating holder in the column of the JEOL ARM200CF.

SEM-EDX

SEM imaging and EDX elemental mapping were performed in a TESCAN LYRA3 field-emission scanning electron microscope equipped with two X-Max-80 silicon drift x-detectors (SDD).

Raman Spectroscopy

Raman spectra were obtained with a Horiba LabRamHR Evolution confocal microscope. Si (111) wafer was used for calibration. The samples were excited using a 633 nm light source operating at 1% of its power or a 532 nm light source operating at 2.5% of its power and using 100× long path objective and a 600 mm⁻¹ grating.

XRF

XRF analysis was performed with a benchtop Energy Dispersive Rigaku NEX DE VS X-ray fluorimeter equipped with a Peltier cooled FAST SDD Silicon Drift Detector. All analyses were carried out under He atmosphere to increase sensitivity for lighter elements. Elemental ratios were determined using the standardless thin films fundamental parameters method as programmed in QuantEZ software provided by Rigaku, using the standard Rigaku calibration protocols. For the consistent analysis, the samples were prepared by drop casting powders dispersed in anhydrous MeOH on a Si substrate of an approximate 1 by 1 cm square size to provide uniform thin films throughout the series. The films were loaded into the instrument and the analysis window was set at 10 mm radius. All samples were measured and analyzed in the same manner. Pressed pellets of $Nb_2CCl_2$, $Nb_2CS_2$ and $Nb_2CSe$ MXenes (prepared for resistivity measurements) were additionally measured using the pellet fundamental parameters method. The results were the same as in the case of the thin films fundamental parameters method.

Temperature Dependent Resistivity

Dried powders of MXenes were pressed under the load of ≈55 MPa into square pellets of 13 mm in length or disks of 15 mm in diameter and 0.7-1 mm in thickness. $Nb_2CS_2$ and $Nb_2CSe$ MXene pellets were additionally dried at 100-120° C. under $10^{-5}$ mbar for 12 h to get rid of excess $N_2H_4$. $Nb_2CO_x$ and $Nb_2C(NH)$ MXene pellets were additionally annealed at 220-550° C. under vacuum to investigate the effect of thermal post processing on the superconducting properties, if any (see FIGS. 38A-38B for details).

4 gold plated spring-loaded electrodes positioned in-line 2 mm apart were used to electrically contact the MXene pellet to a puck. The puck was then loaded into a physical property measurement system (PPMS, Quantum design) under He-filled inert atmosphere. The 4-probe resistivity measurements were carried out in an AC mode with a DC excitation of 1 mA. The temperature dependent resistivity measurements were performed from 300 K to 1.8 K.

XPS

XPS analysis was performed on a Kratos Axis Nova spectrometer using monochromatic Al Kα source (1486.6 eV). Te 3d, Ti 2p, N 1s, C 1s, Nb 3d, Cl 2p, S 2p, and Br 3d high-resolution spectra were collected using an analysis area of 0.3×0.7 mm² and 20 eV pass energy with the step size of 100 meV. Charge neutralization was performed using a co-axial, low energy (≈0.1 eV) electron flood source to avoid shifts in the recovered binding energy. C is peak of adventitious carbon was set at 284.8 eV to compensate for any remaining charge-induced shifts. Deconvolution of the high-resolution XPS spectra was performed in CasaXPS software using symmetric Lorentzian-Gaussian curves and a Shirley background. The Ti 2p region consisted of the two $2p_{3/2}$ and $2p_{1/2}$ spin-orbit split components. The peak area ratio of $2p_{3/2}$ to $2p_{1/2}$ was fixed to 2 to 1. The Ti 2p region was fit using 4 pairs of $2p_{3/2}$ and $2p_{1/2}$ components for each sample. The Nb 3d region consisted of the two $3d_{5/2}$ and $3d_{3/2}$ spin-orbit split components. The peak area ratio of $3d_{5/2}$ to $3d_{3/2}$ was fixed to 3 to 2. The Nb 3d region was fit using 5 pairs of $3d_{5/2}$ and $3d_{3/2}$ components for each sample. The Ti—C contribution of the C 1s region was fit with the two curves in order to account for the peak asymmetry. The peak asymmetry was caused by the extrinsic loses due to delocalized states.

UPS

UPS measurements were performed on a Kratos Axis Nova spectrometer using He I line (21.21 eV). Samples were in the form of the cold pressed pellets used for the resistivity measurements. During the measurements, a bias of −9 V was applied between the sample and the analyzer. The step size was 100 meV.

Magnetization Measurements

Magnetic measurements were performed on a Quantum Design MPMS 3 instrument equipped with a superconducting quantum interference device (SQUID). Corrections were made for the diamagnetic contributions from the polycarbonate capsules and eicosane was used to secure the sample. From the zero-field-cooled curve of $Nb_2CCl_2$ MXene, the magnetic susceptibility at 1.82 K was −0.00529 emu/(g·Oe) (FIG. 3A). Given the crystallographic density is 5.3 g/cm³, the diamagnetic volume fraction was estimated as 0.00529*5.3*4π*100%=35.2%.

Zeta Potential and Dynamic Light Scattering (DLS)

Zeta potential and DLS of a dilute filtered solution of $Ti_3C_2Cl_2$ MXene in NMF was measured with a Zetasizer Nano-ZS (Malvern Instruments). The sample was held in a glass cuvette with an immersed dip cell equipped with palladium electrodes.

Estimation of the Interlayer Spacing Between MXene Sheets in Salt Matrix

The interlayer distance between $Ti_3C_2Cl_2$ MXene sheets after their reaction with $Li_2O$ in KCl/LiCl molten salt can be estimated as following. Analysis of the high-resolution STEM images of $Ti_3C_2Cl_2$ MXene stack (FIGS. 6A-6E) suggests that each layer is 8.42 (±0.32) Å thick (Table 2). Hence the van der Waals gap between adjacent $Ti_3C_2Cl_2$ MXene sheets is 11.25-8.42 (±0.32)=2.83 (±0.32) Å~2.8 Å. The van der Waals gap between adjacent $Ti_3C_2O$ MXene sheets is similar to that of between $Ti_3C_2Cl_2$ MXene, 9.46-6.87=2.59 Å~2.6 Å. (Z. H. Fu et al., *Phys. Rev. B* 94, 104103 (2016); and N. Zhang et al., *2D Materials* 5, 045004 (2018).) The (0002) peak in FIGS. 31A-31B results in the center-to-center distance of 13.16 Å. Hence the upper bound (assuming 100% reaction yield) on the interlayer distance (including the van der Waals gap) between adjacent $Ti_3C_2O$ sheets in KCl/LiCl salt is 13.16-6.87=6.29 Å~6.3 Å. The lower bound (assuming no Cl substitution took place) on the interlayer distance (including the van der Waals gap) between adjacent $Ti_3C_2Cl_2$ sheets in KCl/LiCl salt is 13.16-8.42 (±0.32)=4.74 (±0.32) Å~4.7 Å.

Figure 32:
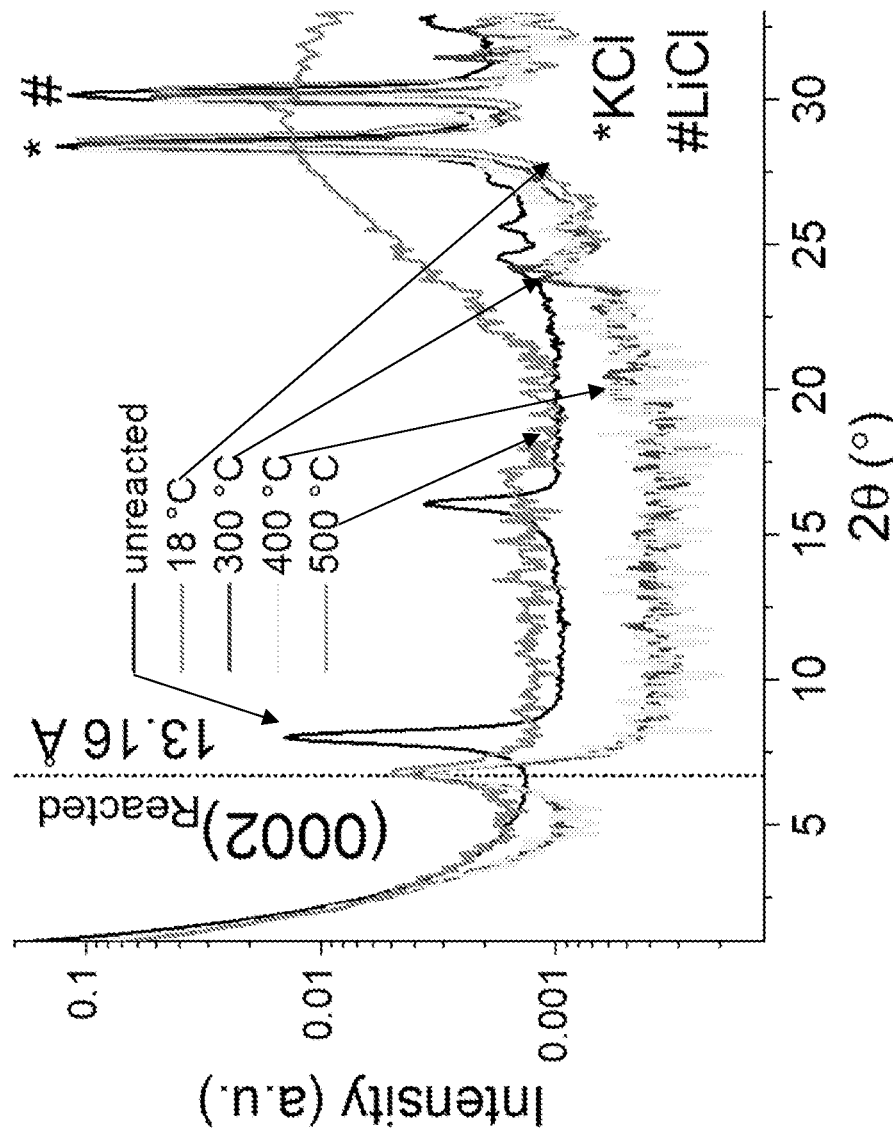
FIG. 32 shows WAXS patterns of $Ti_3C_2Cl_2$ MXene in KCl/LiCl salt with $Li_2O$ added before reaction (black curve) and after reaction at 550° C. for 16 h (grey curve). Temperature dependent (18 to 500° C.) WAXS patterns are shown for $Ti_3C_2Cl_2$ MXene reacted with $Li_2O$.
Figure 33:
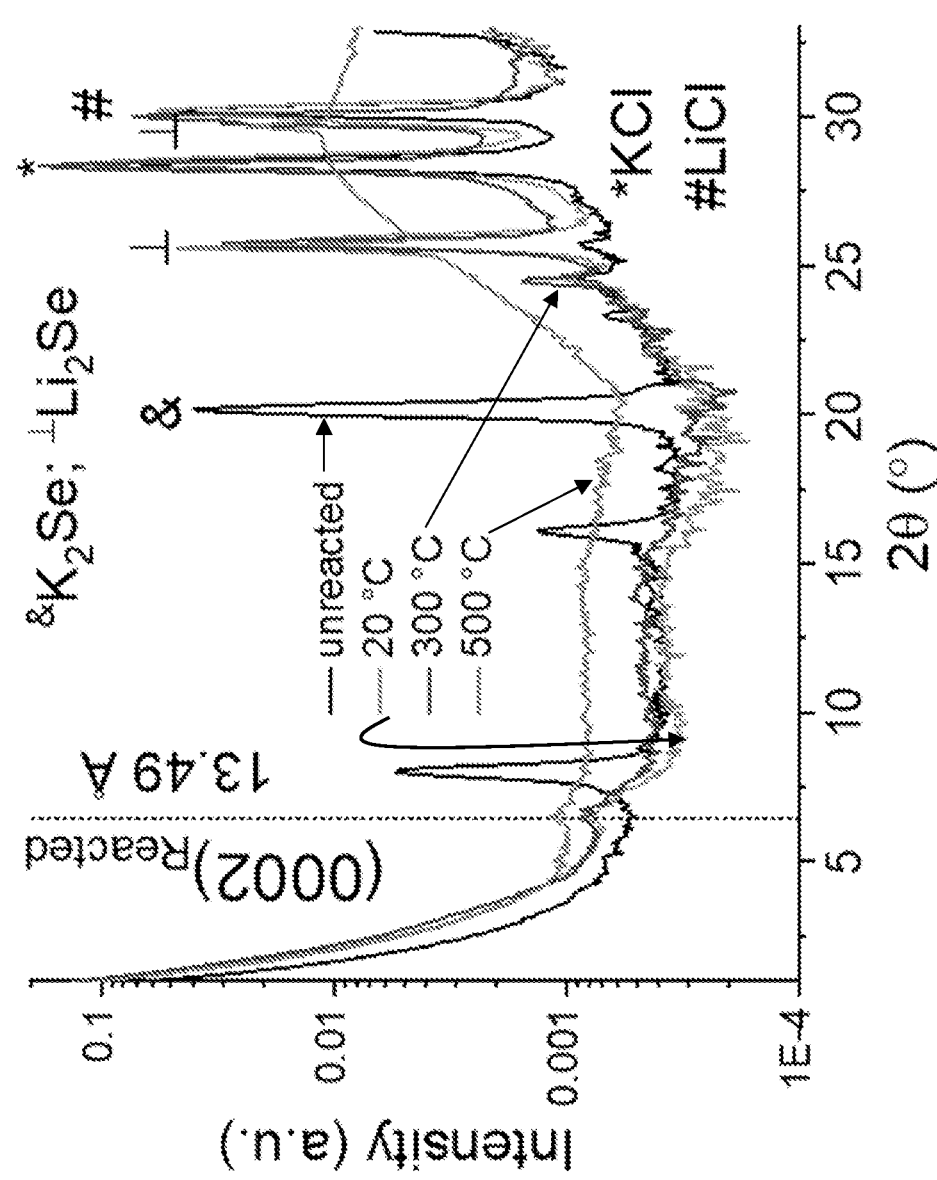
FIG. 33 shows WAXS patterns of $Ti_3C_2Cl_2$ MXene in KCl/LiCl salt with $K_2Se$ added before reaction (black curve) and after reaction at 500° C. for 24 h (grey curve). Temperature dependent (20 to 500° C.) WAXS patterns are shown for $Ti_3C_2Cl_2$ MXene reacted with $K_2Se$.
Figure 34:
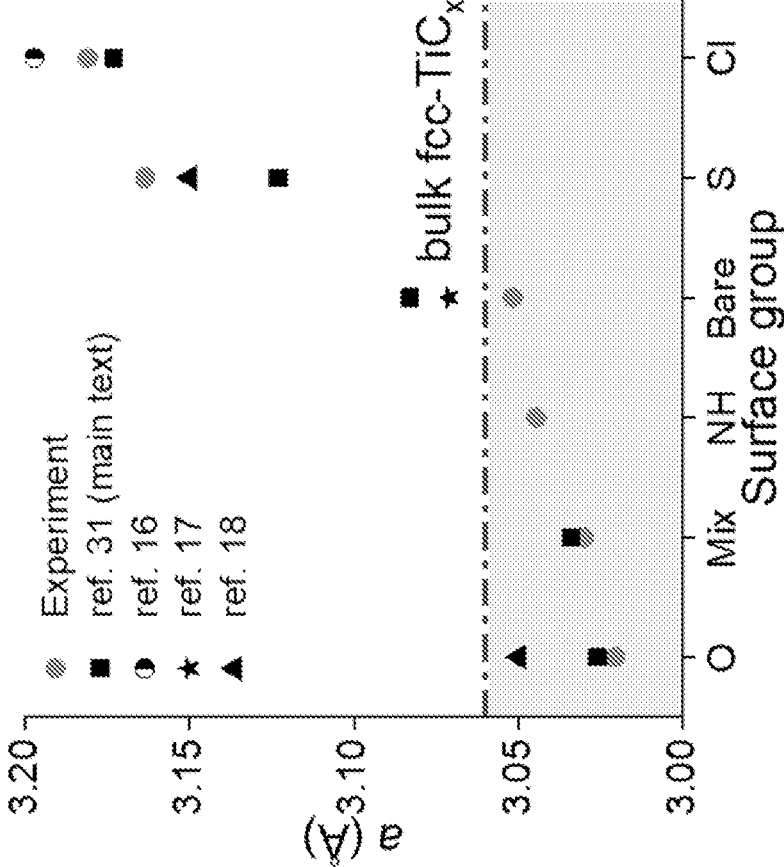
FIG. 34 shows a zoomed in version of FIG. 2C showing comparison between the experimental and theoretically predicted (J. Lu et al., Nanoscale Advances 1, 3680-3685 (2019), G. R. Berdiyorov, AIP Advances 6, 055105 (2016), Q. Meng et al., Nanoscale 10, 3385-3392 (2018) and D. Wang et al., ACS Nano 13, 11078-11086 (2019)) in-plane a lattice parameters of the light element functionalized $Ti_3C_2T_n$ MXene. For the mixed terminated $Ti_3C_2T_x$ MXene obtained via aqueous LiF—HCl method, a is calculated using the Vegard's Law with the stoichiometry determined previously as $Ti_3C_2(OH)_{0.06}(F)_{0.25}(O)_{0.84}$. (R. Ibragimova et al., ACS Nano 13, 9171-9181 (2019); and M. A. Hope et al., Phys. Chem. Chem. Phys. 18, 5099-5102 (2016).) No theoretical values for NH, Se, Br, and Te terminated $Ti_3C_2$ MXenes are currently available.

As for the reaction with $Li_2Se$, the (0002) peak in FIG. 32 results in the center-to-center distance of 13.49 Å. Hence the lower bound (assuming 100% reaction yield) on the interlayer distance (including the van der Waals gap) between adjacent $Ti_3C_2Se$ sheets in KCl/LiCl salt is 13.49-9.11 (±0.22)=4.38 (±0.22) Å~4.4 Å. The upper bound (assuming no Cl substitution took place) on the interlayer distance (including the van der Waals gap) between adjacent $Ti_3C_2Cl_2$ sheets in KCl/LiCl salt is 13.49-8.42 (±0.32)=5.07 (±0.32) Å~5.1 Å.

Estimation of the Poisson Ratio

In order to estimate the Poisson ratio (ν) for the MXene sheets, it was assumed that the sheet can be approximated as an elastic isotropic solid. S, Cl, Se, Br and Te result in the tensile stress of the MXene basal (0001) plane, $\sigma_{xx}=\sigma_{yy}=\sigma$. The surface groups do not cause stress along the c-axis, $\sigma_{zz}=0$. The in-plane strain, $\varepsilon=\varepsilon_{yy}=\varepsilon_{\parallel}$, and out-of-plane strain, $\varepsilon_{zz}=\varepsilon_{\perp}$, can be related to the tensile stress using the 3D Hooke's Law:

$$\varepsilon_{\parallel} = \frac{1}{E}(\sigma_{xx} - \nu(\sigma_{zz} + \sigma_{yy})) = \frac{1}{E}(\sigma - \nu\sigma) \tag{1}$$

$$\varepsilon_{\perp} = \frac{1}{E}(\sigma_{zz} - \nu(\sigma_{xx} + \sigma_{yy})) = \frac{1}{E}(0 - 2\nu\sigma) \tag{2}$$

From the above equations, the Poisson ratio can be expressed in terms of $\varepsilon_{\parallel}$ and $\varepsilon_{\perp}$:

$$\nu = \frac{-\varepsilon_{\perp}/\varepsilon_{\parallel}}{2 - \varepsilon_{\perp}/\varepsilon_{\parallel}} \tag{3}$$

The in-plane strain can be calculated as following:

$$\varepsilon_{\parallel} = \frac{a - a_{TiC}/\sqrt{2}}{a_{TiC}/\sqrt{2}} \tag{4}$$

where a is the MXene in-plane lattice constant as estimated from the Le Bail fit of the corresponding XRD patterns and $a_{TiC}$ (=4.32 Å) is the lattice constant of cubic TiC.

The out-of-plane strain can be calculated as following:

$$\varepsilon_{\perp} = \frac{M_{\perp} - a_{TiC}/\sqrt{3}}{a_{TiC}/\sqrt{3}} \tag{5}$$

where $M_\perp$ is the distance between Ti planes along c-axis, equivalent to the distance between (111) planes in cubic TiC. This distance can be obtained from the analysis of the MXene high resolution STEM images (FIG. 40).

If the bonding between transition metal atoms and surface functional groups were purely ionic, 1 halide (charge −1) and 0.5 chalcogenide (charge −2) ion would be expected per every transition metal atom in the outer MXene layer. The results in Table 2 above agree with this simple argument. The deviations of the MXene surface group density from the canonical one surface group per every transition metal atom in the outer layer have been observed in mixed terminated $Nb_2CT_x$ and $Ti_3C_2T_x$ MXenes. (J. Palisaitis et al., *Nanoscale* 10, 10850-10855 (2018); and I. Persson et al., *2D Materials* 5, 015002 (2017).) The slight substoichiometry in the case of Br/Cl-terminated MXenes can be as a result of surface vacancies.

Expanding upon this Example, the inventors propose various novel MXene structures enabled by the combinations of etching and substitution reactions using Lewis acidic and Lewis basic molten salts, respectively.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of modifying a surface termination of an MXene, the method comprising:

providing particles of a first MXene represented by the formula $M_{m+1}X_mT_{n1}$ and having a layered structure in which the $M_{m+1}X_m$ form two-dimensional sheets, where M is a transition metal, X is carbon, m is 1, 2, or 3, and $T_{n1}$ denotes surface terminating chloride anions, bromide anions, iodide anions or a combination thereof;

dispersing the particles of the first MXene in an alkali halide molten salt bath comprising an alkali chloride salt, an alkali bromide salt, an alkali iodide salt, or a eutectic thereof and containing solubilized non-halide anions, the solubilized non-halide anions characterized in that a bond formed between the non-halide anion and the transition metal of the first MXene is stronger than a bond formed between the surface terminating chloride anion, bromide anion, or iodide anion and the transition metal of the first MXene, whereby the non-halide anions replace surface terminating chloride anions, bromide anions, or iodide anions on the first MXene via a halide exchange reaction under temperature of 300° C.-700° C. to form a second MXene represented by the formula $M_{m+1}X_mT_{n2}$ and having a layered structure in which the $M_{m+1}X_m$ form two-dimensional sheets, where M is the transition metal, X is carbon, m is 1, 2, or 3, and $T_{n2}$ comprises surface terminating non-halide anions.

2. The method of claim 1, wherein the transition metal of the first and second MXenes is titanium or niobium.

3. The method of claim 1, wherein the particles of the first MXene comprise the surface terminating bromide anions or the surface terminating chloride anions.

4. The method of claim 1, wherein the non-halide anions are chalcogenide anions.

5. The method of claim 4, wherein the chalcogenide anions are introduced into the alkali metal molten salt bath in the form of a lithium chalcogenide salt.

6. The method of claim 1, wherein the non-halide anions are amide anions.

7. The method of claim 6, wherein the amide anions are introduced into the alkali metal molten salt bath in the form of a $NaNH_2$ salt.

8. The method of claim 1, wherein the particles of the first MXene comprise the surface terminating bromide anions and the alkali halide molten salt bath is comprises an alkali bromide salt.

9. The method of claim 1, wherein the particles of the first MXene comprise the surface terminating chloride anions and the alkali halide molten salt bath comprises an alkali chloride salt.

10. The method of claim 1, wherein the second MXene is $Ti_3C_2S$, $Ti_3C_2Se$, $Ti_3C_2Te$, or $Ti_3C_2O$.

11. The method of claim 1, wherein the second MXene is $Nb_2CS_2$ or $Nb_2CSe$.

12. The method of claim 1, wherein the second MXene is $Ti_3C_2(NH)$ or $Nb_2C(NH)$.

13. The method of claim 5, wherein the lithium chalcogenide salt is $Li_2O$, $Li_2S$, $Li_2Se$, or $Li_2Te$.

14. The method of claim 2, wherein the first MXene is $Ti_3C_2Br_2$, $Ti_3C_2Cl_2$, $Ti_2CCl_2$, or $Ti_2CBr_2$.

15. The method of claim 2, wherein the first MXene is $Nb_2CCl_2$.

16. The method of claim 8, wherein the alkali bromide molten salt bath comprises a mixture of CsBr, LiBr, and KBr.

17. The method of claim 9, wherein the alkali chloride molten salt bath comprises a mixture of KCl and LiCl.

18. The method of claim 1, wherein m is 1 or 2.

19. The method of claim 1, wherein the transition metal of the first and second MXenes is zirconium, vanadium, tantalum, chromium, molybdenum, or scandium.

20. The method of claim 1, wherein the transition metal of the first and second MXenes is titanium or niobium, m is 1 or 2, $T_{n1}$ is chloride or bromide, and the non-halide anion is a chalcogenide or amide.

21. The method of claim 20, wherein the alkali halide molten salt bath comprises the alkali chloride salt or the alkali bromide salt.

* * * * *